United States Patent
Lablans

(10) Patent No.: US 8,164,655 B2
(45) Date of Patent: Apr. 24, 2012

(54) SYSTEMS AND METHODS FOR CONCURRENTLY PLAYING MULTIPLE IMAGES FROM A STORAGE MEDIUM

(75) Inventor: Peter Lablans, Morris Township, NJ (US)

(73) Assignee: Spatial Cam LLC, Morristown, NJ (US)

( * ) Notice: Subject to any disclaimer, the term of this patent is extended or adjusted under 35 U.S.C. 154(b) by 315 days.

(21) Appl. No.: 12/435,624

(22) Filed: May 5, 2009

(65) Prior Publication Data

US 2009/0284620 A1 Nov. 19, 2009

Related U.S. Application Data

(60) Provisional application No. 61/089,727, filed on Aug. 18, 2008, provisional application No. 61/055,272, filed on May 22, 2008, provisional application No. 61/054,290, filed on May 19, 2008.

(51) Int. Cl.
   *H04N 5/76* (2006.01)
   *H04N 7/18* (2006.01)
   *H04N 5/225* (2006.01)
   *H04N 5/222* (2006.01)

(52) U.S. Cl. ............ 348/231.3; 348/143; 348/170; 348/333.01; 348/333.02

(58) Field of Classification Search ......... 348/46–48, 348/211.11–211.13, 231.3, 333.02, 153, 348/159
   See application file for complete search history.

(56) References Cited

U.S. PATENT DOCUMENTS

| | | | |
|---|---|---|---|
| 4,782,402 A | 11/1988 | Kanamaru | |
| 5,257,324 A * | 10/1993 | Bumgardner | 382/298 |
| 5,343,243 A | 8/1994 | Maeda | |
| 5,434,617 A * | 7/1995 | Bianchi | 348/170 |
| 5,557,328 A * | 9/1996 | Ishihama et al. | 348/240.3 |
| 5,568,192 A | 10/1996 | Hannah | |
| 5,646,679 A | 7/1997 | Yano et al. | |
| 5,680,649 A | 10/1997 | Akimoto et al. | |
| 6,178,144 B1 | 1/2001 | Huiber | |
| 6,282,320 B1 | 8/2001 | Hasegawa et al. | |
| 6,323,858 B1 | 11/2001 | Gilbert et al. | |
| 6,574,417 B1 | 6/2003 | Lin et al. | |
| 6,669,346 B2 * | 12/2003 | Metcalf | 353/94 |
| 6,727,941 B1 | 4/2004 | Coleman | |
| 6,885,374 B2 | 4/2005 | Doyle et al. | |
| 6,961,055 B2 | 11/2005 | Doak et al. | |
| 6,972,796 B2 * | 12/2005 | Katta et al. | 348/333.01 |
| 7,020,888 B2 | 3/2006 | Reynolds et al. | |
| 7,085,484 B2 | 8/2006 | Hara | |
| 7,102,686 B1 | 9/2006 | Orimoto et al. | |

(Continued)

OTHER PUBLICATIONS

PCT International Search Report and Written Opinion in PCT/US2009/043075, (Jul. 6, 2009), 12 pgs.

(Continued)

*Primary Examiner* — Jason Chan
*Assistant Examiner* — Pritham Prabhakher

(57) ABSTRACT

Methods for storing on a storage or memory medium, and retrieving, and displaying of multiple images in a registered manner, the images have been recorded concurrently. The images may comprise at least 2 video programs. A camera system for recording multiple concurrent images is also disclosed. Lenses and corresponding image sensors are calibrated to have calibrated and associated settings for recording multiple images that are substantially registered images. A registered image may be displayed on a single display. It may also be displayed on multiple displays. A camera for recording and displaying registered multiple images may be part of a mobile phone.

20 Claims, 31 Drawing Sheets

U.S. PATENT DOCUMENTS

| | | |
|---|---|---|
| 7,123,745 B1 | 10/2006 | Lee |
| 7,126,897 B2 | 10/2006 | Takeuchi et al. |
| 7,136,333 B2 | 11/2006 | Wong et al. |
| 7,149,178 B2 | 12/2006 | Wong et al. |
| 7,218,144 B2 | 5/2007 | Lablans |
| 7,227,893 B1 | 6/2007 | Srinivasa et al. |
| 7,259,792 B2 | 8/2007 | Terada |
| 7,280,745 B2 | 10/2007 | Mollie et al. |
| 7,345,934 B2 | 3/2008 | Guterman et al. |
| 7,355,444 B2 | 4/2008 | Lablans |
| 7,365,787 B2 * | 4/2008 | Nobels .................. 348/333.02 |
| 7,365,789 B2 | 4/2008 | Ogino |
| 7,397,690 B2 | 7/2008 | Lablans |
| 7,424,175 B2 | 9/2008 | Lipton et al. |
| 2004/0257436 A1 | 12/2004 | Koyanagi et al. |
| 2005/0122400 A1 | 6/2005 | Kochi et al. |
| 2006/0164883 A1 | 7/2006 | Lablans |
| 2007/0031062 A1 * | 2/2007 | Pal et al. ...................... 382/284 |
| 2007/0035516 A1 | 2/2007 | Voto et al. |
| 2007/0177013 A1 * | 8/2007 | Shingu ........................ 348/143 |
| 2008/0002023 A1 | 1/2008 | Cutler |
| 2008/0024594 A1 | 1/2008 | Ritchey |
| 2008/0024596 A1 | 1/2008 | Li et al. |
| 2008/0024614 A1 | 1/2008 | Li et al. |
| 2008/0106634 A1 | 5/2008 | Masuda |
| 2008/0111583 A1 | 5/2008 | Lablans |
| 2008/0180987 A1 | 7/2008 | Lablans |

OTHER PUBLICATIONS

PCT International Search Report & Written Opinion in PCT/US2009/043410, (Jul. 7, 2009), 12 pgs.

Szeliski, Richard "Image Alignment and Stitching: A Tutorial Preliminary Draft", *Technical Report MSR-TR-2004-92, Microsoft online*, (Sep. 27, 2004), 59 pp.

Zitova, Barbara et al., "Image Registration Methods: A Survey", *Image and Vision Computing 21*, (2003), 977-1000 pp.

* cited by examiner

SYSTEMS AND METHODS FOR CONCURRENTLY PLAYING MULTIPLE IMAGES FROM A STORAGE MEDIUM

STATEMENT OF RELATED CASES

This patent application claims the benefit of U.S. Provisional Patent Application No. 61/054,290, filed on May 19, 2008, of U.S. Provisional Patent Application No. 61/055,272, filed May 22, 2008, and of U.S. Provisional Patent Application No. 61/089,727, filed Aug. 18, 2008, all three of which are incorporated herein by reference in their entirety.

BACKGROUND OF THE INVENTION

The present invention relates to digital media players. More specifically it relates to media players that can play two or more digital files at the same time and to cameras as the origin of the two or more digital files.

Digital storage media such as CDs, DVDs, magnetic disks, flash memory and other storage media which are used for storing and playing for instance multi-media files representing music and video are known. One can use the storage media in devices such as DVD players or computers or personal digital devices for watching a movie or video program for instance. One may also play music recordings. Another playing medium is a flash memory such as used in MP3 players. Another medium may be a magnetic disk.

Sometimes it may be desirable to play several files at the same time. A known application is, for instance, an entertainment center as used for instance in an airplane. Up to 10 or more different video channels may need to be provided at the same time, available for selection by users of a system. In general, the requirement for different signals is solved by playing different DVDs or optical disks or other media and making the signals coming from these individual media available in a selectable manner through a communication channel.

Another application may be providing a movie with different screens or a single screen that show what is going on at different locations of a scene viewed from different cameras at the same time.

All the above and other applications that are fully contemplated require a recording and later playback from a single medium of different movies or files at virtually the same time. In line with current trends, these video and other multi-media files may be high definition.

Accordingly, methods or apparatus providing novel and improved recording and playback of multiple files at virtually the same time from a single storage medium are required.

SUMMARY OF THE INVENTION

One aspect of the present invention presents novel methods and systems for recording, storing and concurrent displaying of a plurality of video programs.

In accordance with another aspect of the present invention a system is provided for displaying a plurality of video programs, comprising a multiplexer for creating a signal of time division multiplexed signals from the plurality of video programs, a storage medium for storing the signal, a player for reading the stored signal, the player containing a demultiplexer for de-multiplexing the signal into a plurality of demultiplexed signals, and a display for displaying one of the plurality of video programs reconstructed from a demultiplexed signal.

In accordance with a further aspect of the present invention, a system for displaying a plurality of video programs is provided wherein each of the plurality of video programs is a recording of a scene taken concurrently with each other.

In accordance with another aspect of the present invention, a system is provided, wherein the storage medium is an optical disk.

In accordance with a further aspect of the present invention, a system for displaying a plurality of video programs is provided, wherein a camera is an integrated camera system having at least 2 video image sensors.

In accordance with a further aspect of the present invention, a system for displaying a plurality of video programs is provided, wherein an optical disk can store a plurality of symbols each having one of three or more states.

In accordance with a further aspect of the present invention, a system for displaying a plurality of video programs is provided, wherein a demultiplexer can process symbols having one of 3 or more states.

In accordance with another aspect of the present invention, a method for displaying a plurality of video programs is provided, comprising multiplexing a plurality of signals each signal representing one of the plurality of video programs into a multiplexed signal, storing the multiplexed signal in a contiguous manner in a memory or on a storage device, reading the multiplexed signal from the memory or storage device, demultiplexing the multiplexed signal and creating a plurality of playable signals, each playable signal representing one of the plurality of video programs, and playing a playable signal on a video display.

In accordance with a further aspect of the present invention, methods and systems are provided for creating combined and registered images created from 2, or 3 or more cameras, the cameras being either a static image camera or a video camera. Also a plurality of cameras may be used.

In accordance with a further aspect of the present invention, a camera may be a mobile computing device, enabled to communicate wirelessly and having at least two lenses from which a combined and registered image may be formed. The camera may be applied for photographs and/or for video images.

In accordance with an aspect of the present invention, methods and systems are provided for recording concurrently a plurality of images and for displaying the concurrently recorded images in a registered manner.

In accordance with a further aspect of the present invention, a method is provided for displaying at least a first and a second concurrently recorded image in a registered manner, comprising storing in a memory data representing a first setting of a first lens in a camera for recording the first image under a first condition, storing in the memory data representing a first setting of a second lens in the camera for recording the second image under the first condition, associating the first setting of the second lens with the first setting of the first lens, applying the first setting of the first lens to the first lens, retrieving by a controller from the memory data representing the setting of the second lens associated with the first setting of the first lens and putting the second lens in the retrieved setting; and storing in an image storage device data representing the first image taken through the first lens and data representing the second image taken through the second lens.

In accordance with yet a further aspect of the present invention, a method is provided, further comprising storing data representing a merge line in the first and the second image.

In accordance with yet a further aspect of the present invention, a method is provided, wherein the data representing the first image data are data determined by the merge line.

In accordance with yet a further aspect of the present invention, a method is provided, wherein a setting of a lens is selected from a group consisting of focus, zoom, diaphragm, shutter speed, and lens position.

In accordance with yet a further aspect of the present invention, a method is provided, wherein images are video images and further comprising multiplexing image data in accordance with a sampling theorem and storing the image data in a contiguous manner.

In accordance with yet a further aspect of the present invention, a method is provided, wherein the image storage device is selected from the group consisting of a binary electronic memory, a rotating binary data storage medium, an n-state electronic memory with n>2 and an n-state rotating n-state storage medium.

In accordance with yet a further aspect of the present invention, a method is provided, further comprising reading the image data from the image storage device, demultiplexing the image data into data representing at least a first and a second concurrent and registered image and displaying concurrently the at least first and second registered image.

In accordance with yet a further aspect of the present invention, a method is provided, further comprising processing the data of the at least first and second image for display on a single display as a single registered image.

In accordance with yet a further aspect of the present invention, a method is provided, further comprising processing the data of the at least first and second image for display on at least a first and second display to provide a registered image of a scene recorded by the at least first and second image.

In accordance with yet a further aspect of the present invention, a method is provided, wherein the camera is part of a mobile phone.

In accordance with another aspect of the present invention, a system is provided for displaying at least a first and a second concurrently recorded image in a registered manner, comprising an instruction memory holding data representing instructions, a processor for retrieving from the memory data representing instructions and executing the instructions for performing the steps of: storing in a memory data representing a first setting of a first lens in a camera for recording the first image under a first condition, storing in the memory data representing a first setting of a second lens in the camera for recording the second image under the first condition, associating the first setting of the second lens with the first setting of the first lens, applying the first setting of the first lens to the first lens, retrieving by a controller from the memory data representing the setting of the second lens associated with the first setting of the first lens and putting the second lens in the retrieved setting and storing in an image storage device data representing the first image taken through the first lens and data representing the second image taken through the second lens.

In accordance with yet another aspect of the present invention, a system is provided, further comprising instructions for storing data representing a merge line in the first and the second image.

In accordance with yet another aspect of the present invention, a system is provided, wherein the data representing the first image data are data determined by the merge line.

In accordance with yet another aspect of the present invention, a system is provided, wherein a setting of a lens is selected from a group consisting of focus, zoom, diaphragm, shutter speed, and lens position.

In accordance with yet another aspect of the present invention, a system is provided, wherein images are video images and further comprising multiplexing image data in accordance with a sampling theorem, and storing the image data in a contiguous manner.

In accordance with yet another aspect of the present invention, a system is provided, wherein the image storage device is selected from the group consisting of a binary electronic memory, a rotating binary data storage medium, an n-state electronic memory with n>2 and an n-state rotating n-state storage medium.

In accordance with yet another aspect of the present invention, a system is provided, further comprising instructions for performing the steps of reading the image data from the image storage device, demultiplexing the image data into data representing at least a first and a second concurrent and registered image, and displaying concurrently the at least first and second registered image.

In accordance with yet another aspect of the present invention, a system is provided, further comprising instructions for processing the data of the at least first and second image for display on a single display as a single registered image.

In accordance with yet another aspect of the present invention, a system is provided, further comprising instructions for processing the data of the at least first and second image for display on at least a first and second display to provide a registered image of a scene recorded by the at least first and second image.

In accordance with yet another aspect of the present invention, a system is provided, wherein the camera is part of a mobile phone.

DESCRIPTION OF A PREFERRED EMBODIMENT

Figure 1:
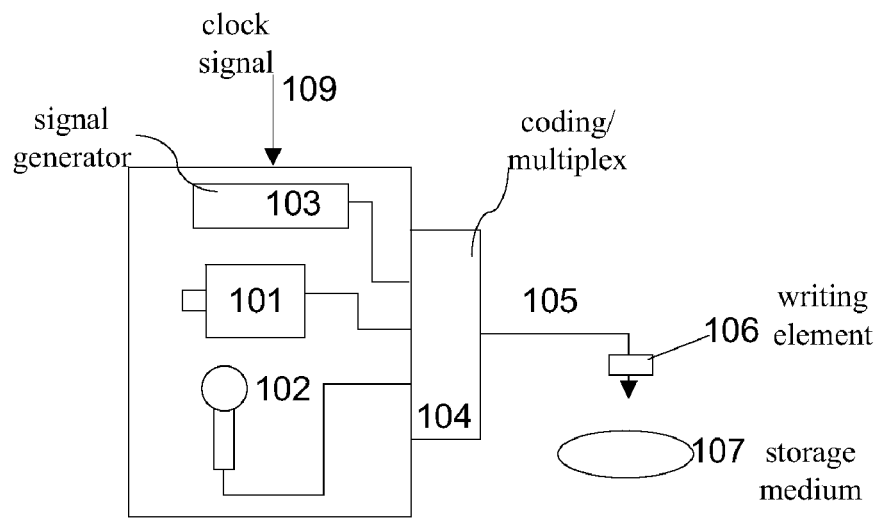
FIG. 1 is a diagram of a known way to create a video program.

The storage of a digital image such as a static image or a video program on a storage medium is known. A video program may contain a black/white or color video signal, audio signals (mono, stereo or a plurality of audio signals), electronic signals which may include but is not limited to subtitles, date and time information or any other required information. The video and/or audio signals may be in analog form, they may be in analog form and being converted to digital signals, which are commonly binary signals. These signals may also be digital signals provided by camera and/or audio equipment. These signals are usually combined in a frame and stored on a storage medium such as an optical disk such as a DVD disk. Intermediate steps may include signal compression, for instance according to known compression techniques such as the MPEG 2 standard. Certain modulation techniques and coding techniques may also be applied, such as error correcting coding, scrambling, and modulation techniques such as Pulse Code Modulation, Pulse Amplitude Modulation, Pulse Position Modulation, QAM coding or any other modulation technique. Signals may be added, for instance, frame and synchronization information or any other information that is required to store the signal on a storage medium and that allows the complete information to be recovered.

In order to allow appropriate retrieval and display or playing of the video, audio and electronic signals using one pick-up mechanism such as a laser in the illustrative example of an optical disk, all signals are sampled at certain intervals and combined in a sample frame that may consist of interleaved of multiplexed signals. When the sampling of signals and their recovery and playing are in accordance with the known sampling theorem, then a replay signal may be formed from the samples that appear to be a good or perfect copy of the original signal. The sampling of signals and creating a combined serialized frame of video, audio, and/or electronic samples is called serializing, interleaving or multiplexing of a signal. An example of creating such an interleaved video program signal can be stored on for instance a video disk is provided in U.S. Pat. No. 4,782,402, issued on Nov. 1, 1988 to Kanamaru which is incorporated herein by reference in its entirety.

In a player of a video program from a storage medium a signal will be read from, for instance, an optical or magnetic disk or mass memory for instance as a series of digital symbols. These serialized symbols are usually set in a frame, having samples of a video signal and possibly audio signals and other electronic signals. A player has to deserialize or recover the stream of symbols in accordance with the proper samples, apply any required demodulation, decoding or decompression as required in an order that is required, and re-constitute a presentation of the audio and video signals that is appropriate for a user. Deserializing is known. A description may be found in for instance in U.S. Pat. No. 6,282,320, issued on Aug. 28, 2001 to Hasegawa et al. which is incorporated herein by reference in its entirety. Digital signal processing, including for use on DVD disks is provided in U.S. Pat. No. 6,574,417, issued on Jun. 3, 2003 to Lin et al. which is incorporated herein by reference in its entirety.

Information streams may be formed from different sources. Different electronic sources and formats including video broadcast formats are described in U.S. Pat. No. 7,020,888, issued on Mar. 28, 2006 to Reynolds et al. which is incorporated herein by reference in its entirety.

There are several known ways to code a video signal into a digital signal which is generally a binary signal. Presently, a video signal may be generated from an optical image sensor of which a full video screen comprises a matrix of pixels or pixel elements. Each pixel is coded for instance according to a palette, a RGB, a CMYK or any other color scheme that is appropriate. A frame or a screen, which may be interlaced, has for instance 1920×1080 color pixels which are displayed at a rate of about 25 or 30 or 50 or 60 screens or frames per second.

A number of pixels may determine a resolution of a video signal. The frame rate determines how humans perceive individual static images as a full moving image. In order to perceive a series of discrete images comprised of pixels as a movie each 1/24th second a full frame may have to be shown. This also means that between providing two consecutive frames there is at least 1/24 second available to do other things. It does not mean that the 1/24 second has to be used to transmit the full frame. Theoretically, that can be done in for instance a 1/10,000 of a second. This principle of assigning time slots to a sample of a signal, which may be a video signal is known as Time Division Multiplex or TDM. The replaying of a signal without significant loss of information is explained by the known sampling theorem, which states that a sampling frequency should be twice the highest frequency of a signal that one wants to capture in samples. This usually leads to sampling by for instance pulse amplitude modulation. An amplitude of a sample may be coded in for instance a word of binary symbols or of n-valued symbols having one of 3 or more states.

Storage media for video signals are known, for instance as DVD disk, magnetic disk and a mass memory For a DVD disk a video signal is sampled and provided as a stream of usually binary signals, it is multiplexed with additional binary audio and possibly other signals and written on a medium such as an optical DVD disk. A combined multiplexed signal may be called a program. A DVD disk may be played by a DVD player where the signal is read from the disk where video and audio signals are separated and provided to their respective players. It is necessary to keep signals synchronized. While a DVD disk is mentioned as a storage medium, a magnetic disk, a tape or a memory such as flash memory or RAM or ROM memory or any other medium that can store a large amount of data can serve as a video program storage medium.

A video program usually contains two components: a video signal and an audio signal. An audio signal may be one or more channels of audio. Increasingly, a third electronic signal is added, which may contain displayable information, such as for instance a subtitle that may be synchronous with the audio. Other electronic information may also be added, such as audio commentary, menu information, track information or any other information that one may want to combine with a video signal. For all these signals the sampling theorem may apply.

In general, one would like to display all information in a manner that is synchronous to the video signal. So, if a person is seen speaking inside a video image one would like to have the audio being synchronous. One would also like subtitles to be synchronous to events in the picture.

One way to assure that all signals will be available at the appropriate time is to digitize the signals and multiplex the signals in TDM and write the composite TDM signal to the storage medium. This is shown in diagram in FIG. 1. A camera 101 provides a video signal. A microphone 102 provides an audio signal. And a signal generator 103 provides an electronic signal that represents, for instance, subtitles. Each unit 101, 102 and 103 may provide more than one signal. For instance, camera 101 may be 2 or more cameras which may generate a composite image. A camera may be a video camera. It may also be a thermal sensor or any other sensor that can register moving images. An audio signal may be a single channel. It may also be a stereo signal. It may also be a surround sound signal having more than 2 channels. The electronic signal may also contain a plurality of information channel such as subtitles and menus. The purpose is to create at least a single serialized signal that can be written on a storage medium.

The terms multiplex, multiplexing, multiplexer, demultiplexed, demultiplexing and demultiplexer all refer to time division multiplexing or time division demultiplexing unless specifically being identified as not being so.

All apparatuses provide signals to a coding/multiplex unit 104. Each signal may already be a digital signal. If a signal is analog it will be digitized by 104. The unit 104 may be provided with an external signal 109 that contains at least one clock signal to which the processing of all signals will be synchronized. The clock signal is provided to the coding/multiplexing unit to control the multiplexer. The multiplexer assures that digital signals representing a signal sample are put in a serialized frame for an appropriate time slot. After passing of the time-slot (which may be determined by the clock signal) the multiplexer switches to another signal for inserting its sample into a serialized digital signal 105. The unit 104 in general, and as is known in the art, may provide other functions, such as: compression of for instance the video signal according to a known scheme such as MPEG-2. The unit 104 may also scramble the signal. It may also provide a block of digital signals with error correction capabilities. Furthermore, the multiplexer may insert synchronization symbols and other symbols that are used for correct recovery of the multiplexed signal. After multiplexing and coding a serialized digital signal is provided to a writing element 106 that will write the signal to a medium 107. The writing element may provide modulation of the signal. Modulation may also be provided by 104.

Ultimately, a video program or part of a video program may be written to a medium 107 that may be played in a player. The writing of a signal may be done at very low speeds. It may also be done at very high speeds. The speed of the writing process may be unrelated to the reading or playing of a signal from the medium. The reading speed, if it is used for displaying a video program, may again determined by the sampling theorem. The process of multiplexing is also known as interleaving. There are different known interleaving schemes.

Figure 2:
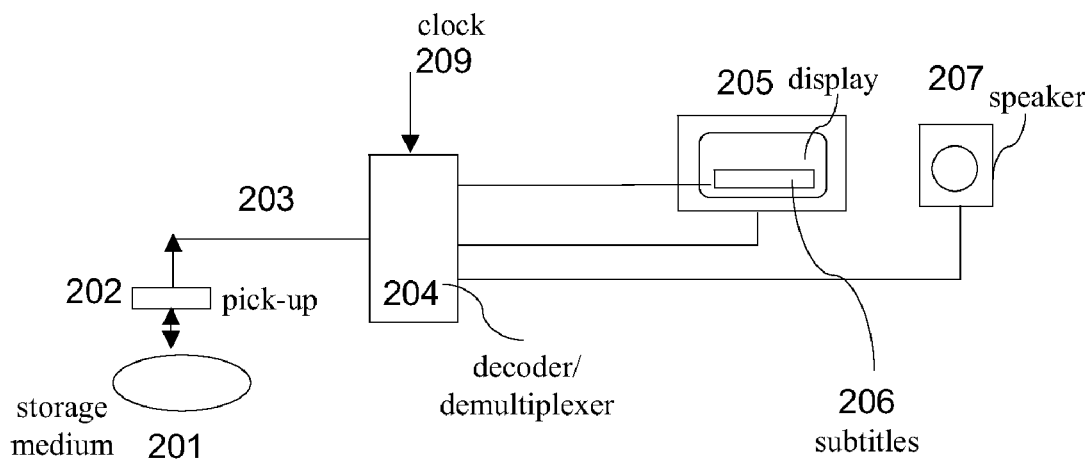
FIG. 2 illustrates a known way to play a video program.

FIG. 2 shows that a medium which contains a serialized signal representing a program or part of a program can be played by a player. A pick-up or reader 202 reads a serialized signal from the medium 201. The pick-up unit may provide additional functionality such as amplification and demodulation. However, these functions may also be provided by a unit 204 that may be a decoder/de-multiplexer unit 204. The pick-up provides a signal 203 to the decoder/de-multiplexer 204 where the signal may be error corrected or otherwise decoded and descrambled if required. The de-multiplexer has the capability to recognize positions in the serialized signal, for instance based on synchronization information that was inserted. The de-multiplexer then passes the correct samples for the correct display to the correct output channels. The de-multiplexer may work off an external signal 209 which may contain a clock signal. A clock signal may also be derived from the signal 203.

Other steps may be involved in playing a sampled signal. One such step may be Digital/Analog conversion (D/A). One other step may be low pass filtering. These and other steps are generally known and need no explanation herein.

The decoder/de-multiplexer then provides the correct video signals to a video display 205. Audio signals may be provided to one or more audio speakers 207. Correct signals such as subtitles may be inserted on the display for instance at a position 206.

Variations on the above scheme are known. However, all have the same approach that a plurality of signals representing different aspects of a program are digitized and combined into a serialized signal on a storage medium. The serialized signal for playback is read from the medium, de-serialized or de-multiplexed and its component signals are provided to the correct display. Video signals are de-compressed if they were compressed. The required D/A conversion may take place in 204 or in the display apparatus.

The constraint in correct playback is that the samples have to be outputted to a D/A converter with the correct speed. This usually translates back to that the storage medium has to be read at a defined speed. For a DVD disk the reading speed may be an equivalent bitrate of about 10 Mbit/sec. For a HDTV disk the reading speed may be about 30 Mbit/sec.

For correct playback the sampling theorem determines how many samples per second should be generated. The resolution of a signal (and thus the coding of a pixel) determines how much information or bits a sample contains. The sampling rate is related to the highest frequency that one still wants to recover without aliasing. This frequency is known as the Nyquist frequency or Nyquist rate which should at least be twice the highest frequency component of the signal that is sampled.

The duration of a program on a storage medium nay thus be a compromise determined by the storage capacity of the disk, the required reading speed and the resolution of the signal. A video program may be around 120 minutes, including extras. A disk has a certain capacity, say 4 Gigabytes. This determines about the quality that can be achieved if one can read at a speed of about 10 Mbit/sec.

One may increase the storage capacity of a medium such as a DVD disk, for instance by using smaller features and by using a blue laser. By increasing the reading speed to 30 Mbit/sec one may increase the quality of the signal to HDTV quality.

Currently the trend is to create higher capacity media with higher reading speeds in order to provide higher quality display like HDTV quality.

Higher capacity disk allows for storage of more programs on a disk. However, these programs are usually stored and read in a sequential manner. That means that for instance two or more video programs may be stored on a storage medium. However, in general, the two video programs are not stored in an interleaved manner. Furthermore, a program is read from a disk with a speed that is set for displaying a single program. To play a second program the reading mechanism has to go to the storage location (or address) of the second program. Without a second reading mechanism it is physically impossible to read two or more programs from substantially different locations on a medium without some interruption for switching of addresses or locations. While electronically this may be faster than mechanically, it still requires usually too much time to be able to show different programs at the same time within the bounds of the sampling theorem to provide a plurality of High Definition programs at the same time.

In accordance with one aspect a method and a system will be provided that displays two or more video programs concurrently (including video and sound and potentially informational electronic signals) by reading a signal from a storage medium. A storage medium may be a magnetic hard disk, a magnetic tape, an optical disk, a memory based medium using memory cells such as flash memory, or any other medium that can store massive amounts of data and the data can be read from a medium at a pre-determined speed.

The method and system in accordance with a further aspect of the present invention, applies Time Division Multiplexing and multiplexing of different program signals into at least one sequential signal, which contains signals from different programs. at least two programs being video programs.

It should be clear that the recording of a TDM signal may be done at any speed of recording. However, the playback of the signals for replay at proper speed and quality should comply with the sampling theorem. For a video signal that is recovered from a composite TDM signal that means that at what is considered common display speed a new video frame should be available each $1/24$th or $1/25$ or $1/30^{th}$ or $1/50^{th}$ or $1/60^{th}$ of a second, or any other appropriate speed depending what kind of display method is applied. One may record a screen frame for display at higher speeds for instance, for making a displayed video signal appear to be stable and flicker free. However, other means may also be applied to make a video display to be flicker free. For instance, one may buffer a complete single screen for a single frame period. Usually interlacing effects affect the noticing of flicker in a video display.

It will be assumed herein that a video program will be stored in such a way that it can be recovered and played at least acceptable display frame speed.

Figure 3:
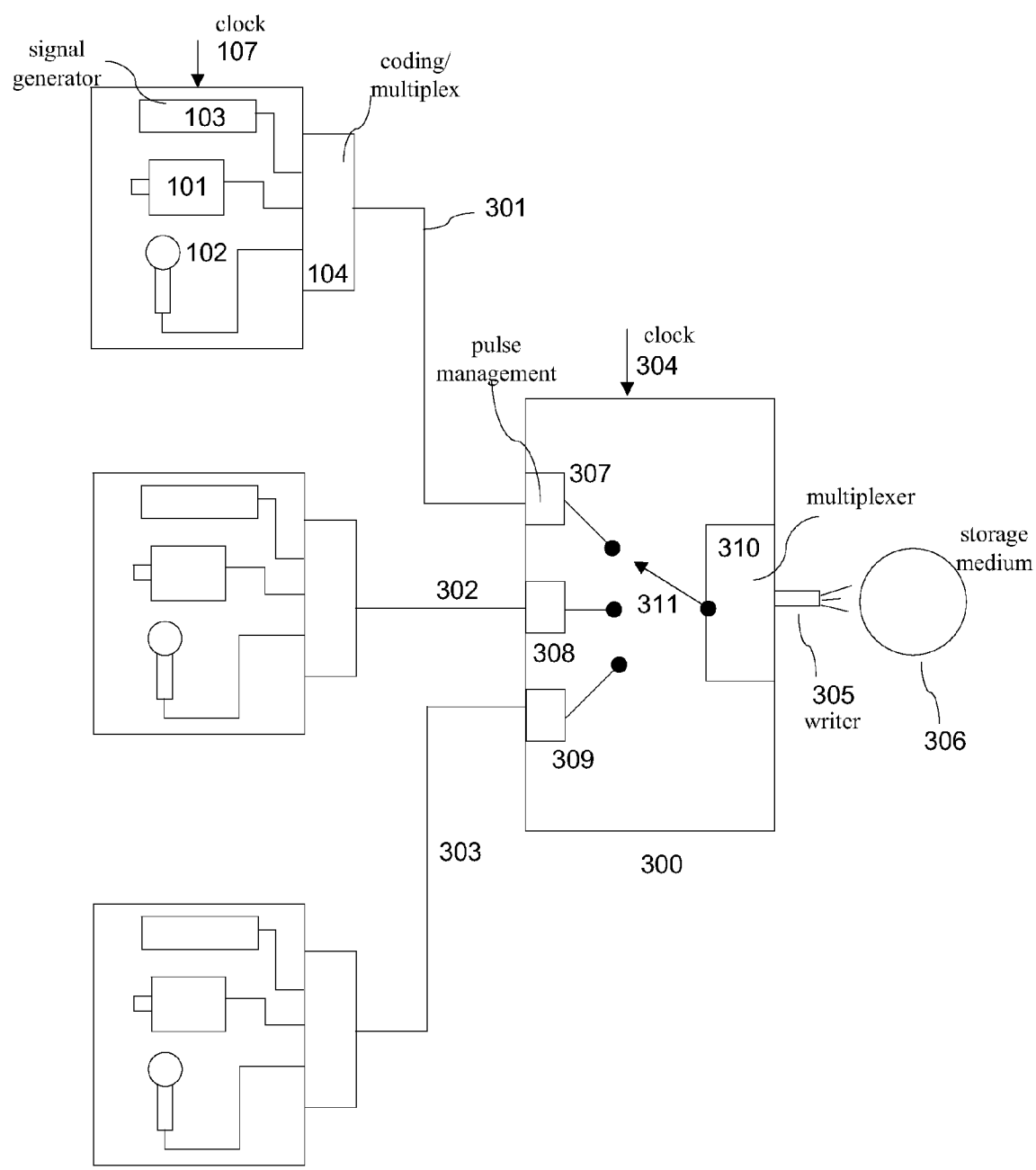
FIG. 3 illustrates the creation of a multiplexed signal on a storage medium in accordance with an aspect of the present invention.

An illustrative example of one aspect of the present invention is provided in FIG. 3. Herein, 3 video programs are generated using, for instance, the method or system as shown in FIG. 1. It is to be understood that there can also be 2 programs generated. There can also be more than 3 programs generated. FIG. 3 shows three program signals 310, 302 and 303 being made available. These signals may be digital signals. These signals may be ready or almost ready to be written to a storage medium or a memory. The signals may also be an analog signal, which are required to be digitized. The signals 301, 302 and will be provided to a multiplexer 303. Assume that each of the video program signals represents an information transfer rate of for instance 10 Mbit/sec, which is about the transfer rate for a video program on a DVD disk.

The sampling theorem requires that in a time slot which transfers at least one program frame for instance per '1/a' sec wherein 'a' may be 24, after being multiplexed now requires to contain to contain at least 3 (different) program frames. This requires at least an outgoing transfer rate of 30 Mbit/sec in the example of FIG. 3. The rate will probably be higher as the multiplexer may add some house-keeping signals, for instance for synchronization and separation of signals belonging to different frames. Because one may want to write the multiplexed signal of combined video programs on a storage medium or memory 306, some form of error correcting coding may be required, which will increase the number of symbols in the multiplex signal. One may also scramble the multiplexed signal before it is written to storage medium or memory, for instance with a Linear Feedback Shift Register (LFSR) scrambler.

Figure 7:
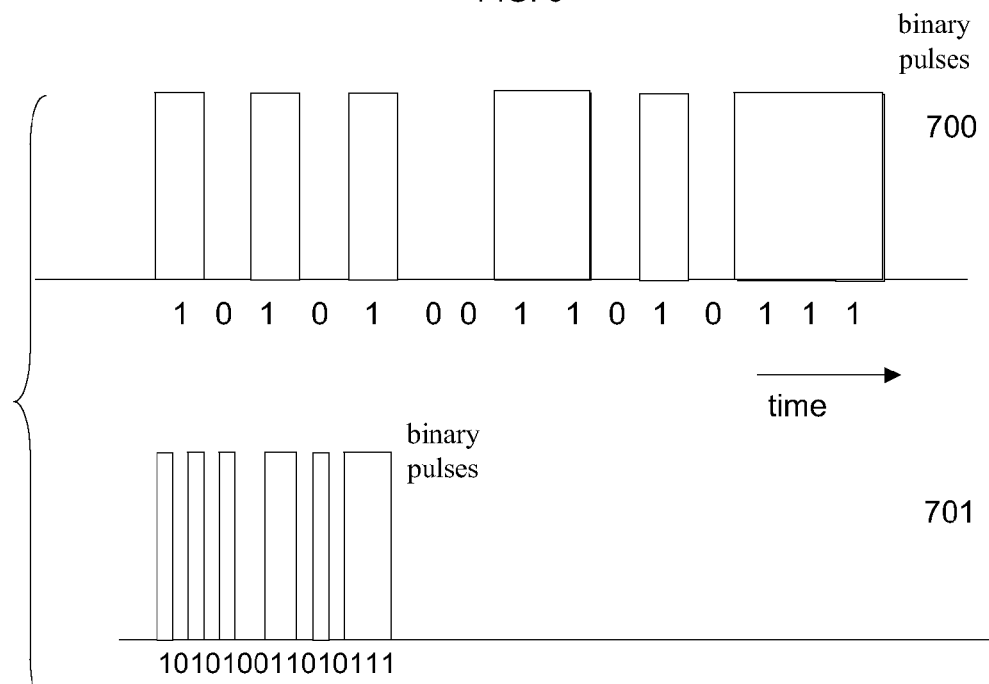
FIG. 7 illustrates time reduction in multiplexed signals.

Because of the multiplexing, (also called serializing or interleaving) one second worth of signal now contains at least 30 Mbits, while an individual video program has about 10 Mbits if the video program is not in High Definition. Accordingly, the multiplexed signal has at least 3 times as many bits. This has as a consequence that the 1 second of individual program now only has at most $1/3$ of a second available. This then means that the signal of an individual video program has to be reshaped to fit in its allotted time slot. This may have as a consequence that pulses have to be narrowed to make room for the additional pulses. The pulse compression is demonstrated in FIG. 7. FIG. 7 shows a diagram 700 of a series of binary pulses representing [1 0 1 0 1 0 0 1 1 0 1 0 1 1 1] in a time coordinate. FIG. 7 shows in 701 a curve representing the same binary data represented in a signal using the same time coordinate. The duration of each pulse in 701 has been reduced to about $1/3$ of its original duration in 700. It is easy to see that enough room has been created to insert additional pulses.

It is not necessary to interleave whole frames, for instance by first inserting frame 1 of signal 301 of FIG. 3, followed by frame 1 of signal 302 and then by frame 1 of signal 303, followed by frame 2 of each signal, etc. One may interleave part of a frame, even up to the individual bits as long as one frame per required frame time can be reconstructed.

This preparing the individual signals for time multiplexing, which may involve buffering, pulse shaping and releasing of the pulses at the right time is done by pulse management units 307, 308 and 309 for each signal 301, 302 and 303. If provided, signals are analog signals the units may also take care of A/D conversion. The pulse management function may also be performed by the multiplexer unit 310. The multiplexer switch 311 may sample the pulses provided at the right time at the output of units 307, 308 and 309. These units 307, 308 and 309 may be part of a coding/multiplexing unit 300. It should be clear that timing of the signals and pulses is important. An external clock signal 304 is provided to assist in controlling the timing.

The multiplexer is schematically shown inside 300. Each pulse management unit may provide a pulse already in the correct timing slot. When the switch 311 is enabled for an output of a pulse management unit, a pulse (or the absence thereof) is connected to the multiplexer unit 310. The switch may remain in a position for one or more pulses. After that time it switches to the output of the next pulse management unit, etc. This then creates a serialized series of pulses inside the multiplexing unit 310.

The multiplex switch 311 is depicted in such a way that it may look like a mechanical switch. A binary multiplex switch is known and in general is an electronic switch that achieves extremely fast switching speeds.

The unit 310 may add additional bits for synchronization and it may perform an error correcting coding such as a Reed Solomon code and provide for instance scrambling of the signal. Other services may also be provided. For instance, pulse shaping and coding to alleviate effects of inter-symbol-interference. The unit outputs a serialized binary signal that is provided to a writing unit 305. The writing unit 305 may for instance create an optical signal that is written to an optical storage disk 306. The writing unit may also create a magnetic or an electromagnetic signal that is written to a magnetic disk 306. The writing unit 305 may also be a digital memory writing unit that writes binary elements to a memory unit 306. The writing unit 305 may be any writing unit that modulates or modifies a signal to write it to a storage medium or memory 306.

The writing unit 305 and storage/memory medium 306 may be in different locations and may be connected wirelessly. In that case 305 may include a modulator, a transmitter and possibly an antenna. Memory/storage medium or unit 306 in that case may also have an antenna, a receiver and a demodulator, before writing a serialized signal comprising a multiple of programs, including a video program, onto a storage or memory medium.

For instance, 306 may be a mobile phone or a mobile computing device which receives a serialized signal that contains a multiple of video programs (at least two) which will be at least partly stored.

Because the signals 301, 302 and 303 are generated real-time by at least a camera, the system of FIG. 3 has to work real-time. One way this system can work slower than real-time is if there are significant buffers inside units 307, 308 and 309.

The signals 301, 302 and 303 may reach the processing unit 300 through a wired connection. The signals may reach the processing unit also through a wireless connection. In that case, a wireless receiver and, if necessary, decoder may be assumed to be included with 300, even if it is not shown as a separate unit.

Figure 4:
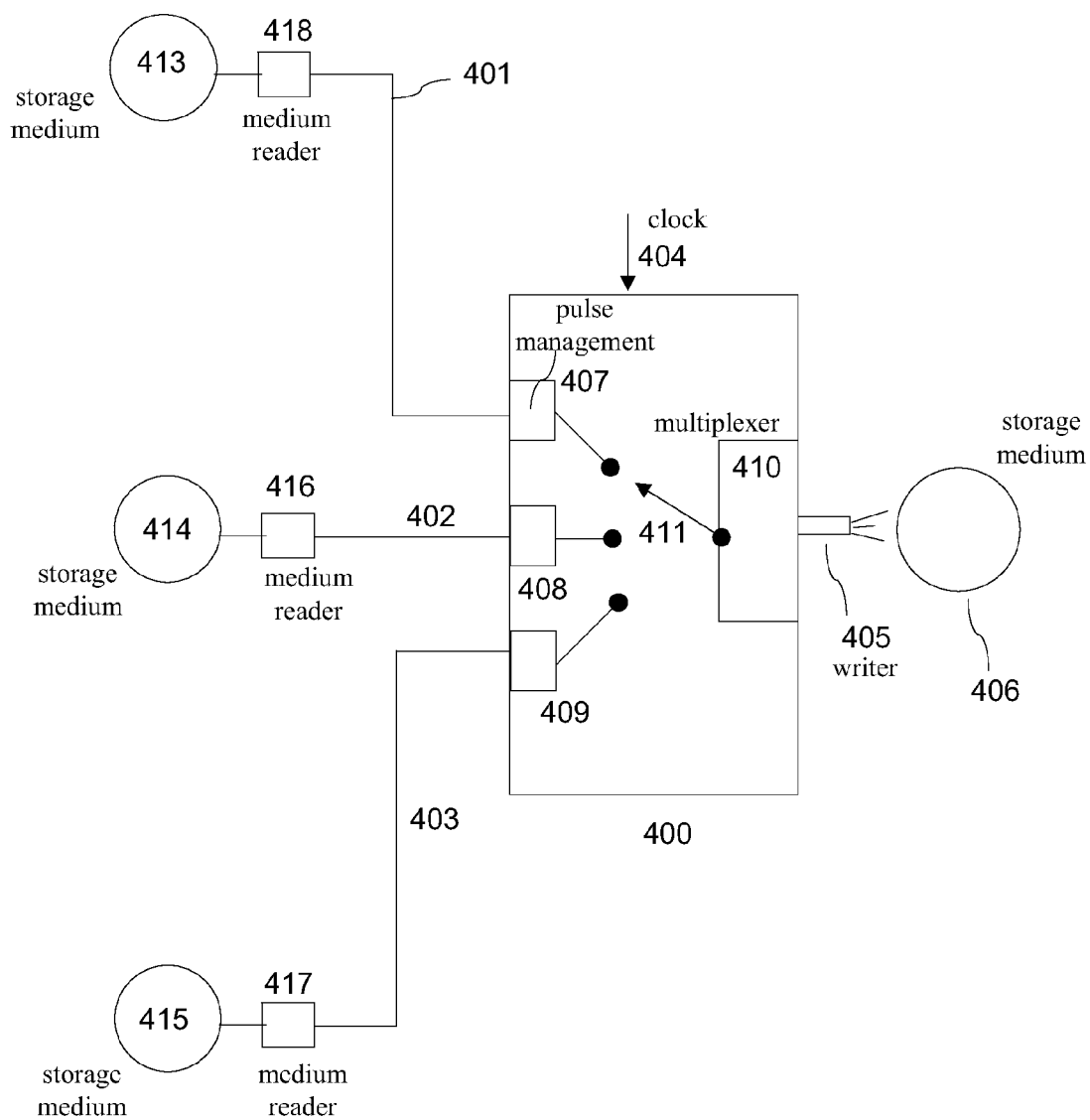
FIG. 4 illustrates the creation of a multiplexed signal on a storage medium in accordance with another aspect of the present invention.

A system like FIG. 3 may be used if signals are generated and multiplexed in real-time. It may also be that a signal is created from other stored signals. This is shown in FIG. 4. This system for illustrative purposes has 3 sources 413, 414 and 415 with stored digital information, which may be video programs. A source may be a storage medium or a memory. Each source has a reader in this case 418, 416 and 417 which generates a signal, 401, 402 and 403 respectively. Such a generated signal is preferably a digital signal. However, it may also be an analog signal which may undergo an Analog/Digital (A/D) conversion in a multiplex/coding unit 400. Signals 401, 402 and 403 are provided to respective pulse management units 407, 408 and 409 as part of 400. The signals are shaped and multiplexed by a switch or multiplexer 411 and processed by a multiplexing/coding unit 410. An external clock signal 404 may also be provided. A serialized signal is then provided to a writer 405 and a serialized signal is stored on 406. Basically, the same configurations, connections and implementations as in the system of FIG. 3 are provided as an aspect of the present invention. The system of FIG. 4 also has the capability to multiplex, code and write not in real-time. The multiplexing/coding/writing process may happen slower or it may happen faster. Because the signals that need to be multiplexed are available in stored form, the slowing down or speeding up is now only a matter of synchronizing all components with each other.

Figure 3A:
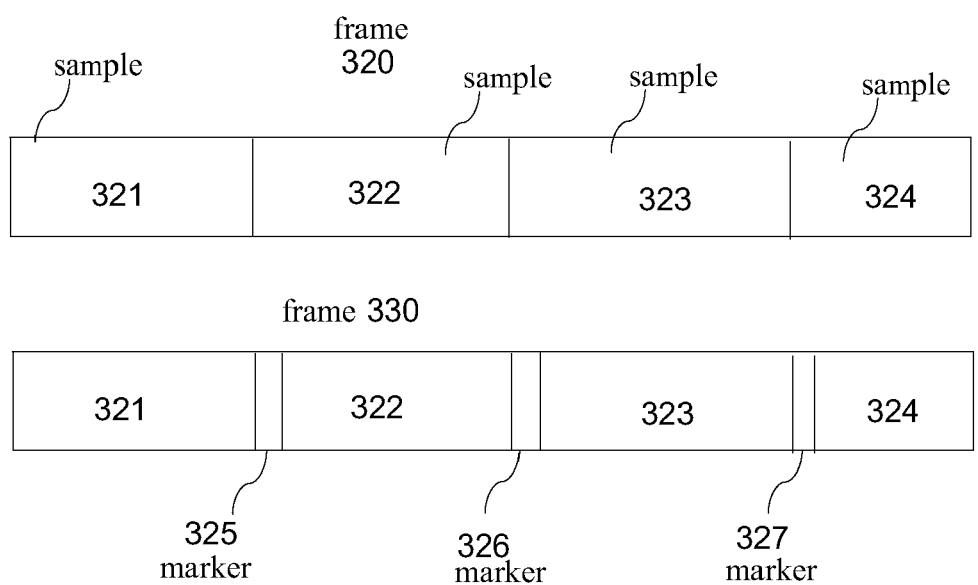
FIG. 3a is a diagram of a two possible frames of a multiplexed signal.

FIG. 3a. is a diagram of a possible time division multiplex frame. Complying with the sampling theorem and the Nyquist sampling speed, digital representations of signal samples are interleaved and organized in a frame. For instance, a frame may be a frame 320. Herein, 321 may be a representation of a sample of signal 301 in FIG. 3; 322 may be a representation of a sample of signal 302 in FIG. 3; 323 may be a representation of a sample of signal 303 in FIG. 3; and 324 may be a representation of another sample of signal 301 in FIG. 3. Frame 320 in FIG. 3a only shows digital representations of samples of the signals. Frame 330 in FIG. 3a also shows marks 325, 326 and 327 inserted between the samples. These may be helpful during for instance demultiplexing. Different frames and coding methods for time division multiplexing are possible and are fully contemplated.

Figure 5:
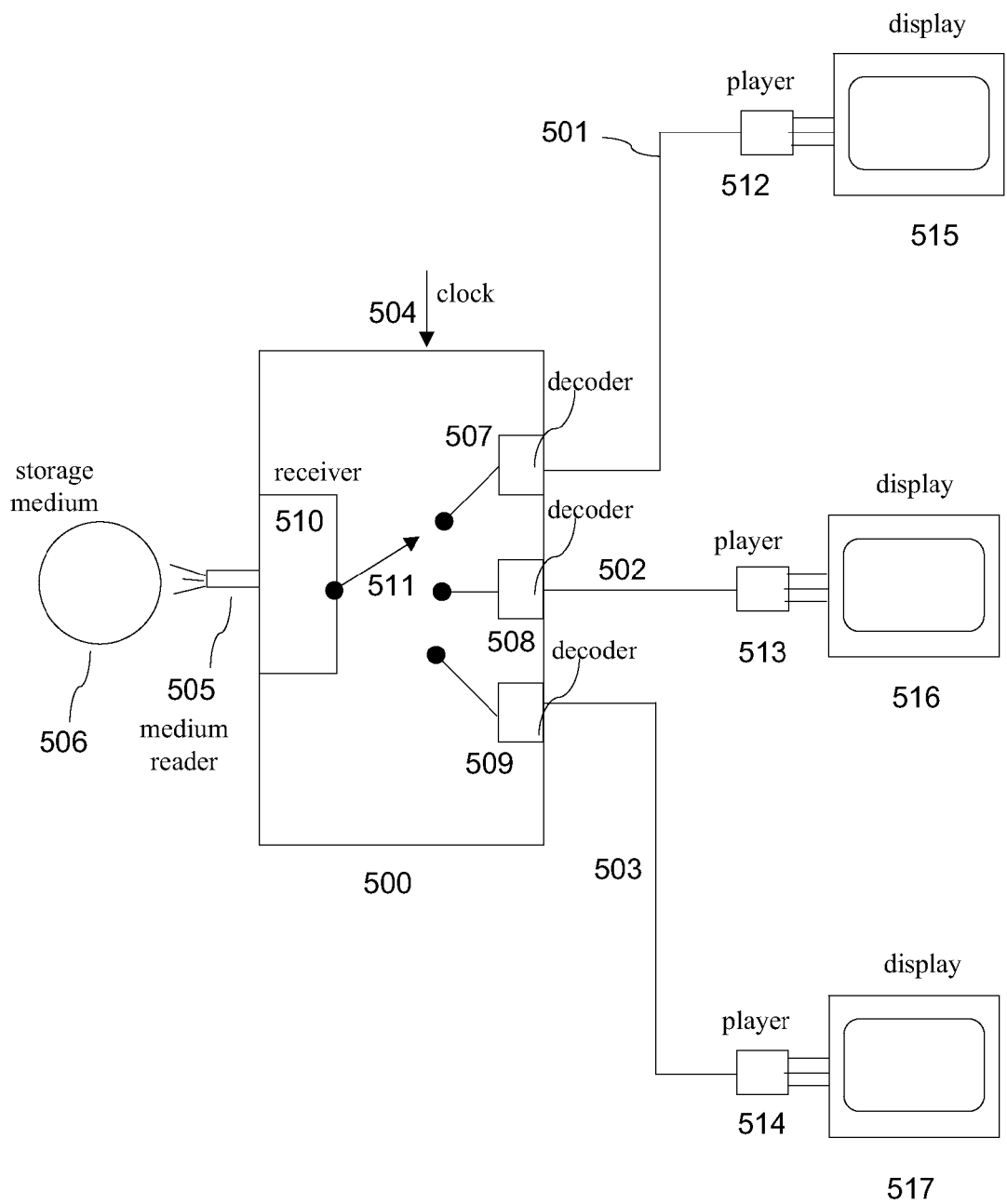
FIG. 5 illustrates the demultiplexing of a multiplexed signal on a storage medium in accordance with an aspect of the present invention.

FIG. 5 shows a diagram of a player in accordance with an aspect of the present invention. A multiplexed or serialized signal is stored on a readable storage medium or memory 506. This may be an optical disk, a magnetic disk, a magnetic tape, a magneto-optical tape, a memory device such as a mass memory such as a flash memory. Medium 506 may be any storage or memory device that is readable and can store a multiplexed or serialized signal which contains 2 or more programs, which may be audio programs, video programs, games, text, images or any program that is individually playable on a player. In the example of FIG. 5 three multiplexed programs are stored on the medium 506.

The medium 506 is read by a reader 505. It should be clear that the reader should be able to read the medium at a speed that complies with the sampling theorem if the video signals are to be displayed. If the three serialized programs are video programs and the medium is for instance an optical disk, then the reading speed or at least the transfer rate from medium to decoder/demultiplexer 500 should be at least 3 times as fast as the transfer speed of an individual program, if one wants to play the programs in real-time.

If an individual program requires a transfer rate of 10 Mbit/sec then in case of 3 similar programs multiplexed in a serialized signal may require a transfer speed of at least 30 Mbit/sec. This higher transfer speed translates in the case of an optical disk in a faster "emptying" of the optical disk of information.

The reader 505 provides a signal to a receiver unit 510 that may receive, demodulate, amplify, reconstruct, error correcting decode and descramble the incoming signal. It may do one, some or all of these activities. The next step is to demultiplex or deserialize the serialized or multiplexed signal. The demultiplexer may look for a synchronization mark to find a start position, and other marks that indicate to which frame of program one or more bits belong. This information, potentially assisted by an external clock signal 504, or by a clock signal that is extracted from for instance the serialized signal will help control a demultiplexer 511 that may conduct the appropriate signals belonging to a program to a decoder unit 507, 508 or 509, belonging respectively to a program signal 501, 502 or 503. Decoder units may be omitted, or may be part of an individual player unit. Decoder units 507, 508 and 509 may also arrange received and multiplexed signal in their appropriate time slot and make sure that the demultiplexed bits correctly represent a frame of a program wherein the appropriate series of bits will be recognized as video pixels, audio samples or electronic signals. Signals 501, 502 and 503 still may be multiplexed signals, but now containing only samples belonging to one program. Signals 501, 502 and 503 are then provided to respective receivers 512, 513 and 514. These are receivers such as DVD players which will extract the correct video, audio and electronic signals. They may perform functions such as error correction, decompression and the like. Each player will then provide an appropriate signal, which may be a video, audio or electronic signal such as a subtitle signal to a respective display 515, 516 and 517. Three lines between player and a display indicate a plurality of signals between player and display. A display is assumed to have a video screen, an audio display with one or more loud speakers and a facility to insert the additional signal such as subtitles into the video display.

In accordance with an aspect of the present invention, one may now play two or more different programs which may be video programs from one serialized signal, which may be read from an optical disk. It should be clear that the use of three serialized programs is provided as an illustrative example. One may store more than 3 programs on a disk. For instance audio programs require much less storage space. A transfer rate for digital audio is about 1.2 Mbit/sec. Accordingly, one may store about 24 multiplexed audio signals on an optical disk that has a transfer rate of 30 Mbit/sec.

Figure 6:
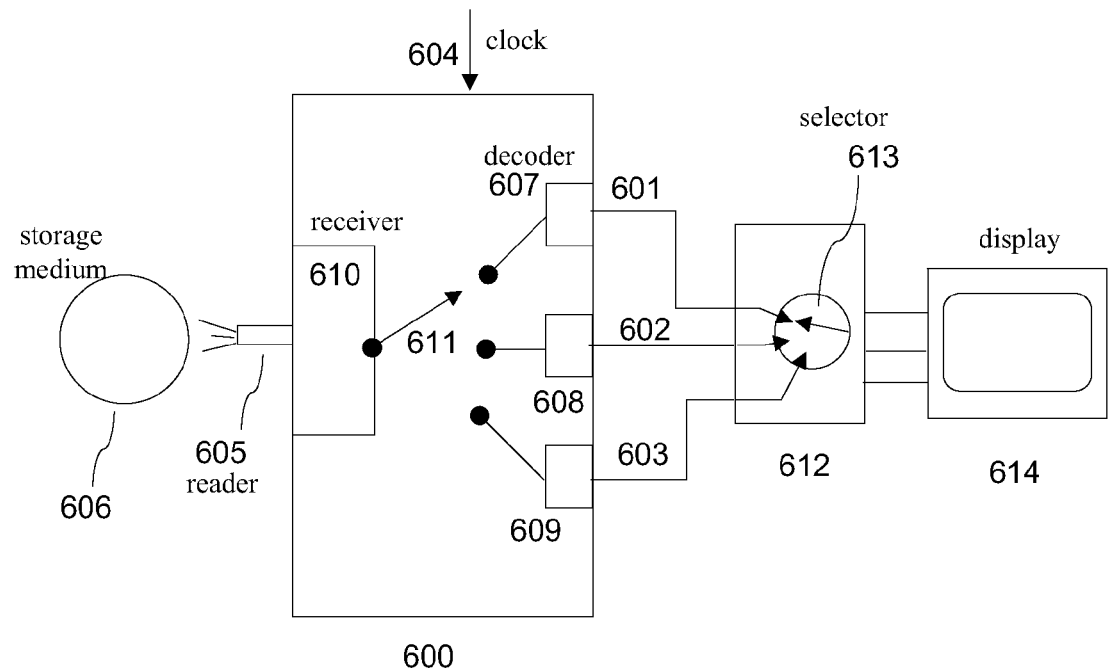
FIG. 6 illustrates the demultiplexing of a multiplexed signal on a storage medium in accordance with another aspect of the present invention.

It is not required to use an individual player for each deserialized program. This is shown in an illustrative example in diagram in FIG. 6. Most components are equivalent to the ones in FIG. 5. The system of FIG. 6 in accordance with an aspect of the present invention has a storage medium 606 with at least 2 multiplexed or serialized programs. In the example the number 3 is used but the number may also be 4, 5, 6 or higher. The system has a reader 605 that provides a signal to a receiver/decoder unit 610. The unit 610 provides he signal to a demultiplexing switch 611, possibly assisted by an external clock signal 604 and demultiplexes the serialized signal into 3 still multiplexed program signals containing only samples related to a specific program. The demultiplexed signal may be provided to a decoder unit for post-demultiplexing signal clean up in respective decoder units 607, 608 and 609, generating digital program signals 601, 602 and 603. These signals are provided to a receiver 612. The receiver 612 has the capability to extract the correct video, audio and electronic signal such as subtitles from each signal 601, 602 or 603 when selected by a selector 613. The receiver 612 may then decode only the selected signal and provide the three signals (video, audio and electronic such as subtitles if present) to a display 614.

There are many variations on the configurations of receivers and number of displays of which some in accordance with a further aspect of the present invention will also be provided.

Figure 8:
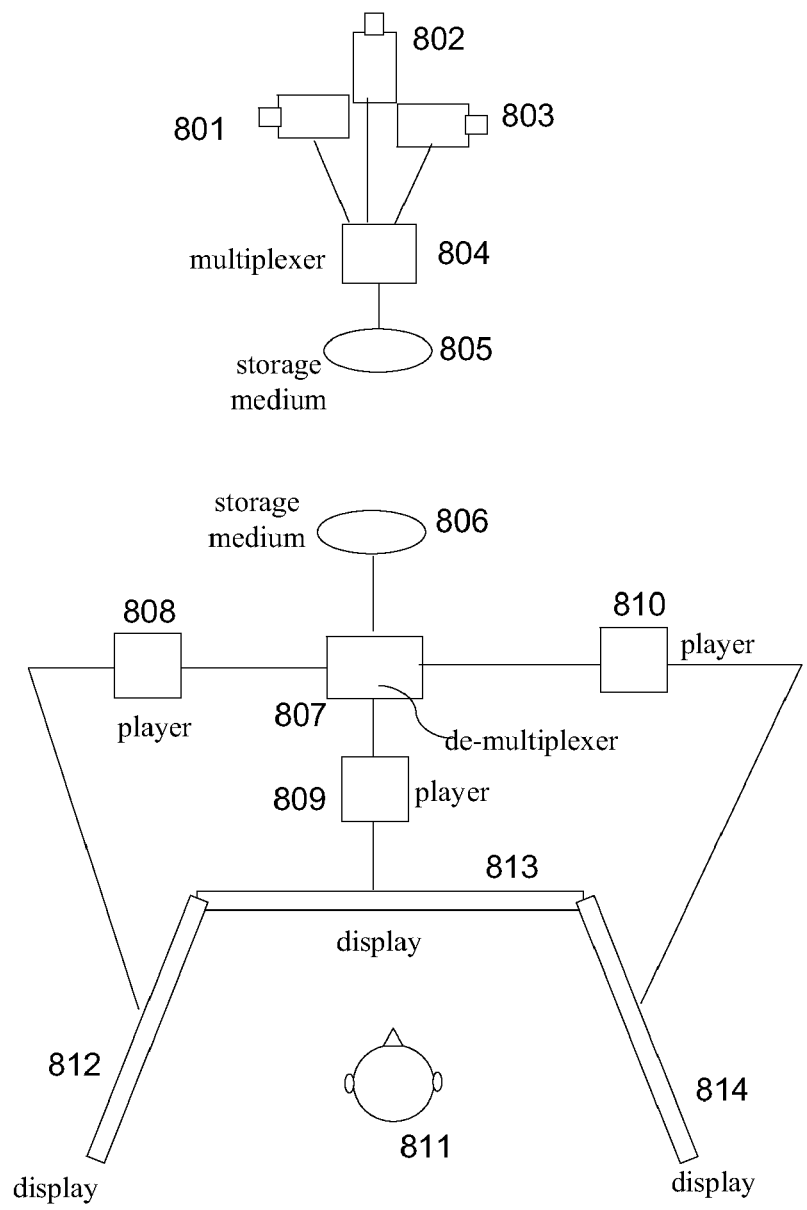
FIG. 8 illustrates a camera system and a display system in accordance with aspects of the present invention.

In one embodiment in accordance with an aspect of the present invention, FIG. 8 shows a configuration wherein as an illustrative example three cameras or three video sensors each having a corresponding lens 801, 802 and 803 are used to record a scene from different view points. The three video signals are multiplexed and recorded by a coder/multiplexing device 804 as provided earlier and the multiplexed signal is stored on a storage or memory medium 805.

The availability of 3 (or more) signals representing a scene viewed from different positions allows a display of video that offers an immersive experience. The medium 805 can be played in a medium player 806, which provides a multiplexed signal to a decoder/demultiplexer 807. The device 807 provides then 3 demultiplexed program signals, which have to be converted to a playable format by players 808, 809 and 810. Each of the players provides a signal to be displayed respectively by displays 812, 813 and 814. This allows a viewer or user 811 to be experiencing an immersive video and/or audio experience.

For illustrative purposes, only 3 signals were multiplexed and demultiplexed for display. It should be clear that also more (or fewer) signals can be used. For instance, one may create a system wherein a viewer is completely surrounded by displays such as video displays. For clarity the individual program players are shown as individual units. One may also combine the players with the decoder/demultiplexing unit 807, so that practically an immersive video, audio, or audio/video system may be provided as an integrated system. One may provide switches that switch on/off or selects one or more of the display to display a signal.

Figure 9:
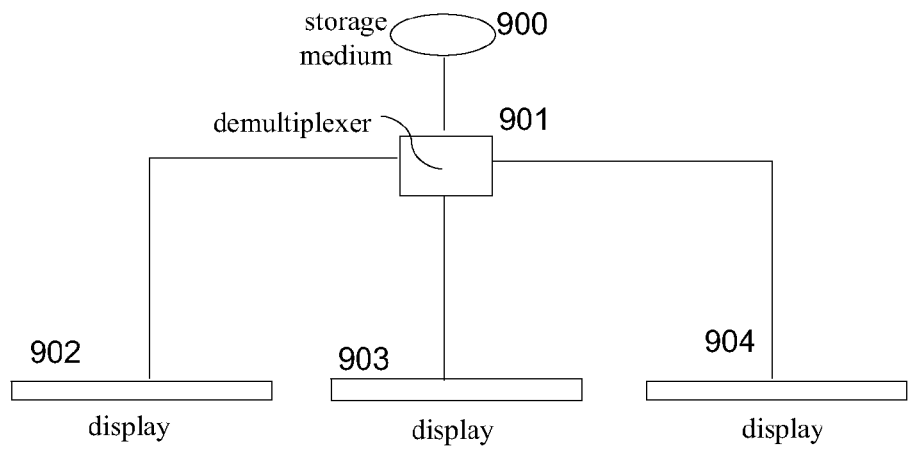
FIGS. 9-11 are diagrams of a system in accordance with different aspects of the present invention.

In accordance with a further embodiment of the present invention, FIG. 9 shows a system using multiple displays 902, 903 and 904. A storage or memory medium 900 contains a multiplexed signal which is decoded and demultiplexed by 901. In this case 901 also contains three players to play a program signal provide the signals to displays 902, 903 and 904. The players may also be provided and controlled individually, though not shown as such, such a configuration is fully contemplated. A viewer or user may thus view three programs at the same time. These programs may be related, they may also be unrelated. For instance, a viewer may review programs that were recorded at the same time and may try to find a relationship between the programs.

Figure 10:
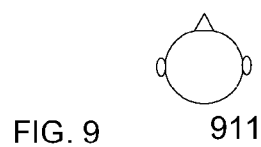
Figure 10:
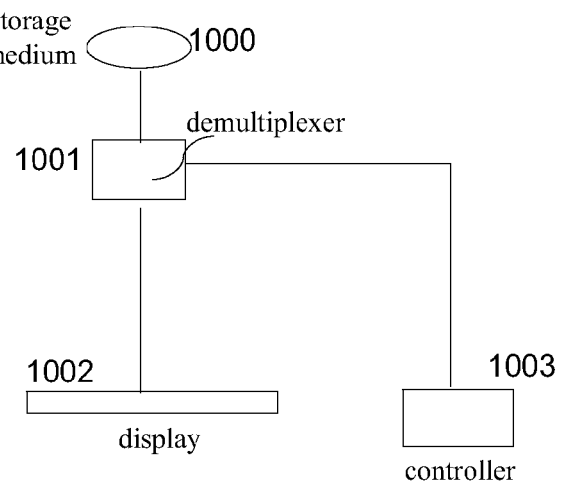
Figure 10:
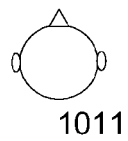

In accordance with a further embodiment of the present invention, FIG. 10 shows a diagram of a single display based demultiplexing system. Herein, a storage or memory medium 1000 provides a multiplexed signal to a decoder/demultiplexer 1001. The unit 1001 also includes a program player which provides a signal to a display 1002. The program player is provided with one of the demultiplexed signals based on a selected program. A program may be selected by a viewer/user 1011 by using a controller 1003. The controller provides a signal to a selector in 1001 that provides the selected program to the player and to a display 1002. The unit 1001 makes available all demultiplexed signals, but only the selected signal will be played. The viewer 1011 may switch almost instantaneously between programs.

Figure 11:
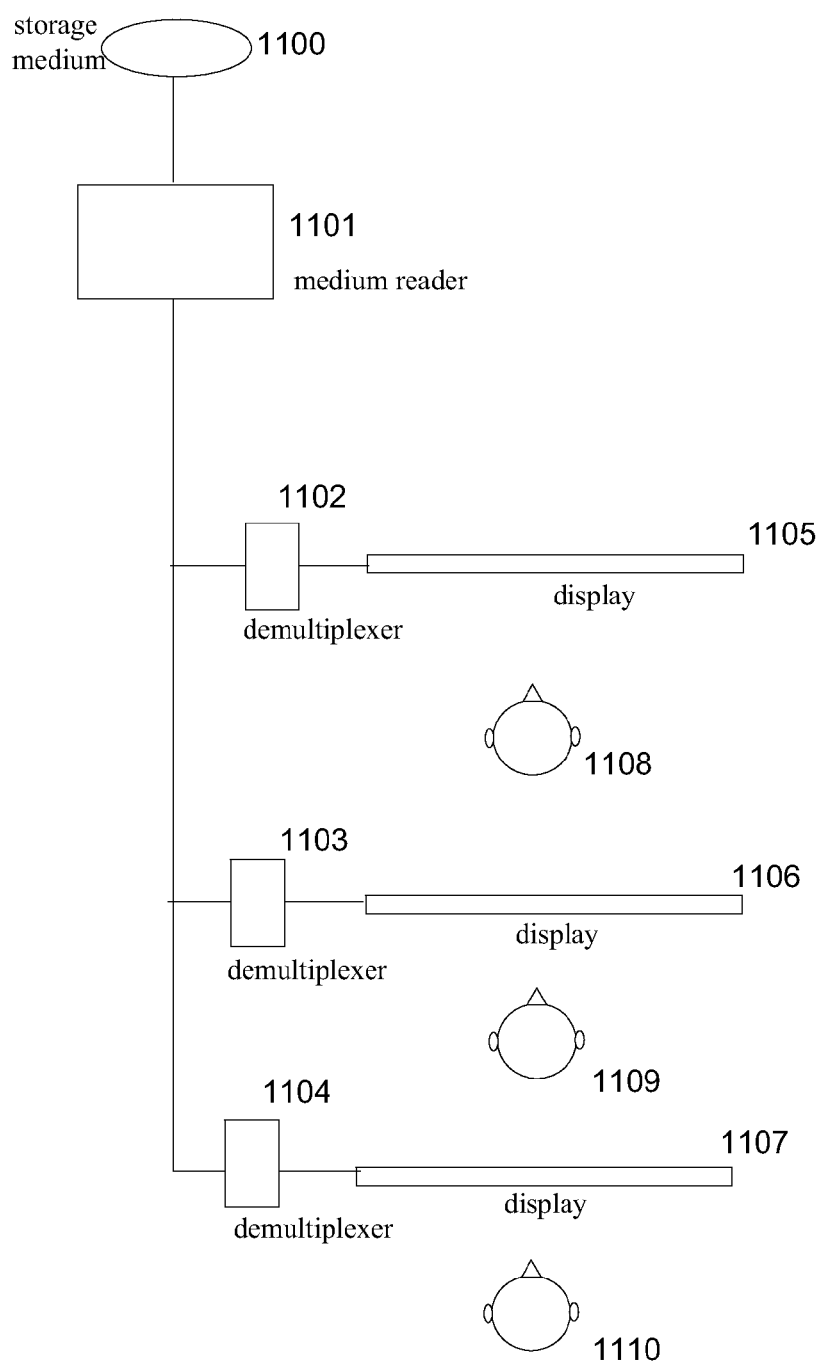

In accordance with a further embodiment of the present invention, FIG. 11 shows a diagram of a multiple display multiple user demultiplexing system. In the system of FIG. 11 also a single storage or memory element is provided with a multiplexed signal representing at least 2 programs, which may be video programs. In the illustrative example, 3 video programs are stored in a multiplexed way on a storage medium 1100. The multiplexed signal is read from 1100 by a reader 1101. The multiplexed signal in one embodiment is provided to 3 decoder/demultiplexer/player units 1102, 1103 and 1104 for users 1105, 1106 1107 respectively with displays 1105, 1106 and 1107. Each of the units 1102, 1103 and 1104 also contains a selector allowing to select a program to be played. Thus, the system as provided by FIG. 11 allows different users to play one of a set of programs to be played from a single storage medium provided.

Figure 12:
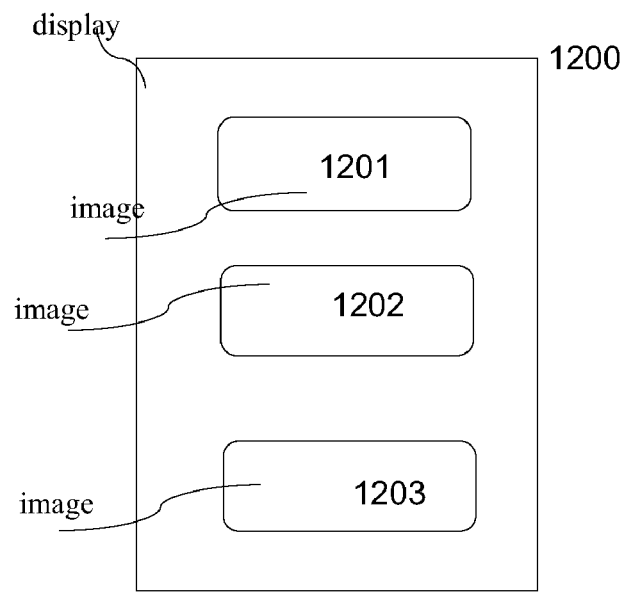
FIGS. 12-13 are diagrams of displays in accordance with different aspects of the present invention.
Figure 13:
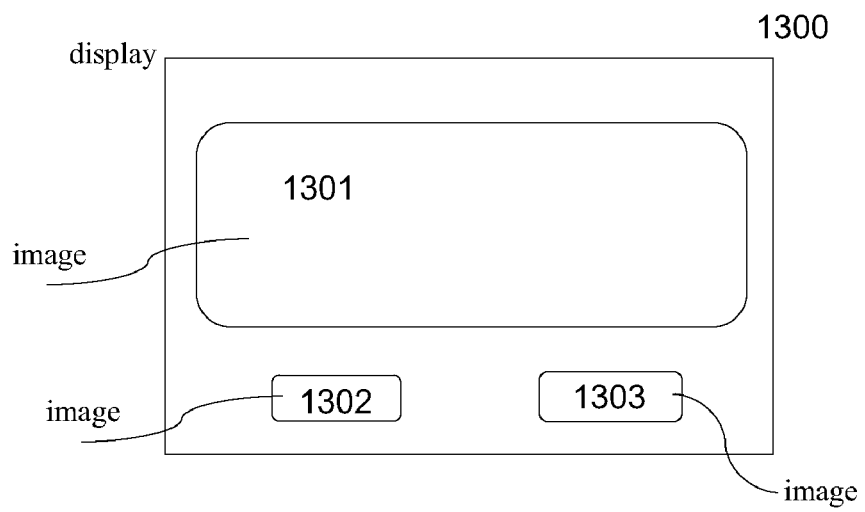

In a further embodiment, picture-in-picture (PIP) display is provided. PIP, which may the display of one large video image, with at least one smaller video image displayed within the larger image. PIP may also be presented split screen format wherein no overlap of images occurs. In split screen one image can be larger than another image. A user may switch between images, enlarge a previously smaller image or bring a first image to a foreground. In one embodiment, one may show two or more pictures on one display screen 1200 as shown in FIG. 12. For instance images 1201, 1202 and 1203 may be displayed on a single display. This may require that the display has three players or tuners. A processor may allow a user to select one of the displayed images to be enlarged and play in for instance full screen mode. Such an embodiment is shown in FIG. 13 with a display 1300 with a large image 1301 and for instance 2 smaller images 1302 and 1303. All images are drawn from a single multiplexed signal that was stored on a storage or memory medium.

N-Valued Storage Media

It is known that video signals are increasingly provided in High Definition (HD) format. This requires a transfer rate in a storage medium in the reading process to be about 30 Mbit/sec for proper transfer of one HD program on for instance a DVD disk. This means that 3 HD type programs that are time division multiplexed to be read at 90 Mbit/sec if one wants to show the 3 HD programs in real-time from the storage medium. One way to solve this issue is to have the DVD player significantly increase its rotating speed. However, one can then store a diminished amount of data per program, if one continues to use the same storage medium, and assuming that one can increase the playing speed of a medium.

One way to increase the capacity of a storage or memory medium is to store symbols that ate not bits but can assume a state of 3 or more states. Such media are known and fully enabled. Multi-state memory devices are for instance described in U.S. Pat. No. 7,345,934, to Guterman et al. which is incorporated herein by reference. An n-state logic way to realize n-state memory is disclosed in U.S. patent application Ser. No. 12/061,286, filed on Apr. 2, 2008 which is incorporated herein by reference. Storage media such as optical disks enabled to store for instance 8-level symbols are disclosed in U.S. Pat. No. 7,126,897, to Takeuchi et al., U.S. Pat. No. 7,149,178, to Wong et al. and U.S. Pat. No. 7,136,333, to Wong et al. which are all three incorporated herein by reference in their entirety.

In accordance with a further aspect of the present invention, a storage and/or memory medium is provided that can store multiplexed video programs in multi-valued or n-valued or n-state symbols, an n-valued or n-state symbol is a symbol that can assume one of 3 or more states. A multi-valued or n-valued or n-state symbol distinguishes itself from a binary or 2-valued symbol also known as a bit which can assume one of only 2 states. A symbol herein is represented by a signal. An n-valued or n-state symbol is then represented by a signal that can occur in n different states with n>2. It also is intended to mean that a signal represented one of n states can clearly and unambiguously be distinguished from any other state not being that state for substantially most of the time. Like with any signal noise and disturbances may influence error free transmission and detection of signals. But states can be distinguished from each other. States can be represented by different physical aspects. For instance a state can be represented by an amplitude or range of amplitude, of intensity, of position of phase, frequency, wavelength or any other physical phenomenon that may occur in 2 or more states. For an n-state signal a signal can occur in more than 2 states.

By using symbols with more than 2 states one may maintain a relatively low reading speed while being able to store multiple programs such as video programs in multiplexed such as time multiplexed format on a storage or memory medium.

One may, for instance, assume that a HD video signal currently requires a reading or data transfer speed of 30 Mbit/sec from a HD DVD optical disk. Ignoring multiplex and additional coding overhead, one may assume that a 3 times multiplexed HD program signals then requires a playback or transfer speed of 90 Mbit/sec to obtain real-time processed and playable HD program signals. By using, for instance, 8-level symbols for storing information on a storage medium the symbol transfer rate may be reduced with a factor 3 to 30 MegaSymbols/sec while still maintaining an information transfer speed of about 90 Mbit/sec.

The storage/memory component of a system for storing and retrieving n-valued symbols at least two time-multiplexed programs, which may be video programs on a storage/memory medium thus has been enabled.

Another component that may need to be implemented in n-state technology is the multiplexer/demultiplexer component. One may multiplex/demultiplex and code/decode in different ways. One may perform multiplexing and coding in one embodiment in binary form, followed by a conversion by a converter, such as a Digital/Analog (D/A) converter which converts a plurality of bits into a signal which may assume one of n states with n>2.

Figure 14:
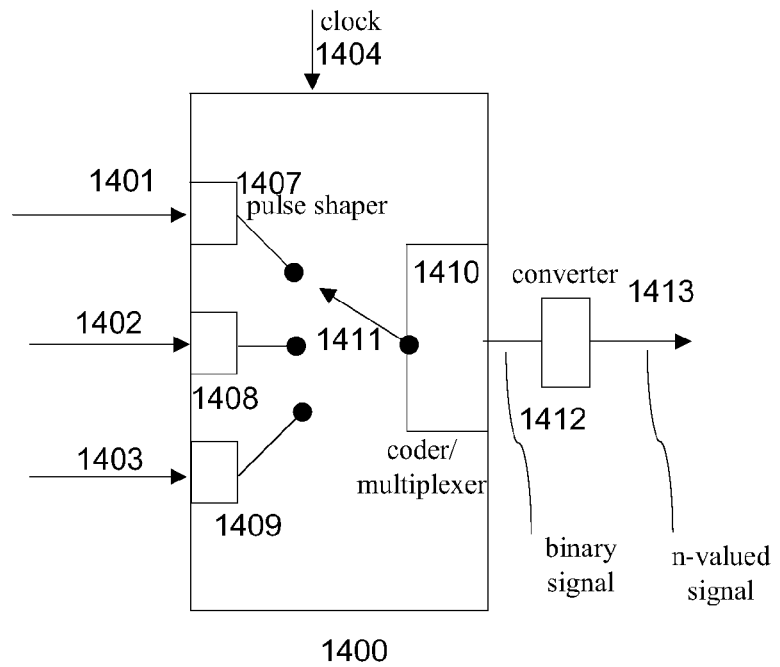
FIGS. 14-15 illustrate multiplexing in accordance with different aspects of the present invention.
Figure 15:
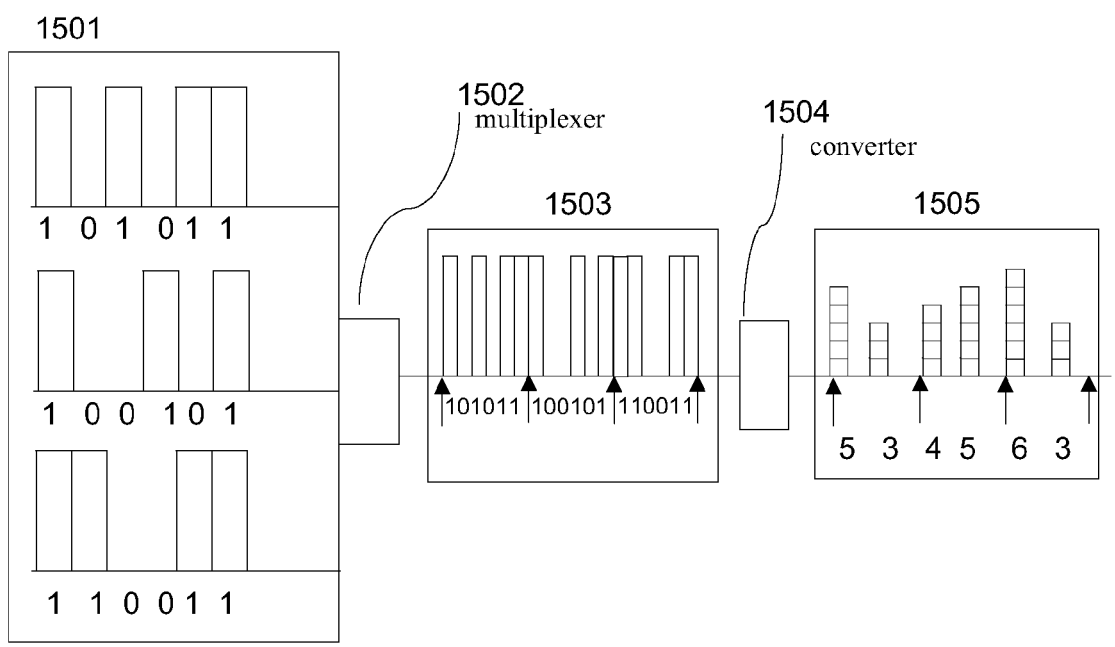

The above embodiment is illustrated in FIGS. 14 and 15. FIG. 14 shows a diagram of a multiplexing/coding system. Three binary signals, 1401, 1402 and 1403, which may represent video programs are inputted into pulse shaping units 1407, 1408 and 1409 respectively after which a multiplexer switch 1411 which may be under control of a clock signal 1404 forms a multiplexed signal which may be inputted into a coder 1410 which outputs a binary multiplexed signal. Pulse shaping may also occur elsewhere in the system. Coding may involve error correcting coding. It may also involve coding steps which improve inter-symbol interference. Other steps may also be involved in the generating of the actual multiplexed signal. These steps are known in the art and are assumed but not specifically shown. The purpose herein is to show steps of time division multiplexing without getting lost in the details. This applies to other diagrams shown herein as well. For instance, a multiplexed signal may be modulated before either being written or transmitted. These and other steps, if required, are assumed to take place without being identified or shown in diagram.

The coding unit 1410 outputs a time division multiplexed binary signal and provides the binary signal to a converter 1412 which generates an n-valued signal 1413. The converter 1412 may be a D/A converter. However, the converter 1412 may also be a modulator, such as a Quadrature Amplitude Modulation (QAM) converter. As disclosed in U.S. Pat. No.

6,178,144, to Huber which is incorporated herein by reference in its entirety, a series of bits or a word can be coded for instance in a 256-QAM constellation and written to a magneto-optical medium. The signal can also be recovered in its entirety from the medium.

The principle of the multiplexing and conversion is shown in FIG. 15. Coding is ignored in the diagram, though it is pointed out that coding such as error-correcting coding, pulse shaping, ISI (inter-symbol interference) improving coding and other steps are important and known. The same applies to synchronization marks and coding and other requirements. Pulse duration and shapes are provided in a diagram in FIG. 15 and may not reflect actual pulse shapes. They are intended to reflect the requirement of slot fitting of a plurality of signals.

In FIG. 15 box 1501 shows 3 parallel binary signals as provided to a multiplexer 1502. It is assumed, for illustrative purposes, that units of 6 bits of a channel will be interleaved for 3 channels. It is shown in box 1503 what a multiplexed signal may look like. A time slot that first has 6 bits now has 18 bits, being the multiplexed signal. Each group of 6 bits representing a word of 6 bits of a channel. One may then provide the serial signal to a converter 1504. The converter may be a D/A converter that converts a word of 3 bits to a 8-valued signal that can assume 1 of 8 discrete states. This is represented in box 1505 wherein an 8-valued signal is represented by an amplitude. It should be clear that other representations and signals are possible. As was stated before, the converter may for instance be a QAM module. It may also be a Frequency Shift Keying (FSK) module, wherein a binary word is translated into a signal having one of at least 3 frequencies, or it may be any other n-state representation. The conversion unit may thus be any unit that converts a word of at least 2 bits into a signal of having at least 3 states.

One of ordinary skill in the art will be able to recover an n-state signal by conversion back to a binary signal and by demultiplexing the signal and thus recover an individual program signal from a stored multiplexed signal.

A disadvantage of working with binary words representing an n-valued signal is that synchronization of the words is required to maintain the integrity of the n-valued symbols. Even a single bit shift will most likely create a signal at recovery that is not the correct signal.

In a further embodiment, it may be advantageous to apply an n-state multiplexer. In an n-state multiplexer k input signals are provided and are switched to an output so that a time multiplexed signal of k signals is created at the output. The difference with the binary case being that all input and output signals or pulses can have one of n states.

Such an n-state multiplexer that reduces k signals to 1 signal is a k:1 n-state multiplexer. One may also create a k/p n-state multiplexer wherein an input of k signals is reduced to p output signals. Such an n-state multiplexer requires an n-state switch that switches an n-state input signal to an n-state output signal under certain conditions. Such a switch is disclosed by the inventor in, for instance, U.S. Pat. No. 7,218,144, issued on May 15, 2007 and U.S. Pat. No. 7,355,444, issued on Apr. 8, 2008 which are incorporated herein by reference in their entirety. A related n-valued switch is also disclosed by the inventor in pending U.S. patent application Ser. No. 11/964,507, filed on Dec. 26, 2007 which is incorporated herein by reference.

Figure 16:
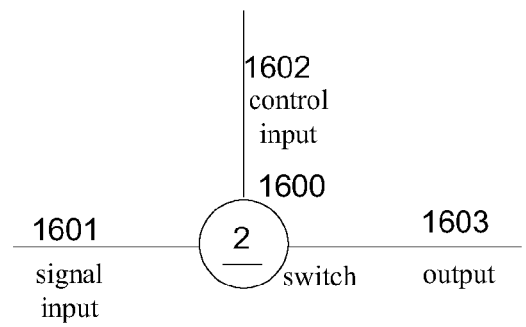
FIG. 16 shows a diagram of an n-valued individually controlled switch.

An individually controlled n-state switch is schematically shown in FIG. 16 as 1600. Switch 1600 has an input 1601 which can provide a signal having in this illustrative example one of 3 states. The 3 possible states are 0, 1 and 2. A state may be represented by a voltage. A state may also be represented by light of a certain wavelength. A signal having one of 3 states may be outputted on an output 1603. The switch 1600 is under control of a control signal provided on control input 1602. The control signal may also have one of 3 states. The number inside the switch indicates for which state the switch is 'conducting'. The term conducting in the context of the switch 1600 means that output 1603 provides a signal representing the same state as the signal provided at the input 1601. In actuality, the switch may not 'conduct' at all in a physical sense. For instance, an input signal may be an electrical signal and an output signal may be an optical signal, which may be transformed back into an electrical signal. The underlined number inside the circle representing the switch indicates for which state of the signal on the control input 1602 the signal provided on output 1603 has a state identical to the state of the signal provided on input 1601. In this case that is for state 2. When a control signal on input 1602 is not 2, the signal provided on output 1603 has the same state as the signal on input 1601 has when 1601 has absence of signal. This definition is required because the absence of signal may represent a state.

Figure 17:
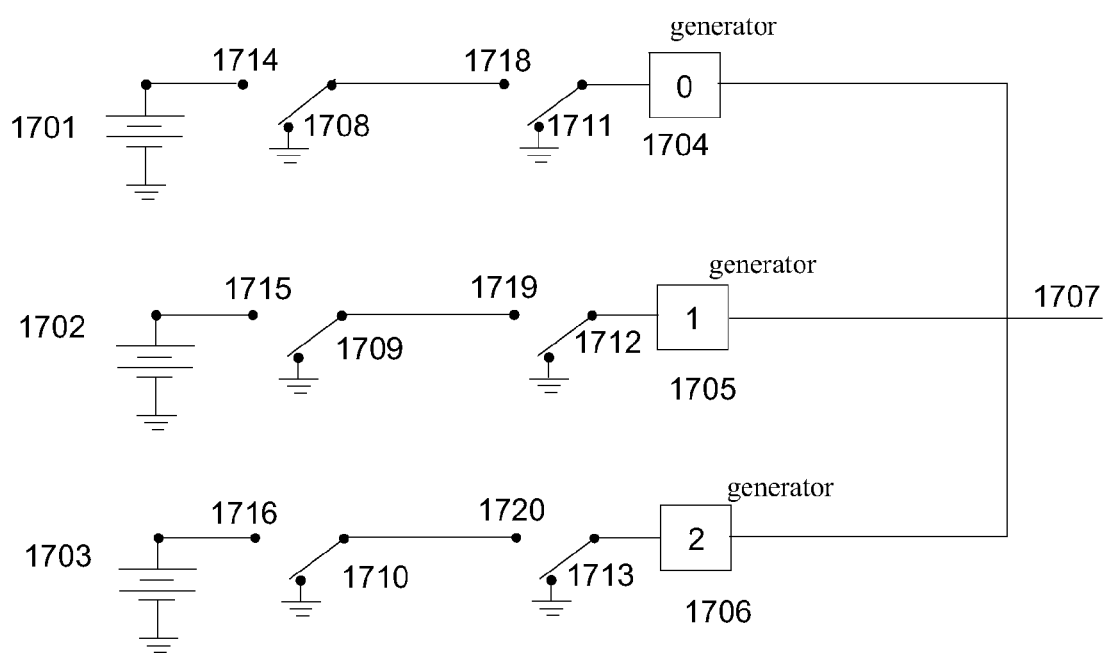
FIG. 17 is a diagram of part of an implementation of an n-valued individually controlled switch.

FIG. 17 shows a diagram for a possible physical implementation of the switch of FIG. 16. Assume that a state 0 is represented by a signal generated by a signal generator 1704 requiring powering by a source 1701. The state 1 is represented by a signal generated by a signal generator 1705 requiring powering by a source 1702. The state 2 is represented by a signal generated by a signal generator 1706 requiring powering by a source 1703. If none of the generators are powered there is absence of signal. An output is generated on an output 1707. Switches 1708, 1709, 1710, 1711, 1712 and 1713 are used to enable the n-state switch. Switches 1708, 1709 and 1710 may be enabled by the same signal, being for instance the control signal representing state 2. These control signals are not shown to prevent undue clutter. However, one may assume that each of the switches 1708, 1709 and 1710 will be connected to ground if their enabling signal does not represent the state 2. When the control signal for the switches represents the state 2 all three switches will close and create a connection with contacts 1714, 1715 and 1716. One can see in the diagram of FIG. 17 that this partially enables the power circuits.

The switches 1711, 1712 and 1713 are all controlled by the input signal as provided on input 1601 in FIG. 16. However, the switches are enabled by different signal states. Switch 1711 closes when the input signal represents state 0. Switch 1712 closes when the input signal represents state 1. Switch 1713 closes when the input signal represents state 2. Accordingly, only one circuit is closed or all circuits are open. Output 1707 thus has a state 0, 1 or 2 or the same state as the input signal when the control signal is in state 2; or the output 1707 provides absence of signal if the control signal does not represent state 2.

One may actually create simplified versions of the switch and these are fully contemplated. The purpose of the schematic of FIG. 17 is to show that an n-state switch is fully enabled. A simplified switch only has fewer components and may not serve the purpose of explaining the n-state switch.

It is easy to contemplate modifying the switch of FIG. 17 to conduct when the control signal represents state 1 and the same for when the control signal represents state 0. One can easily expand the shown 3-state switch to any value of n>3.

Figure 18:
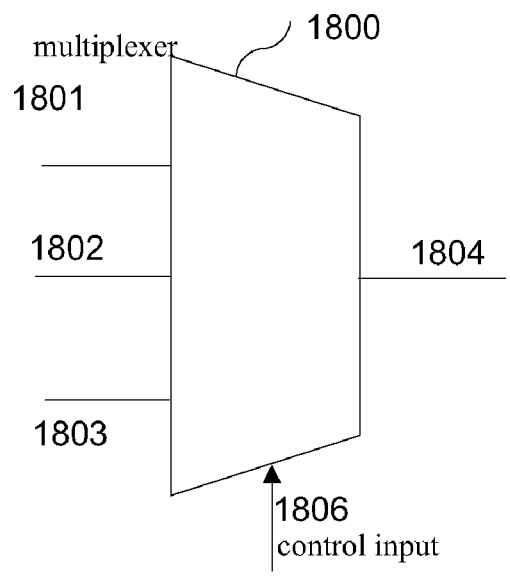
FIG. 18 is a diagram of a multiplexer.

In FIG. 18, an n-state multiplexer 1800 in diagram is shown. This multiplexer has 3 inputs 1801, 1802 and 1803 each providing for instance signals having one of n states. A control input 1806 provides a k-state signal that control which of the inputs is 'conducted' to the output. If required, the control input 1806 may be a plurality of inputs. The requirement is that 1806 can control k individual switches. In this example, k=3. The signal as provided in FIG. 15 is an 8-valued signal. Clearly, an 8-valued signal can control 3 individual 8-valued switches. However, one may want to multiplex in some cases 9 or more input signals. In that case one may have to use multiple control inputs 1806 or a k-valued individual switch with k>8.

Figure 19:
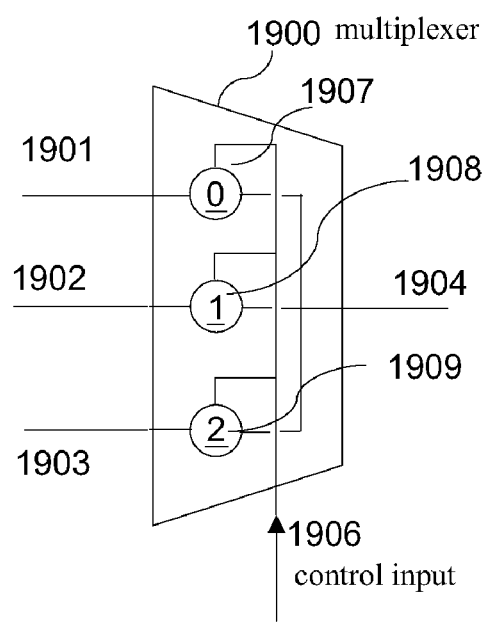
FIG. 19 is a diagram of a multiplexer in accordance with an aspect of the present invention.

One embodiment of a 3:1 multiplexer is shown in FIG. 19. Three input signals are provided on inputs 1901, 1902 and 1903 to individually controlled n-state switches 1907, 1908 and 1909. Each of the switches is closed for a different state of the signal provided on control input 1906. Depending on the state of the control signal on 1906 the state of the signal on output 1907 has the same state as a signal on one of the inputs 1901, 1902 or 1903. Accordingly, FIG. 19 provides a k:1 multiplexer for an n-state signal, with in the illustrative example k=3.

A demultiplexer corresponding to the multiplexer of FIG. 19 works on a similar principle. If one multiplexes multiple consecutive input pulses from a single input it is required to restore the pulse spacing for the individual demultiplexed signals. In another embodiment, an n-state multiplexer is provided that multiplexes a single pulse from each channel and then returns to the first channel. The n-state demultiplexer of such an n-state multiplexer has much less of a re-spacing issue as all pulse will be equally distributed over a time slot.

Figure 20:
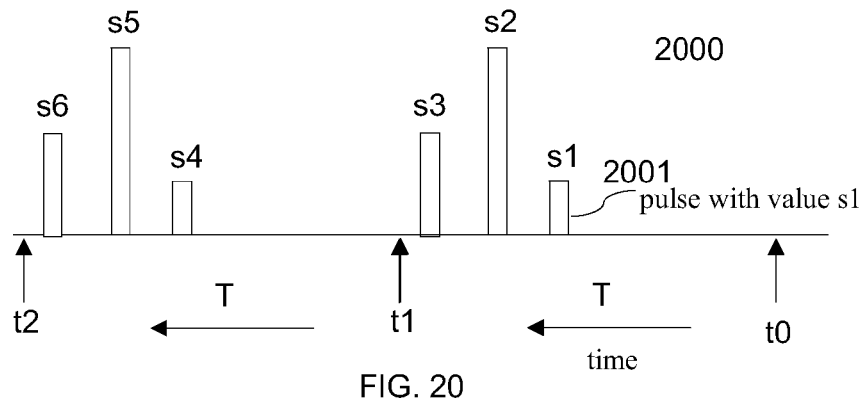
FIG. 20 is a diagram of a multiplexed signal in accordance with an aspect of the present invention.

A diagram of demultiplexed n-valued signals which may be n-valued pulses for one program is shown in FIG. 20. One pulse 2001 with value s1 is specifically identified. Other pulses s2, s3, s4, s5 and s6 are also provided. The graph covers to time slots: one between time t0 and t1 and one between time t1 and t2. A time slot has a duration T. The time axis moves from right to left. This makes the order of pulses going from s1 to s2 etc. It should be clear from the graph of FIG. 20 that the pulses are not uniformly distributed over a time slot. To achieve uniform distribution, an n-state timing buffer may be applied.

Timing buffers in binary logic are known. They may be known in n-state or n-valued logic. One may use multiple binary buffers wherein n-state signals are represented as binary words. An example of an n-state buffer to evenly distribute pulses is provided in FIG. 21. A first buffer 2101 is an n-valued shift register with 3 n-valued shift register elements which may be created from n-valued memory elements. The demultiplexed pulses are shifted into 2101 on input 2104. The shift register content is shifted to the right based on a clock signal 2103 derived from the demultiplexer generating the n-valued pulses of this channel. This means that the clock pulses of 2103 will also not be uniformly distributed. After 3 clock pulses the shift register 2101 is full and a second clock pulse 2105 will enable transfer of the content of 2101 to a second n-valued shift register 2102. The timing should make sure that 2105 happens before 2102 needs to be read and before the new pulses s4, s5, and s6 need to be read into 2101.

Occurrence of a clock signal 2107 (being uniform and with a period ⅓ T in this example) enables reading 2102 in a uniform fashion. At the time that 2102 is being shifted and read the n-valued shift register 2102 of s1, 2 and s3 shift register 2101 is being filled with s4, s5 and s6. Every cycle the content of 2101 is moved into 2102, 2102 is read while 2101 is being filled. This creates a uniform series of n-valued output signals from a non-uniform series of input signals. Other ways of n-valued buffering are possible and are fully contemplated.

Figure 21:
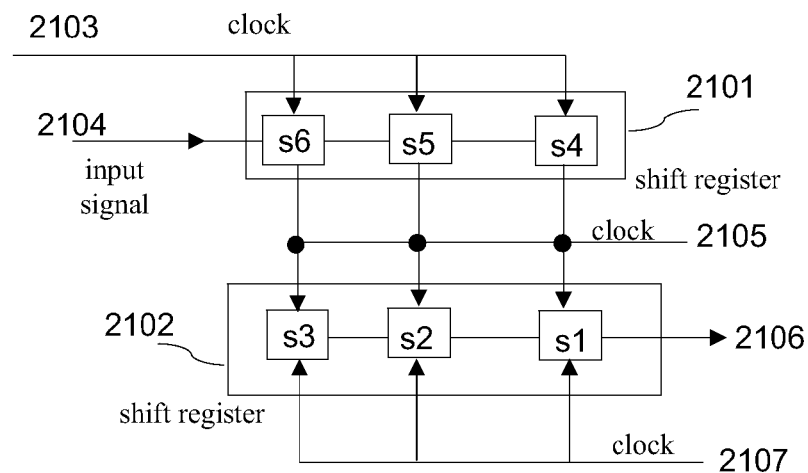
FIG. 21 is a diagram of a buffer.
Figure 22:
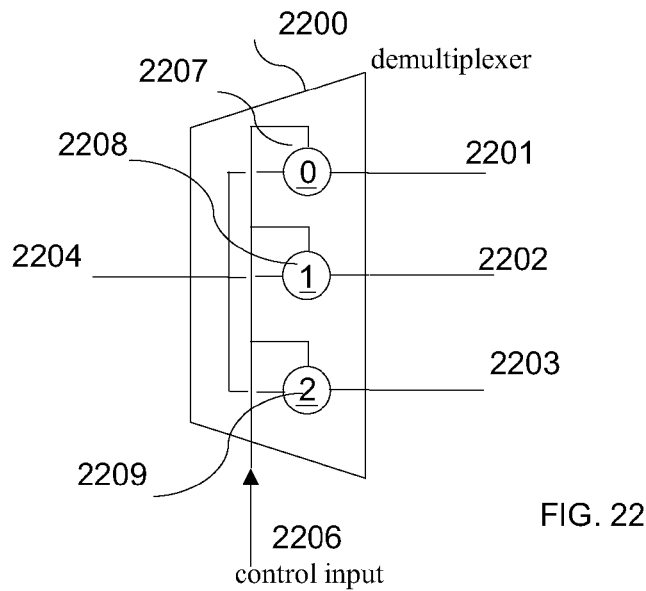
FIG. 22 is a diagram of a demultiplexer in accordance with an aspect of the present invention.

FIG. 22 shows an illustrative example of an n-valued demultiplexer 2200. A multiplexed n-valued signal is provided on 2204 to an input of three individually controlled n-valued switches 2207, 2208 and 2209. All switches have as control signal an n-valued signal that is provided on control input 2206. Each of the individually controlled n-valued switches is enabled by a different state of the control signal. So only one of the switches is enabled at any time and provides an output signal on its output, being 2201, 2202 and 2203 respectively. A not enabled switch may provide absence of signal on its output. Depending on the multiplexing frame, one may use an n-valued buffer as shown in FIG. 21 to create a uniformly distributed n-valued pulse set per time slot.

As an illustrative example each TDM time slot is occupied by a single signal. This is not a requirement. One may apply cumulative multiplexing. For instance, one may superimpose optical signals of different wavelengths, wherein a state is represented by an intensity. In such an embodiment one should preferably not use absence of signal as a state, or at least only for one wavelength.

In accordance with one or more aspects of the present invention, an n-valued multiplexer is provided enabled to time multiplex at least 2 n-valued datastreams into a multiplexed n-valued signal with n>2. Before the multiplexed signal is written to an n-valued storage or memory medium the multiplexed signal may be n-valued scrambled and n-valued error correcting coded. A Reed Solomon (RS) code is multi-valued and should not require further explanation. Scrambling can take place with for instance an n-valued Linear Feedback Shift Register (LFSR) scrambler, which has a corresponding descrambler. This aspect is disclosed by the inventor in U.S. patent application Ser. No. 10/935,960, filed on Sep. 8, 2004 which is incorporated herein by reference.

Assume that a High Definition DVD of about 15 GB capacity is required to store a full HD Video program using compression. Optical disks with that capacity are currently available. A disk that can store 3 HD programs then requires 45 GB storage capacity. The transfer rate for a multiplexed signal of 3 HD video programs is 3 times 30 Mbit/sec=90 Mbit/sec. Calimetrics, a firm now defunct has developed at least one embodiment for n-valued storage media using 8-valued symbols that would enable a storage medium being an optical disk with an equivalent capacity of 200 GB and a transfer rate of 200 Mbit/sec. Such a medium would sufficiently enable the storage and reading of at least 3 HD video programs to be demultiplexed and enabled to be played concurrently in real-time.

A multiplexed signal may be provided to a player directly from a storage or memory medium. In a further embodiment, a multiplexed signal may also be provided by a transmitter and received by a device such as a mobile computing device or a multi-media player. The multiplexed signal may be stored in the device for instance in a mass flash memory. A device may have two or more tuners or individual players each enabled to play a demultiplexed signal. Such tuners or players may be implemented in for instance a Digital Signal Processor.

Figure 23:
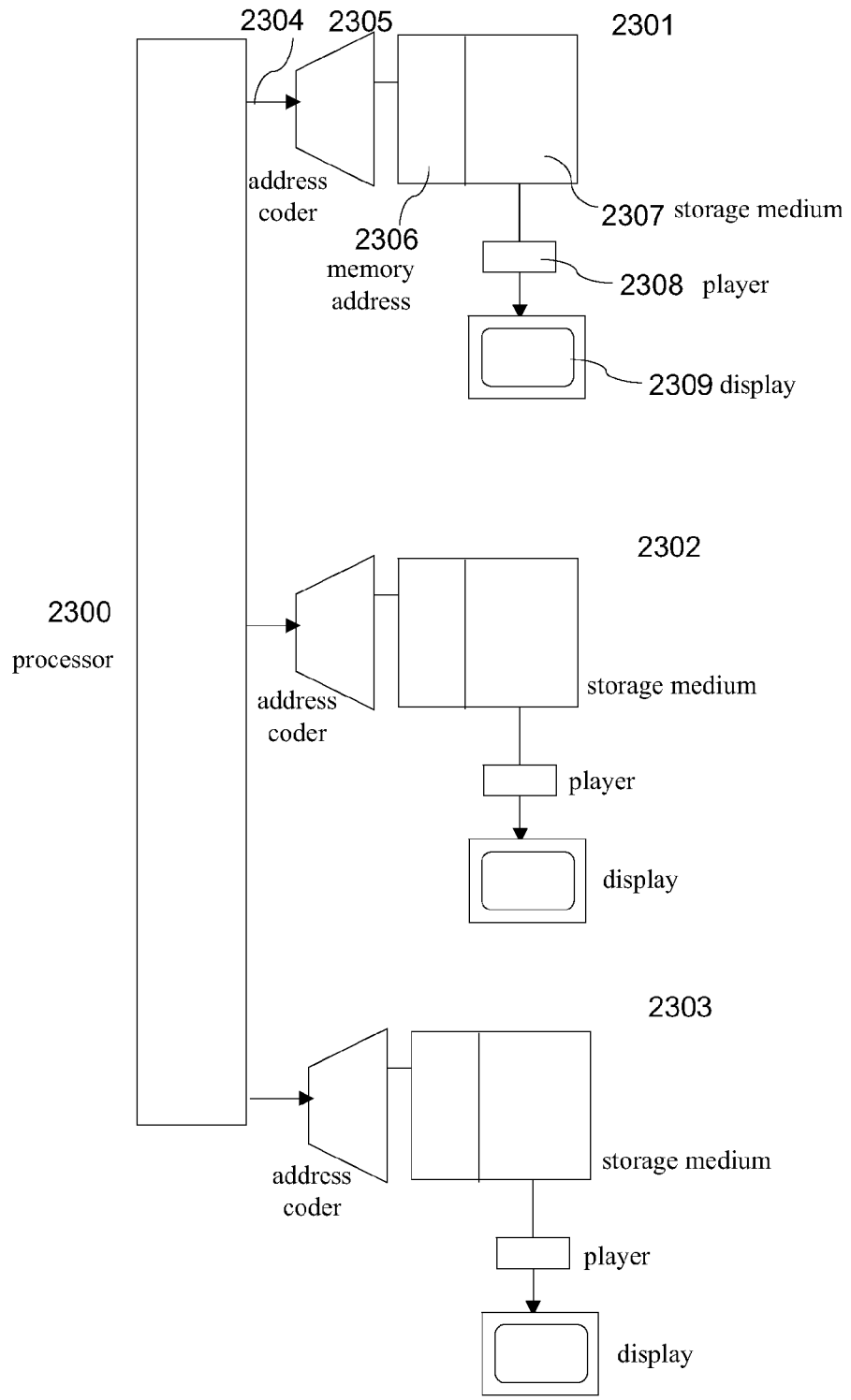
FIGS. 23-24 are diagrams of demultiplexing systems in accordance with aspects of the present invention.

In a further embodiment, a player may have access to two or more datastreams that are available in separate and non-multiplexed form. For instance, one may store two or more programs which may be video programs on a storage or memory medium. Each program as stored may be stored in playable form. This is shown in FIG. 23. Herein, three players 2301, 2302 and 2303 are shown. Each video program is stored in a memory or storage medium. For instance, a first program for the first player 2301 is stored in a medium or memory 2307. The memory elements or storage locations of the data are substantially contiguous and are determined by a location or memory address 2306. For playing a program in a player under control of a processor 2300, such a processor may initiate an address with an address signal 2304 through an address coder 2305 to start recovering data for providing the data through a player 2308 to a display 2309. Especially in media such as magnetic disks, magnetic tape and an optical disk, transfer of contiguous data is very fast. The reading element in those storage media does not have to move substantially and just follows a fairly easy path. The same applies for a memory. Once a memory is read from an initial address, reading of data from contiguous address spaces is fairly easy.

One may provide different programs, which are located at totally different locations or addresses or address space. This is shown as individual players 2302 and 2303. One may switch between programs, however this requires first of all overhead required by physically finding the new address or storage location. Secondly, if one wants to switch back and forth between the three programs one has to administer existing addresses. This can be done by storing the current address and activating the new address. However, this also creates overhead which may interrupt the program. This may require at least three individual players that operate fairly independently of each other. Even then, playing from a single disk or a tape or a memory without continuous interruptive switching effects may not be possible.

Figure 24:
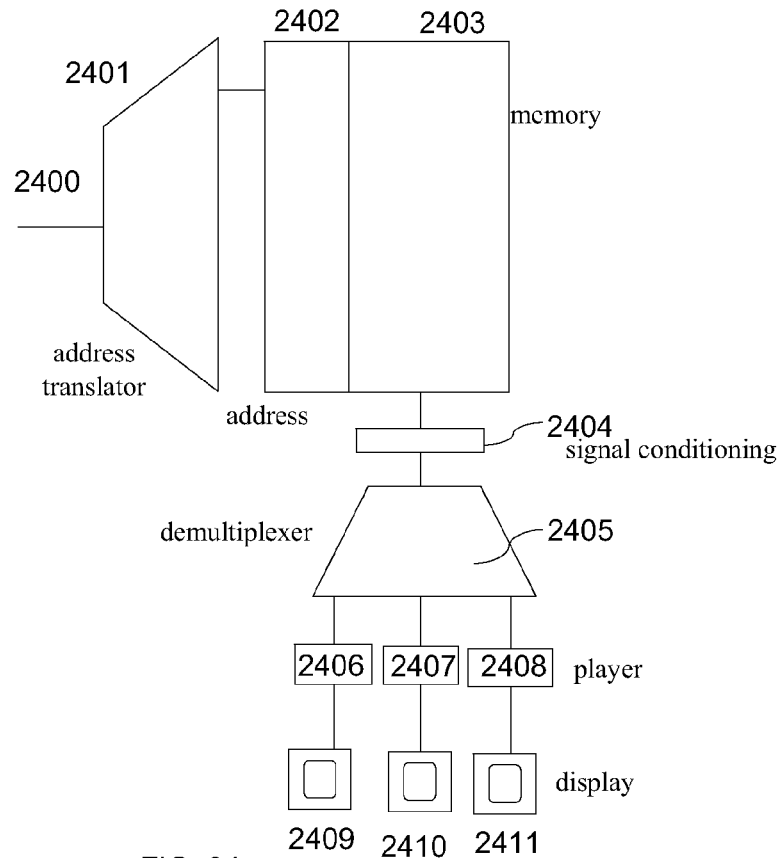

In a further embodiment in accordance with an aspect of the present invention, a method and system is provided for multiplexing at least two available signals into a multiplexed substantially contiguous signal. This is shown in diagram in FIG. 24. A memory 2403 contains a multiplexed signal representing (in the illustrative example) the data of 3 concurrent video programs. The data are stored on substantially contiguous locations 2402 in a storage medium or contiguous addresses 2402 in a memory. An external signal 2400 initiates the playing of the multiplexed signal from an address translated by an address translator 2401 from information included in 2400. The memory or storage medium is read and its signal may be conditioned by a signal conditioner 2404. The signal conditioner may perform additional tasks such as stripping of overhead, error correction and/or descrambling. The signal from 2404 is then provided to a demultiplexer 2405 which splits the multiplexed signal in the three individual program signals. As an illustrative example, three players 2406, 2407, 2408 are shown. Each player conditions the received signal for playing by display 2409, 2410 and 2411 respectively. It has already been shown that different embodiments for display can be provided such as shown in FIGS. 8-13 and described in detail herein. These display embodiments and others may also be applied in the embodiment of FIG. 24 and are fully contemplated.

Figure 25:
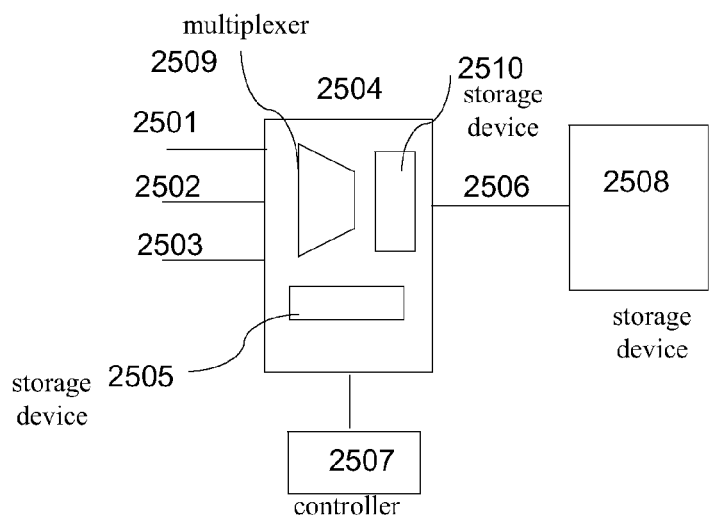
FIG. 25 is a diagram of a system in accordance with an aspect of the present invention.

In one embodiment, a system is provided that creates a multiplexed signal from different sources. This is shown in diagram in FIG. 25. The system comprises a computing device 2504 which has access to a memory or storage device 2505. The device 2504 can be controlled or provided with commands through 2507. The computing device 2504 also has a multiplexer 2509. The device can read 3 or more independent signals from inputs 2501, 2502 and 2503. One may also provide 3 or more independent signals sequentially on one of the inputs. In one embodiment three or more independent signals are first stored on 2505. The device through a computer program that is stored on a memory and retrieved and executed by a processor first analyzes the three signals. It determines the amount of data per program, the combined amount of data, it may analyze 2505 to establish that enough information is available. Assume that the individual program signals will be multiplexed according to a fixed length word of symbols. Assume as an illustrative example that 3 bits or in the n-valued case 1 8-valued symbol per stream or channel will be multiplexed. After multiplexing a first, a second and a third channel multiplexing will again start with the first channel. The computer program may create frames and superframes for the multiplexed signal and may prepare insertion of synchronization symbols and other overhead symbols into the multiplexed signals. The computer program may also provide location information into the multiplexed signal for instance relative to the beginning of the multiplexed signal. After preparation, the signals are actually multiplexed by multiplexer 2509 and synchronization and overhead symbols are inserted and a complete multiplexed signal is stored in a memory or any other storage medium 2510.

One may keep the signal there for playback. However, in a further embodiment the multiplexed data 2506 may be written to a dedicated storage medium 2508, which may be a storage medium or a memory. This part of the process is the creation and storage or writing of a multiplexed signal. This process does not have to take place in playback real-time and may take place at a slower than playback speed, but preferably in a higher speed than playback. Accordingly, one has now in accordance with an aspect of the present invention an apparatus and a method for creating and recording a multiplexed signal containing at least 2 independent signals which may be video programs. Furthermore, the multiplexed signal may be written to a media that may be played in a different apparatus and may provide at least two concurrently playable and displayed programs which may be video programs at a real-time speed.

One may implement the method in a computing device, which may be a standard computer with a processor, memory, a hard drive, one or more optical disk players, a USB port for reading data from a flash memory, and at least one optical disk writer and a USB port for writing data to a flash memory. A program is provided for reading two or three signals to disk, for preparing the hard drive for writing the multiplexed signal, for actually multiplexing of the signal and completion of the multiplexed signal and writing the multiplexed signal is such a way that the signal is written in a contiguous manner on the disk or memory and will also be transferred as such to a target medium. The target medium may be written in a contiguous way. Currently, there are tools that will analyze a hard disk and map the available sectors and reserve contiguous sectors for storing data. Methods thereto are disclosed in U.S. Pat. No. 7,280,745 issued on Oct. 9, 2007 which is incorporated herein by reference. Use of proactive defragmenters and other disk defragmenters may help in creating contiguous data clusters on a hard disk. One would like to have contiguous clusters on a hard disk if one wants to play the multiplexed file in concurrent video programs from the hard disk. Writing of data files on a new or clean memory or storage medium usually can take place in a contiguous fashion.

Figure 26:
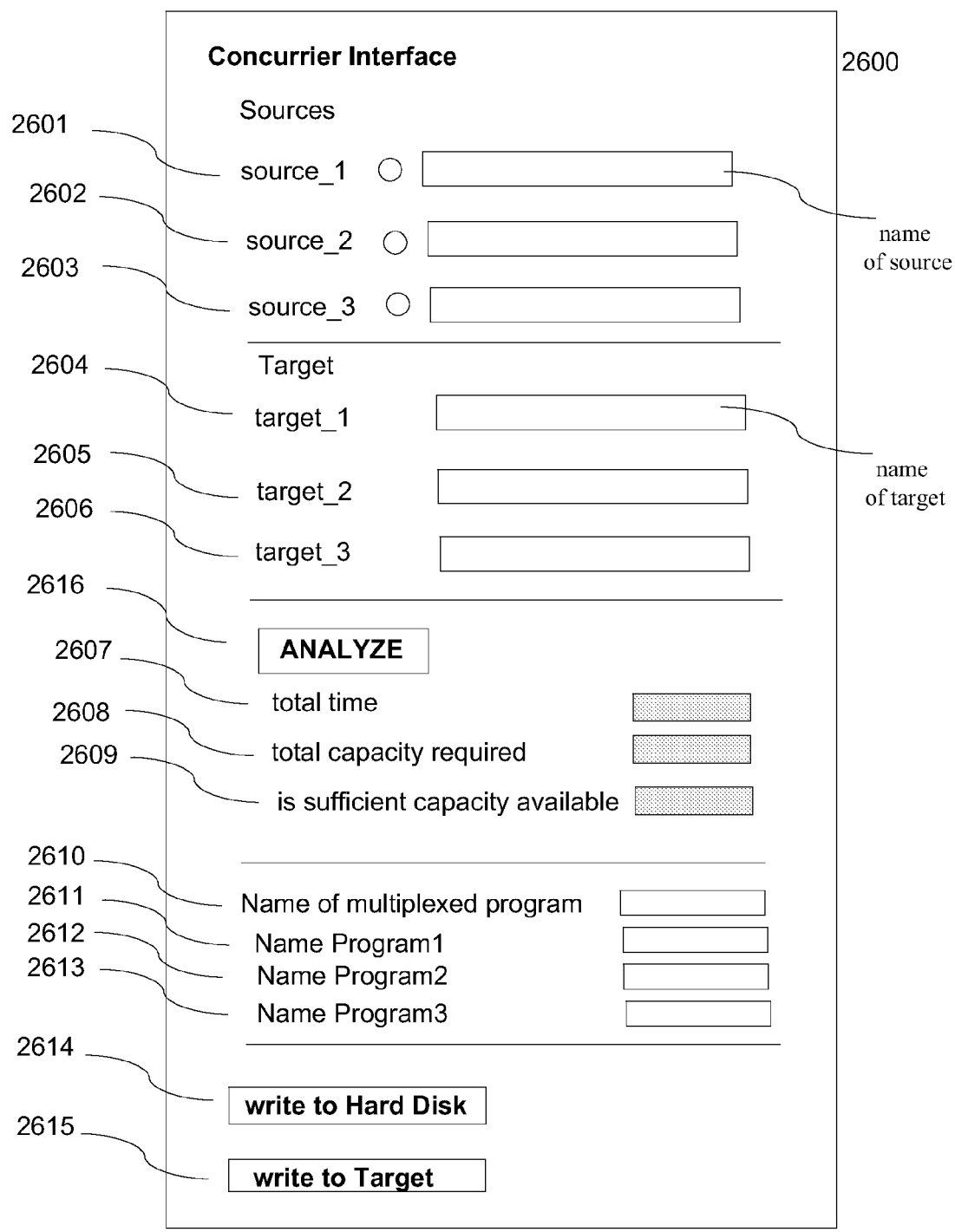
FIG. 26 is a diagram of a user interface in accordance with an aspect of the present invention.

FIG. 26 shows a user interface of a computer program that may initiate and execute creation of a multiplexed signal. A user first has to identify sources from which signals are to be used for multiplexing. In this example up to three sources 2601, 2602 and 2603 can be selected. Enabling the selection will also provide an opportunity to select a file to be multiplexed. For instance a source_1 may for instance be a file on a hard-disk. Source_2 selected in 2602 may for instance be from a USB port, like a memory stick. Source_3 in 2603 may for instance be a DVD in an optical disk player. However, one may select 2601, 2602 and 2603 as being a DVD in an optical disk player. If one has only one optical disk player the program will request switching disks after a disk has been processed.

Different sources may be applied and are fully contemplated. Any signal source that can be recorded will be processed by the system if the system is adequately equipped.

The application of which 2600 is the interface may automatically store the signals from the source. One may also provide a name and a medium for the storage files in 2604, 2605 and 2606 as target_1, target_2 and target_3 respectively. While not essential for a single multiplexing effort, one may want to re-use some of the files in the future. In that case one has already a "multiplex-ready" file, which may be a source in a future multiplexing. Furthermore, a target determines also the medium that the multiplexed signal or file is written to. It should be clear that writing can be done at a range of writing speeds. It can be done slower than real-time playing speed. It can be done at faster than real-time playing speed. A multiplexer may be a buffer or memory or a storage to which signals are temporarily written and then retrieved to be put in proper multiplexed order. Each target may require a specific coding format that will be taken care of in this step. In general, one may conclude that a multiplexed file is merely a data file with contiguous data and that it is the final writing to the medium that determines the proper coding. Both multiplex signal preparations are contemplated and are enabled. Other preparation methods may be possible and are also contemplated.

The next step in creating a multiplexed signal stored in a single file and that can be stored in a contiguous fashion after providing the above information may be an analyzing step. In the analyzing step which may be initiated by clicking a button ANALYZE 2616, the system determines for instance how much storage capacity 2607 is required, the playing time 2608 which should be the playing time of the longest playing source and if sufficient capacity is available. Other information may also be provided. For instance, if no sufficient capacity is available, the application may provide several suggestions. For instance, it may recommend creating 2 or more multiplexed signals. It may offer the opportunity creating a multiplexed signal from only 2 signals instead of 3. The system may also make other suggestions. Those suggestions may be technology related. For instance the system may detect that a source video format may need to be transformed. It may also be that because of the file sizes capacity constraints are important. Like with early creation of CD-ROMs in the past, especially from music files, capacity constraints may initially be important. However, as formats become more standardized and storage capacity is less constrained, for instance, by applying n-valued storage media, the analyzing step may be skipped completely.

Fields 2610, 2611, 2612 and 2613 can be used to provide names to the programs which may be video programs which are to be multiplexed. A user may also provide comments that can be retrieved.

A user may hit 2614 to create a multiplexed signal that will be stored on the hard disk or other mass storage or memory of the system. The system will select the proper methods to find or create if needed contiguous locations or addresses for storage. It provides all the correct overhead in the signal to become playable from the hard disk or memory and it will write a complete multiplexed signal.

In one embodiment, all three signals may be playable by three players that have a common configuration. For instance, the players may all 3 be DVD players that play a video program, an audio/video program or an audio program. In a further embodiment the signals with a multiplexed signal are coded for a specific player. Each signal within the multiplexed signal maintains it owns integrity. A demultiplexer then provides three signals that have there own integrity. However, it is up to the user to provide the correct player. It may also be that each signal within a multiplexed signal is assumed to have a common format which may for instance be one of: video, audio, audio/video, static images, text and graphics for instance. In that format it may be assumed that all players can play any of these formats and automatically recognize the format from the signal and will play accordingly.

The command 2615 'write to Target' writes the multiplexed signal to a target medium, which may be as stated before any storage or media medium that can store the multiplexed signal. For instance, the multiplexed signal may be written to a removable optical disk or a flash memory. It can then be removed from the system and provided to a system for playing.

Figure 27:
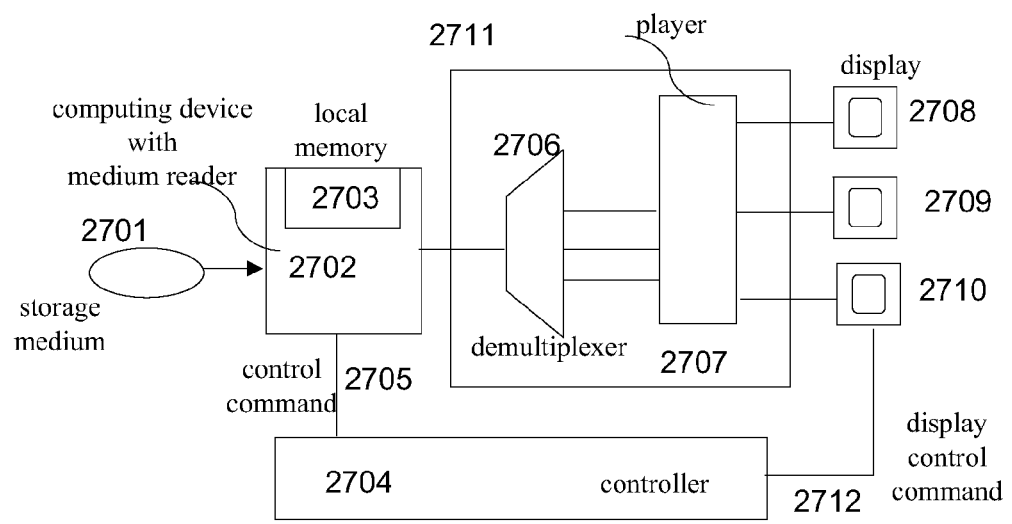
FIG. 27 is a diagram of a system in accordance with an aspect of the present invention.

FIG. 27 shows a diagram of a possible player of a multiplexed signal. A storage or memory medium 2701 with a multiplexed signal is read by a computing device 2702. A user by an input device 2704 may provide control commands 2705 to the device 2702 to play one or more of the programs contained in the multiplexed signal. The multiplexed signal may be partly or completely stored in a local storage or memory device 2703, controlled by the computing device 2702. The multiplexed signal may be processed partly inside the computing device to prepare it for demultiplexing and playing. When a command for playing is provided the multiplexed signal is provided to a demultiplexer 2706, which provides it to a player 2707 which provides a playable signal which may be a video program to a display. It is to be understood that a video program may contain one or all of a video signal, an audio signal and an electronic signal that may provide additional information such as subtitles and/or menus. A display 2708, 2709 and 2710 may play all components of a video program.

Increasingly, people may play videos on their personal computers or computing devices. The availability of computer screens is such that people are using two or more displays with a computing device. The use of two or more displays allows for a more immersive multi-media experience. The display of a surround video using video images from two or more perspectives played at the same time on different screens may assist in providing an enhanced multi-media experience.

Different embodiments are contemplated for implementing a player on a computing device. In a first embodiment, a real-time demultiplexer may be applied with a device 2707 which will create and conditions the demultiplexed signals and provides these signals which are ready to be played for instance by a DVD player circuit to individual displays 2708, 2709 and 2710 which all have their own DVD player circuit. Such player circuits are known and are commercially available for instance from companies like Broadcom of Irvine, Calif., with the BCM7440 chip or are embedded in products and can be used as individual players.

Chips that contain a demultiplexer and that can provide for instance dual playable video program streams are available. One may expand those circuits to 3 or more playable video screens. In such an embodiment one may consider the demultiplexer 2706 and conditioning device 2707 as a single unit 2711 which may provide directly 3 playable video signals on 3 different outputs which may be inputted to three different displays. A user may control each of the individual displays for instance a characteristic such as image contrast or brightness with device 2704 through a signal 2712 which may control each of the displays 2608, 2709 and 2710 though only one connection to 2710 is drawn in FIG. 27.

In yet another embodiment, one may take advantage of the availability of high-speed digital signal processors (DSP) and availability of fast mass memory. One may thus perform demultiplexing, decoding, conditioning and providing of playable signals on different outputs by a single processing unit. If the execution speed of a DSP for instance 3 different video programs is higher than 3 times the speed of processing an individual video program including the overhead to temporarily store and retrieve samples and overhead such as storing and retrieving instruction pointers, the sampling theorem allows a time division multiplexing processing and generating of video program signals.

Figure 28:
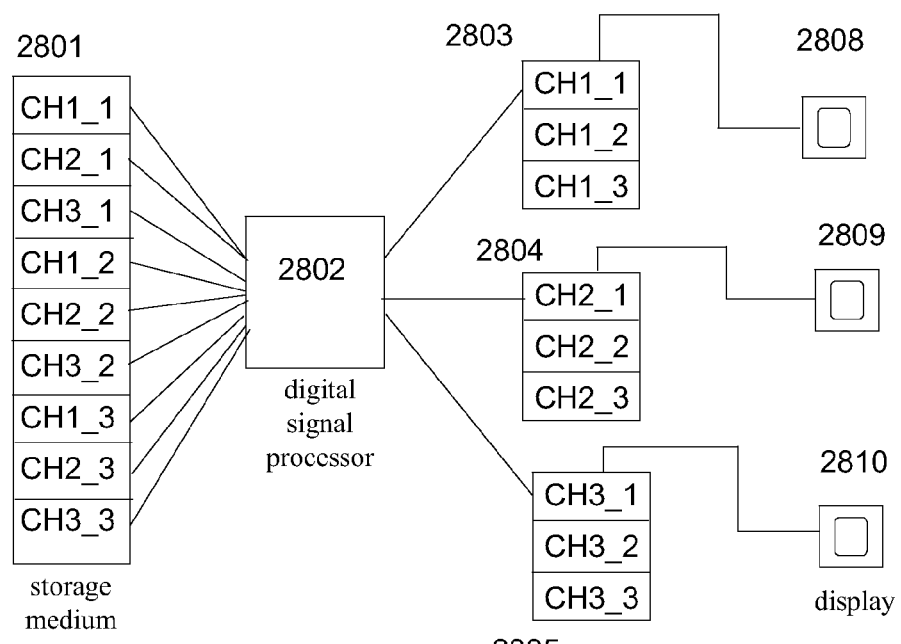
FIG. 28 is a diagram of a system in accordance with an aspect of the present invention.

This is shown in diagram in FIG. 28. A storage or memory device has the multiplexed signal stored in 2801. It shows the multiplexed elements of three video programs CH1, CH2 and CH3 for 3 time periods. The multiplexed signal may contain additional information such as synchronization and error correction information, which if required may be assumed but are not shown. The frames, signals, overheads and other elements of multiplexed video program signals are known and available in published standards and literature. For instance, the book "An introduction to Digital Video" by John Watkinson, Focal Press, Woburn, Mass., 2001, provides a description of many of the details of known video technology.

The multiplexed signal may be read, for instance, from a computer device controlled memory or storage device 2703 as shown in FIG. 27. A DSP 2802 may read 2801 at a high speed, disassemble the correct individual signals and provide a correct playable signal to outputs 2803, 2804 and 2805, which are inputted to displays 2808, 2809 and 2810 respectively. The signals outputted on 2803 are shown as CH1_1, CH1_2 and CH1_3. This reflects that a playable signal for a display may require processing of at least 3 related multiplexed channel signals in the multiplexed signal. The same applies of course to 2804 and 2805. However, the speed of the DSP combined with available memory is such that the DSP can process the multiplexed signal and output three individual video programs to displays. In one embodiment, one may provide such an implementation on a PC graphics card with multiple outputs such as 3 video program outputs to 3 different monitors.

It should be clear that the ability to concurrently display 2 or more video programs at the same time may greatly enhance a multi-media experience. In one example, such a multiplexed program may show a scene which is recorded and multiplexed along a beach, wherein one video signal shows the sea, a second program shows the beach line and a third program shows the dunes, all recorded at the same time.

One may also have a multiplexed signal that contains 2 or more video programs that have scenes that take place at the same time but are at different locations. Those scenes may be related. Thus the displayed multiplexed programs may show a story line that develops at for instance different locations.

In a further embodiment one may have a multiplexed signal that represents a broad scene, which would be impossible to record from a short distance by a single camera/lens combination without distortion, but may be recorded by 2 or 3 or more cameras.

In a further embodiment, the video programs may be 2 or more video programs that are part of a video game, so they can be displayed at the same time. For instance, First Person game programs like Quake of Id Software of Mesquite, Tex. are very popular. They show scenery from a first person perspective and/or like a person represented by a camera would see. A person may turn in a certain direction which is displayed on a monitor like turning of a virtual camera. A person in such a game generally moves in the direction of the camera. Camera direction and speed of moving are controlled by a game controller. Because of the use of a single monitor and a single virtual camera this provides a one-dimensional view of reality. In reality, a person may look left, right, behind, up and down to scan what is going on and focus on areas of interest. The limited view of a single virtual camera limits the experience of a gamer. For instance, in a game a person who is the player may move forward in a hall way in a building to a group of people, who may be enemies. On the left side of the person a door may open. On the right side a door to a room is open showing a second group of people who may be enemies. In reality, a person may move back quickly scanning left, right and front and even looking back keeping an overview and reacting to an immediate event at any of the scanned locations. Presently, with one camera view, there is a limited possibility of moving back and viewing three or more locations at the same time. Accordingly, the methods and systems provided herein as aspects of the invention greatly enhances the sense of reality of a video game by providing 2 or more concurrent views of one of more scenes from different perspectives or positions.

A video program in a game is in generally a series of graphics filling a screen or a frame which is generated by a graphics engine and which may simulate a 3D environment. The graphics representing a 3D environment and generated by a graphics engine are displayed on a display. The graphics engine calculates aspects of a scene, which may include perspective, lighting, collisions, objects and other graphics aspects at a rate that provides in display an effect of a real-time 3D environment, not unlike an animated movie or video. The technology of graphics engines is known and is for instance disclosed in U.S. Pat. No. 6,961,055 to Doak et al. and issued on Nov. 1, 2005 which is incorporated herein by reference. The graphics engine is required to calculate sufficient frames to provide the fluid movie effect. In general, the graphics engine calculates the images that can be viewed within the field of view of a virtual camera representing the first person. Such a view may be limiting and may not provide a fully immersive 3D experience.

A stereoscopic horizontal field of view of a person may be between 100 degrees and 120 degrees. With a moving head to left and right a person may have a near real-time field of view of greater than 180 degrees. A person in a game may be provided a wider field of view of the game environment by displaying concurrently and synchronized at least two video representations on at least two displays that cover a larger field of view than normally provided in a game. In general one would want at least 3 concurrent and related images being generated and displayed on 3 displays. One image for forward vision, one for left side scene vision and one for right side scene vision, each being captured by a virtual video camera.

There may be different embodiments for a graphics engine to calculate the images. In a first embodiment, a graphics engine may calculate the complete wide field of vision scene. This may, for example, involve a field of vision of 210 degrees. A calculated screen or single image of a series of images that would form the video image may then be divided into three displayable images. Each image may then be provided to a display. As an intermediary step the graphics engine may store a signal representing each of the images to be displayed in a contiguous manner in a memory or storage medium. As was shown before, this allows the three images to be read from memory or storage to be displayed concurrently and in a synchronized fashion.

In another embodiment, one may instruct the graphics engine to only calculate the wide field of view image when multiple displays are available. If only one display is available an instruction may be provided to the graphics engine to calculate only a single camera view with a limited field of view.

In yet another embodiment, one may instruct the graphics engine to calculate three or more screens each related to a view of a virtual camera in a 3D model of one scene of the environment. An embodiment for rendering two or more independent images to be displayed on two or more displays is provided by U.S. Pat. No. 6,885,374 to Doyle et al. issued on Apr. 26, 2006 and which is incorporated herein by reference. A program or a graphics engine of a video game in general has the model, sometimes called the map, of a game environment having all the elements that can be shown on a display. It may contain lighting models, object models of objects in the environment. A map or a situation of a 3D environment may for instance be stored in a memory or storage medium. If a player revisits part of a map it may thus retrieve the map to show how it was left by the player. A graphics engine may thus use or re-use earlier calculated or already established elements of a screen. Accordingly, by using and/or re-using earlier calculated elements the calculation of a screen that is related to another screen which may be a screen related to a center vision virtual camera of one scene and thus is not independent, may be easier to perform by a graphics engine.

As an aspect of the present invention two or more related video programs are acquired and are played are played concurrently on two different displays. It is also provided as an aspect of the present invention that the two or more video programs may be recorded concurrently. The video programs may be combined in a multiplexed signal and stored on a memory or storage medium. The programs may be retrieved and played on a display and may be displayed concurrently and synchronized in accordance with a further aspect of the present invention. In a game or a video display this may provide an effect of immersion and of having a very wide field of vision.

A stereoscopic horizontal field of view of a person may be between 100 degrees and 120 degrees. With a moving head to left and right a person may have a near real-time field of view of greater than 180 degrees. A person in a game may be provided a wider field of view of the game environment by displaying concurrently and synchronized two video representations that cover a larger field of view than normally provided in a game.

In one embodiment, the displays for concurrent and synchronized display of the two or more screens related to a scene in a computer game are separate displays. It is known that one can combine different video images and display these combined, such as side by side on one video screen. In accordance with a further aspect of the present invention, a multiplexed signal containing two or more video programs are displayed concurrently and synchronized on a single display screen.

In a preferred embodiment of the present invention, display signals for different displays are stored in a contiguous and multiplexed way in a memory, a buffer or a storage medium, so that playing of the different displays can take place by substantially un-interrupted or jump-free reading of the memory, buffer or storage medium. Jumping in this context is intended to mean jumping between substantially not contiguous memory addresses or storage locations. Jumping may create an interruption or pause which may be noticeable in writing a signal to a display or in switching between displays.

Figure 35:
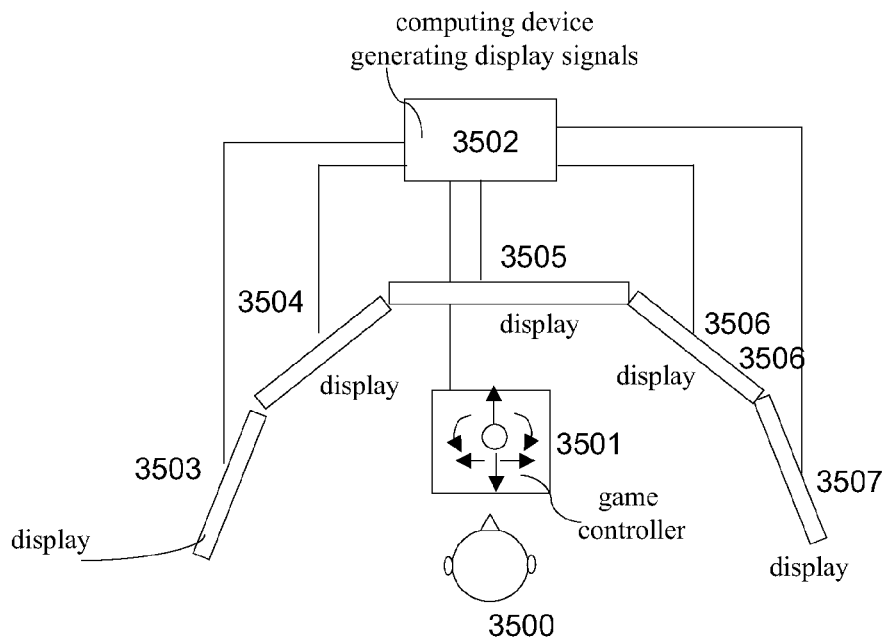
FIG. 35 is a diagram of a system in accordance with an aspect of the present invention.

A game having the capabilities to show multiple scenes concurrently and synchronized after possibly being read from a storage or memory medium provides a player a capability to move a person in a game smoothly and provide the player with a wide field of vision, and increase a near real-time field of vision by allowing a person to look from left to right. To provide a further realistic experience a game may be implemented having a controller that allows a person to look around and move at the same time. A program of a video game in general has the model, sometimes called the map, of a game environment having all the elements that can be shown on a display. A diagram of such a system is provided in FIG. 35. A user 3500 may play a game displayed at 5 displays 3503, 3504, 3505, 3506 and 3507. The game is generated by a program containing a graphics engine and generating display signals in a computing device 3502. The user may use a controller 3501 connected to 3502. This controller may be a joystick allowing the user to move within the 3D environment generated by the game. The user may move by moving the controller along the direction of the vertical and horizontal arrows in 3501. A user may also change a view of a scene by rotating the controller around its vertical axis in a clockwise or counter clockwise direction as provided in 3501.

A graphics engine calculates the actual image that will appear on a display. In general, there is no need for a graphics engine to calculate the elements that are realistically not visible to a camera representing the player. In a further embodiment of the present invention, a graphics engine may calculate in a game for display a scene of a wide field of view beyond that of a single camera. One may display a wider field of view in the game on a display or on multiple displays. In a further embodiment, such a game having a wide field of vision may have a controller that controls movement of a person in a game and the direction of a camera in a game.

One controller having such capabilities is, for instance, disclosed in U.S. Patent Application 20070035516 to Voto et al. published on Feb. 15, 2007. This allows a person to look left and right in a game by rotating a joystick and moving in a game by moving the joystick in the direction of movement. In accordance with a further aspect of the present invention, a gaming system may also have multiple programs being displayed concurrently and synchronized. This allows a person in a game to look in one direction, while moving in another direction. The concurrently and synchronized displayed video programs may be retrieved from a storage and memory medium. The concurrently and synchronized displayed video programs stored on a storage and memory medium may be stored as a multiplexed signal. They programs may also be retrieved individually from a storage and memory medium and stored in such as fashion inside a playing system that they can be played concurrently and synchronized.

Embodiments of Storing Multiple Video Programs

In another embodiment of the present invention, one may store individual video programs or screens generated by a graphics engine in a non-multiplexed manner on a storage medium or a memory medium or a buffer. The multiplexing function as described for instance in FIG. 25 may then be performed for instance as a pre-processing step to the method as described in FIG. 27. The reading of the signal of 2701 will then be the reading of individual signals. The system 2702 will combine these signals as time-multiplexed and contiguous signals and store them in for instance a memory 2703. The demultiplexing and playing may occur in accordance with aspects of the invention disclosed herein.

Figure 29:
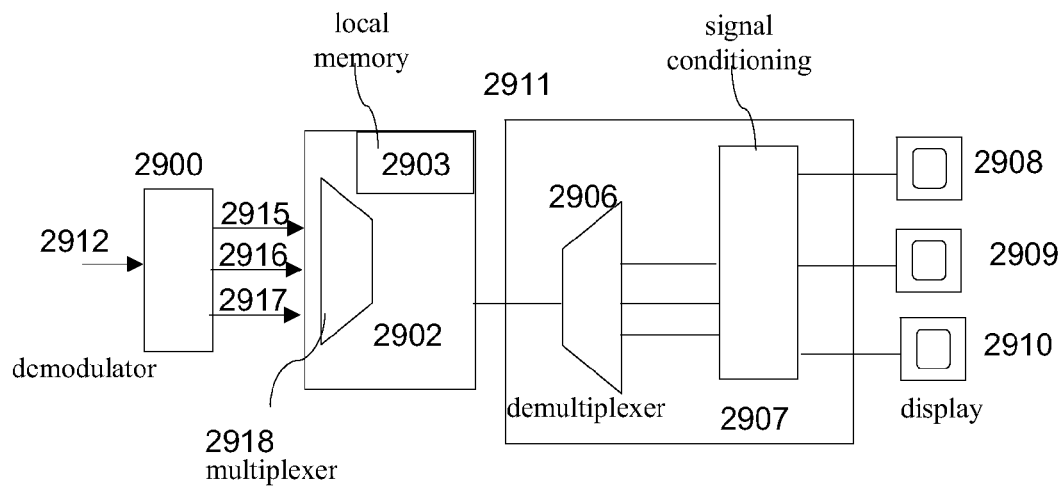
FIG. 29 is a diagram of a system in accordance with an aspect of the present invention.

In a further embodiment, a system is provided that may receive a multiplexed signal such as a QAM modulated signal that contains several video programs that may not be time multiplexed is shown in FIG. 29. Two or more of these signals may be synchronous and may be video programs representing recording or registration of a scene from different locations. A signal 2912 which may be a QAM signal is received, is demodulated by demodulator 2900 which may also digitize the signals. For instance, 3 related digital video signals 2915, 2916, 2917 are provided to a computing device 2902. If the signals are not in a time multiplexed contiguous format the device 2902 may apply a multiplexer 2918 to create a time multiplexed signal and may store it in memory or storage device 2903. Playing of the multiplexed signal may take place by demultiplexing unit 2911 which may have a demultiplexer 2906 and a signal conditioning unit 2907 to provide signals to displays 2908, 2909 and 2910. The unit 2907 may also work in accordance with a demultiplexer and DSP as described in relation to FIG. 28.

In a further embodiment, a time multiplexed signal 2912 may be received. The signal may need to be demodulated and then provided to computing device 2902. It should be clear that demultiplexing in that case is not required. If the signal needs to be stored it should be stored in a contiguous way so that it can be played in substantially a jump-free way.

In accordance with a further aspect of the present invention, a camera is provided that may record 2 or more video images concurrently. A digital video camera that captures a video image and stores at least part of the image in a memory is known and is for instance described in U.S. Pat. No. 5,343, 243 to Maeda and issued on Aug. 30, 1994. Digital signal processing of a video image captured by a digital video camera is also known and is for instance disclosed in U.S. Pat. No. 5,568,192 to Hannah and issued on Oct. 22, 1996. Both patents are incorporated herein by reference.

Figure 30:
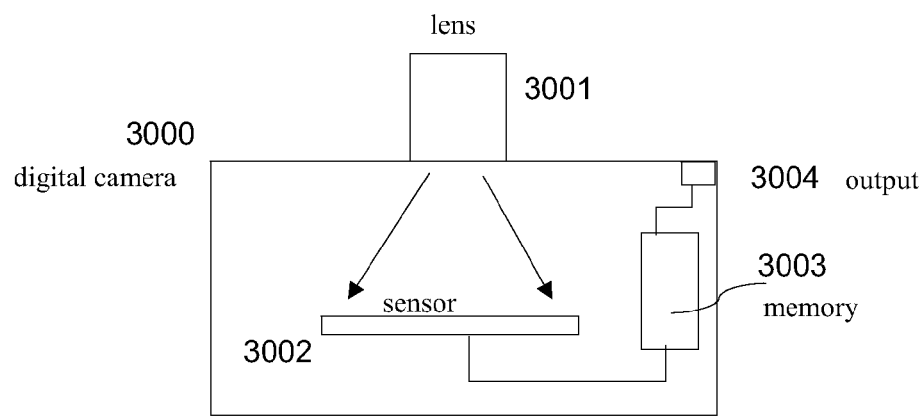
FIG. 30 is a diagram of a known video camera.

FIG. 30 shows in a cross-sectional diagram from above a digital video camera 3000. It has optics such as lenses 3001, an image sensor 3002 and a storage or memory unit 3003 which may also have processing capabilities. The camera also has an output 3004 which may provide the stored video image to the outside world. Up to recently, the memory of 3003 would only serve a buffer function. However, the capacity of memory is now such that the memory may be in the order of Gigabyte capacity. If required, the video image may also be provided almost immediately via 3004 to a storage medium such as a storage disk. Such a storage medium may be located inside the body of the camera.

Figure 31:
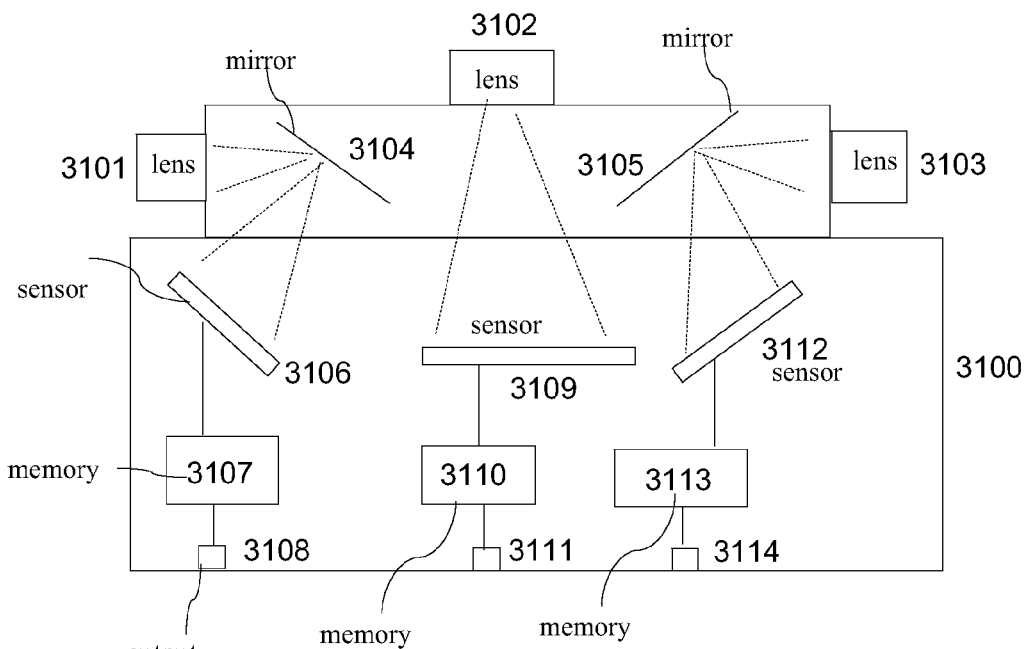
FIG. 31 is a diagram of a camera in accordance with an aspect of the present invention.

FIG. 31 shows a diagram of a video camera in accordance with an aspect of the present invention. A camera in accordance with an aspect of the present invention is able to record concurrently at least two video signals. The camera, as shown in diagram in FIG. 31, is able to record 3 video signals. It has a body 3100 which has three lenses 3101, 3102 and 3102 which may capture images of a scene concurrently from a different perspective. The lenses in this case have an angle of about 90 degrees. Lenses may also have a smaller angle with respect to each other. A camera may also have more than 3 lenses. Each lens has associated with it a sensor which captures a video image and may store an image temporarily in a memory. Lens 3101 has sensor 3106 and memory 3107. Lens 3102 has sensor 3109 and memory 3110. Lens 3103 has image 3112 and memory 3103. Lens 3101 also has a mirror 3104 to reflect an image on the correct sensor. Lens 3103 has mirror 3105. Mirrors may not be required if sensors are correctly aligned with lenses. Each memory has an output for reading the content of the memory. These outputs are 3108, 31011 and 3114. A memory may provide a signal when it has for instance a full frame available for downloading. This may allow an external device to read the memories for instance on a sequential basis: for instance first memory 3107, then 3110 and then 3113 to start with 3107 again. One may do this in such a way that a time multiplexed signal is formed or can be formed from the downloaded image signals. The dotted lines in the diagram indicate a path of a light ray.

Figure 32:
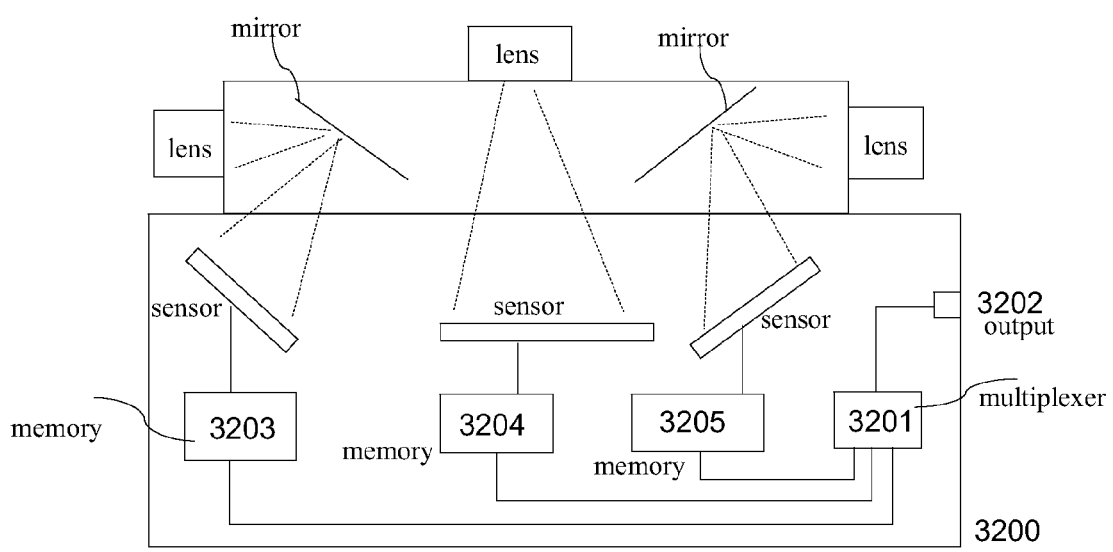
FIG. 32 is a diagram of a camera in accordance with another aspect of the present invention.

FIG. 32 shows a video camera in a further embodiment in accordance with an aspect of the present invention. The camera has a body 3200. Its lenses, mirrors, and sensors may be identical to the embodiment of FIG. 31. However, rather than providing individual video signals to the outside world, the embodiment of FIG. 32 may create its own multiplexed signal which may be provided to the outside world. Memories 3203, 3204 and 3205 which hold a captured image from a sensor may also have some processing capabilities to prepare a signal for multiplexing. A circuit may be under control of a clock signal, thus allowing a circuit to wait for its turn before it generates a signal. When it is a memory circuits turn to provide a signal, it provides its signal to a multiplexer 3201. The multiplexer 3201 may also have the capability to provide additional processing, including error correcting coding, image registration and providing synchronization marks. The multiplexed signal may then be provided on an output 3202. In a further embodiment the multiplexed signal may be stored on a storage device inside the body of the camera. Such a storage device may be a memory or a storage medium such as a magnetic disk or an optical disk, or any other storage device that can store the multiplexed signal. In a further embodiment the storage device may be removable and/or unpluggable from the body of the camera.

Accordingly, a camera is provided that can provide concurrent and synchronized signals which can be time multiplexed or are already time multiplexed. Further processing of the signals outputted by such a camera can then take place in accordance with one or more aspects of the invention as disclosed herein.

Figure 33:
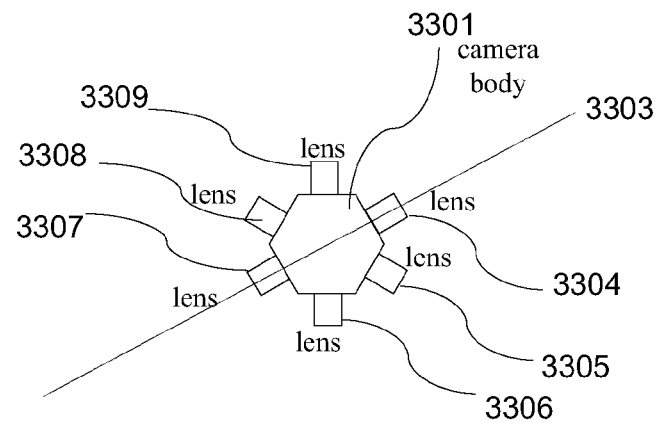
FIGS. 33 and 34 are diagrams of a camera in accordance with yet another aspect of the present invention.

The camera with a configuration as provided in FIGS. 31 and 32 cannot take a full surround picture because the body of the camera does not allow for looking backward. A further embodiment of a camera to take a series of full surround concurrent videos is provided in FIG. 33. The body 3301 herein as an illustrative example is in a hexagon. This allows the positioning of 6 video lenses 3304, 3305, 3306, 3307, 3308 and 3309 to capture 6 video images at substantially the same time. Other shapes of the body and different number of lenses are possible and are fully contemplated. The view of this camera is from above.

Figure 34:
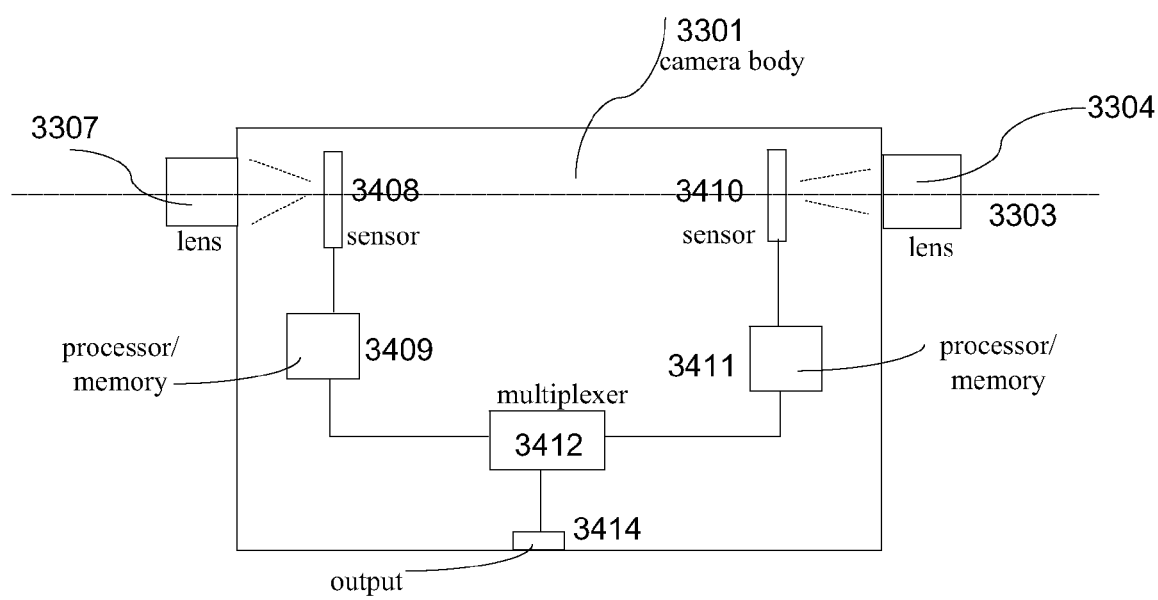

A line 3303 is shown through the camera from lens 3304 and lens 3307. A cross sectional diagram of the camera viewed from a side perpendicular to line 3303 is shown in FIG. 34. It shows body 3301 and lenses 3304 and 3307. The lens 3304 is associated with a sensor 3410. Lens 3307 is associated with sensor 3408. Sensor 3408 provides a signal that is temporarily stored in a unit 3409, which may have memory and also some processing power to condition a signal. Sensor 3410 provides a signal to 3411 which has substantially the same function as 3409. Both 3409 and 3411 provide a signal representing collected image data to a multiplexer 3412, which may provide a multiplexed signal on an output 3414. It is to be understood that each sensor may also provide its signal which may be collected in a memory first in an individual fashion to a dedicated output.

In each configuration of FIGS. 31-34, each sensor may provide a signal to a common output in a fashion that is controlled by a clock, thus effectively working as a time division multiplexer. This may work in real-time under condition of the enabling clock speed complying with the sampling theory. These are merely illustrative and not limiting examples. Many different configurations are possible to create a time multiplexed digital signal from a plurality of image and video sensors.

Figure 36:
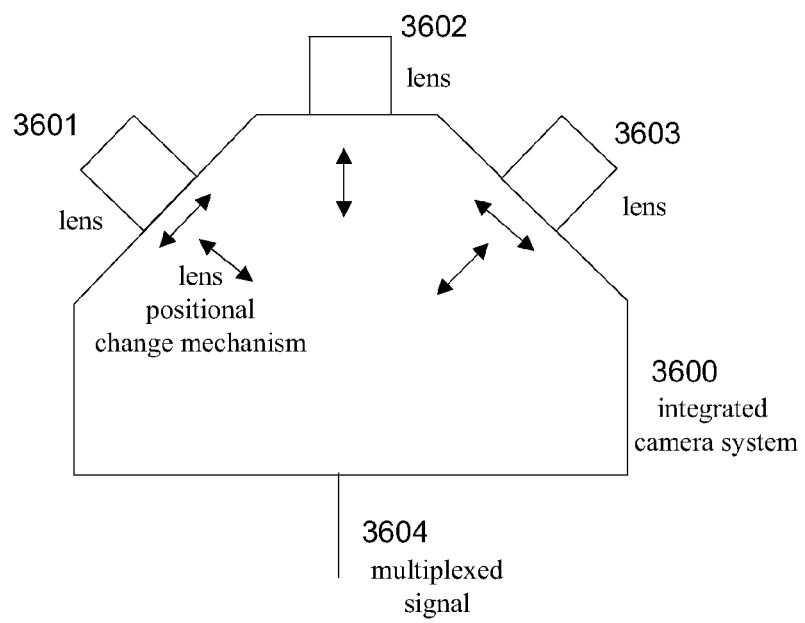
FIG. 36 is a diagram of a camera system in accordance with an aspect of the present invention.

Video cameras may be used in an integrated body. They may also be used as separate units. In a preferred embodiment two or more video programs which may be recorded as video images by cameras from one scene from different views or locations should be played in a concurrent and synchronized function. These video images may be processed and stored before being displayed. A diagram as an illustrative example in accordance with an aspect of the present invention of an integrated camera system 3600 is shown in FIG. 36. It is to be understood that such a system may comprise also 2 or 3 or more than 3 cameras or lenses. The camera system has 3 lenses 3601, 3602 and 3603. The system collects the camera signals from each camera or sensor belonging to a lens. The system may time division multiplex the signals each representing an individual video program and out put a time division multiplexed signal on output 3604. The intention may be to input this signal to a display system having three displays and showing the three programs concurrently in a synchronized way. For instance, the scene may be a sports game wherein the three lenses provide an overview of the area where a sport is played, such as a stadium.

At the present time of the invention, fairly large flat video displays are becoming available. As an aspect of the present invention, one may provide multiple of these displays to show the multiple video programs as provided by a time division multiplexed signal on output 3604. The current displays are provided with their own body or encasing. This means that screens as provided in FIG. 35 will not show a seamless integrated picture. The rim of each display will clearly prevent such seamless integration. However, it is still desirable to show on each display an image that is consistent with the other displays. Such consistency means that all displays show images that are what is known in the art as registered images. This means there is no noticeable jump in for instance details, size and alignment of images in the details. Registering techniques are known and may be applied as an aspect of the present invention. Such registering may be required if one uses a seamless display that includes at least 2 individual displays of which the display screens are connected seamlessly.

The easiest way to register images is to record images with cameras that are synchronized and aligned with each other. The simplest way for a multi-camera system with for instance 3 image sensors is to use three lenses set on focus and other characteristics that will provide images that will appear as registered. However, often one may want to zoom in or out from a detail. This may require that all three lenses zoom in and out in the same way. This may create a change in size of an image with as a result that the three images provided may no longer create a registered image compared with for instance a pre-zoom position. In one embodiment, one may create a calibration table for different settings and position of the lenses, wherein each setting belongs to a different zoom status and creates a registered 3 images. One may provide these settings in a memory and provide the lenses with motorized controls. FIG. 36 shows that lenses 3601 and 3603 may for instance be changed in a horizontal position. They may also be able to pivot in a plane. One may take the focus and zoom position of lens 3602 as a lead position and adjust the settings of the other lenses based on the earlier calibration settings. One may do that by storing the setting of lens 3602 in a memory; create a registered 3 image display by also adjusting the settings and relative position of lenses 3601 and 3603; and associate the position and setting of the lenses 3601 and 3603 with a specific setting of lens 3602. When lens 3602 is then put in a focus and/or zoom position, then a processor or a controller may retrieve the associated settings of lenses 3601 and 3603 from memory and may drive the lenses 3601 and 3603 in the associated position. Thus, one creates automatically a setting that will generate a registered display of multiple image on a display, in this example of 3 images. Preferably, this is done by using motors which will put lenses in their correct relative position, zoom position and focus position. A change in the setting of lens 3602 will then result in an automatically correct setting of lenses 3601 and 3603

In a further embodiment, one may calibrate an integrated camera setting for a scene for one or more zoom positions. Using such a calibration method allows a camera to zoom in on an object while leaving all images registered if all cameras are for instance motorized and are working with a calibration table, which may be stored in a memory. In yet a further embodiment, one may leave some cameras in a registered image position while focusing one camera in a more zoomed position. If one so desires, by using the calibration table, one may return to a full registered situation for all images.

Figure 37:
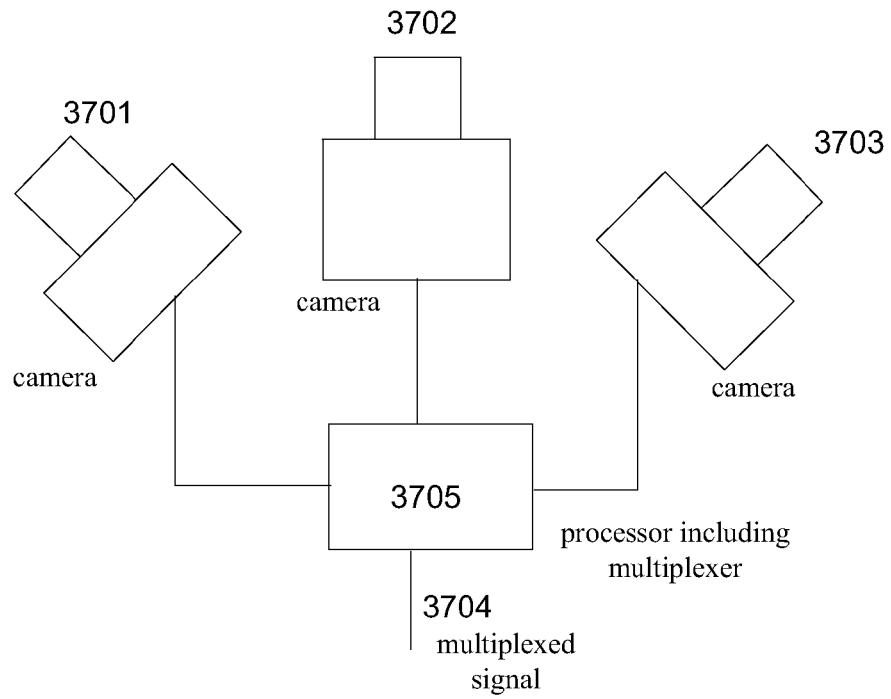
FIG. 37 is a diagram of a camera system in accordance with another aspect of the present invention.

FIG. 37 shows a camera system wherein the cameras are not embodied in one body but may reside on different locations. Cameras 3701, 3702 and 3703 then provide their signals to a computing system 3705 which may provide a time division multiplexed signal 3704 containing the time division multiplexed video programs of the three cameras. As with the system as shown in FIG. 36, the cameras and their lenses may be motorized in order to calibrate the system and create registered images for a range of settings.

Figure 38:
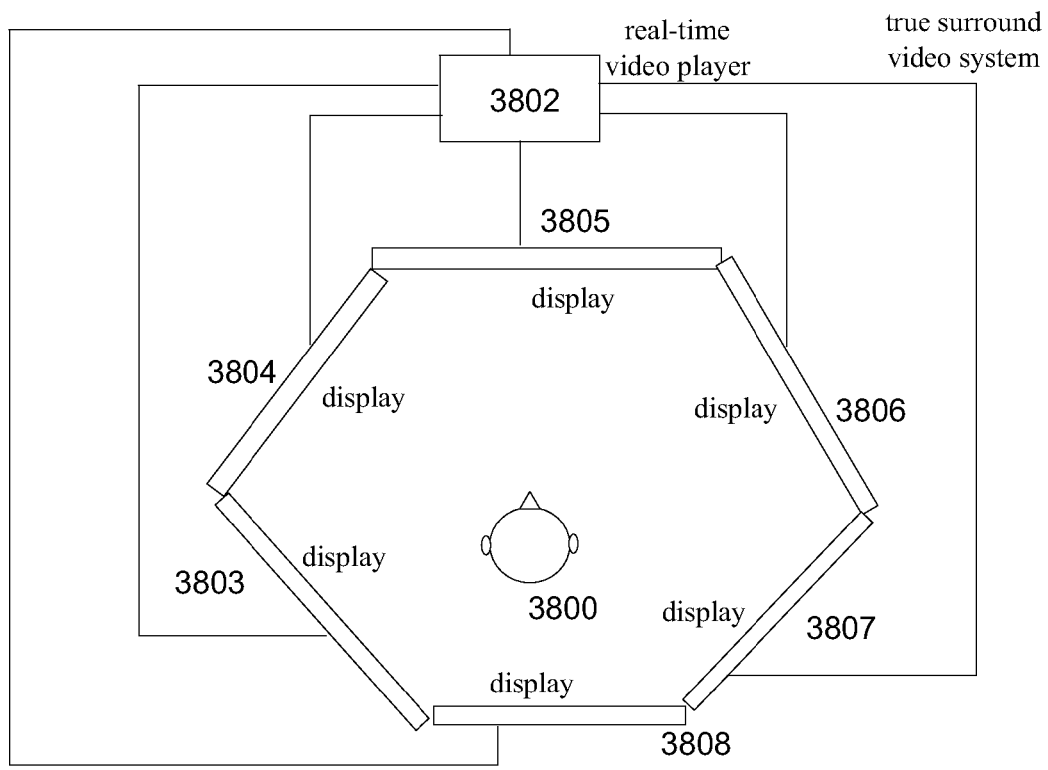
FIG. 38 is a diagram of a surround video display system in accordance with an aspect of the present invention.

FIG. 38 shows a diagram of a true surround video system, wherein a viewer 3800 is completely surrounded by video screens 3803, 3804, 3805, 3806, 3807 and 3808. The video programs may be played in real-time by a player 3802 in accordance with an aspect of the present invention of demultiplexing a multiplexed signal of in this example 6 video programs. Such programs may be recorded with a camera as shown in diagram in FIG. 33. Different video surround configurations with more or fewer displays are possible.

In one embodiment one may use a hard disk drive as a further storage medium to play signals such as video programs from. A hard disk drive with for instance a magnetic storage medium may have a storage capacity of over 100 GB and a consistent data transfer rate of up to 125 Mbytes/sec. Furthermore, a maximum access time of 5 ms may exist. It may be that a video program may require a transfer rate of 5 Mbit/sec for playing in real-time. That means that 3 video programs require 15 Mbit/sec of data transfer. Such transfer is well within the limitations of the transfer rate of a hard disk drive. Three hours of video programs requires 3*3600*15=162 Gbit≈21 Gbytes of storage. All of this is well within the limitations of the hard disk.

One may use different embodiments for the storing and reading of data. The following is just one embodiment and others are possible. It may be that the reading speed is too high for direct playing. Accordingly, one may use one or more buffers to store data retrieved from the hard disk, provide the data to a player and retrieve additional data from the hard disk. With an access time to hard disk data of 5 ms one may for instance read data for about 900 ms. Assume that video program data can be stored on a hard disk is contiguous blocks of 300 ms of data at a transfer speed of 300 Mbit/sec. That means a block of 0.3*300=90 Mbit. A block of 90 Mbit is equivalent to 3*30 Mbit or at 5 Mbit/sec for real time playing 6 seconds worth of data for 3 video programs, which can be transferred from the hard disk within a second. One may thus store one a hard disk in a contiguous fashion a first sequence of data representing a first program for 5 seconds, followed by data for 6 seconds of a second program, followed by data for 6 seconds of a third program. The data of each program are written to a buffer for a player of each video program, a buffer which may be a flash memory of larger than 30 Mbit. Each buffer is read to the player at the required real-time speed of 5 Mbit/sec. Around a critical level of for example about 1 second of unread data in a buffer one may start again a reading process and fill the buffers.

Figure 39:
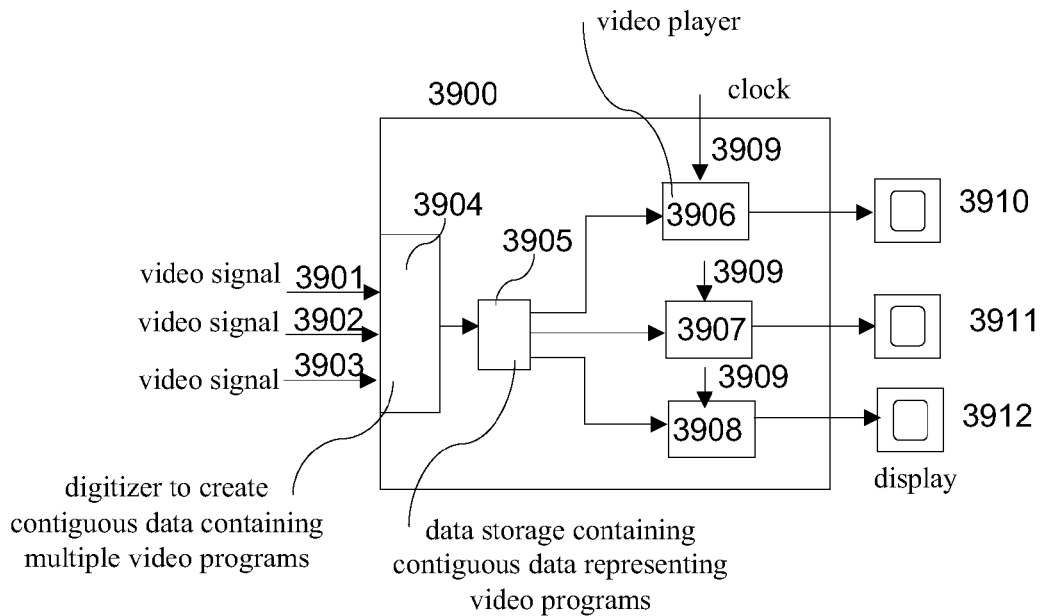
FIG. 39 is a diagram of a multi-program video playing system in accordance with an aspect of the present invention.

This is shown in FIG. 39. Three video programs 3901, 3902 and 3903 are provided to a computing device 3900. The programs may already be digitized, or they may be in analog form or even modulated and may be demodulated and may be digitized in a unit 3904. However, the task of 3904 is to prepare the three signals for writing in contiguous form to a hard disk or memory 3905. The unit 3904 itself may contain a buffer to achieve the writing. The writing speed to the hard disk is at least an order of magnitude higher than the transfer speed of the video program. The data representing part of 3 video programs may be stored in a contiguous way on hard drive 3905 for instance in accordance with the diagrams of FIG. 3a wherein each block of data would be equivalent with 30 Mbit of data in the above example. After reading a block it is transferred to the related player which may have a buffer to store a certain amount of data such as 30 Mbit of data. The three players with a buffer are 3606, 3607 and 3608. Each player will decode the stored signal and provide a playable signal to displays 3910, 3911, and 3912. Each buffer/player may be under control of a clock signal 3909.

One may separate the functions of writing to and reading from a hard disk. For instance one may write the three programs on a removable hard disk in accordance with the above procedure. One may place the removable hard disk or memory in a different computing device for reading and playing of the three programs.

In a further embodiment one may use a different storage medium for storing the three programs. For instance one may use an optical disk, a magnetic tape, a mass memory or any other medium that can store blocks of data representing 3 or more video programs that can be read at least 3 times the speed of reading for real-time playing of a program. In general optical disks such as DVDs play at real-time. However, as provided in the example case of the n-valued or n-state optical disk, the transfer speed and the storage speed of disks may already exceed the requirements for real-time playing of a single video program. It is then possible to store at least 3 normal DVD programs on a High Definition optical disk and play those disks at least 3 times the single real-time playing speed. Recording speeds of 16× are already possible. The technical capabilities of optical disks for storing and playing as disclosed above and in FIG. 39 are thus already possible. Flash media of 30 Mbit are also available. In a further embodiment, one may replace an optical disk or a magnetic disk with a mass memory, also called a solid-state drive (SSD). Commercial SSDs with a capacity of over 250 GB and very high transfer rates are currently available.

The same reasoning applies to magnetic and to optical and electro-optical and magneto optical tapes and to any other medium that meets the requirements for playing and storing at least 3 video programs in real-time.

While in the illustrative example video programs are used, one may also apply aspects of the invention to still images.

It should be clear that the writing speed to media is not as critical if one does not want to play almost immediately after writing.

In general the embodiments provided herein provide first a demultiplexer and then provide a playable signal to a player for a display. This means that each player receives what one may call a base-band or demultiplexed signal. One may also provide a complete multiplexed signal to a player. This means that each player may also have the capability to demultiplex a multiplexed signal, as is shown in FIG. 11.

The video signals that are provided herein may be accompanied by audio signals and other signals that may be multiplexed into the final time division multiplex signal.

There are many opportunities to process a video program from recording to replaying. In accordance with an aspect of the present invention a video program that is to be time division multiplexed, will be sampled and digitized. Digitizing may be in binary form. It may also be in non-binary or n-state form. It also may be compressed. At the point of multiplexing the video program is represented by a signal that represents a video quality that meets a certain quality standard. It may have a standard DVD quality. It may have a High Definition Video quality. It may have any other quality standard. A video is assumed to record an image that can be played in real-time. In accordance with an aspect of the present invention that means that a real-time video shows the same number of image frames as was recorded. For instance a recording speed for a High Definition TV camera may be 60 Hz or 60 frames per second. In accordance with an aspect of the present invention a multiplexed signal containing a HD quality 60 Hz frame speed may be recorded, stored, retrieved, demultiplexed and reconstructed to play at substantially the same quality as it was recorded. Some quality might be lost due to noise or errors. But the real-time display of a video program substantially shows the same program as was recorded.

Many video programs are nowadays being watched on small portable device of just several square inches to fairly small displays in airplane entertainment systems for instance. The smaller size of displays means that the high number of pixels in signals required for large screens and displays are not required for smaller displays. This allows for further compression of a video signal and thus a greater storage capacity on a medium. In some displays one may use transfer speeds for real-time video from 800 kbit/sec to about 2.5 Mbit/sec. This lower speed than a common 5 Mbit/sec may increase the capacity of storing more video programs on a medium.

Mass memories such as flash memories and mass storage such as magnetic disks may have a relatively long random access time, sometimes up to 10 ms. However, their serial access time is fast. This means that once the data is stored in a contiguous areas in high capacity, high transfer rate memory or storage medium one may read a stored multiplexed signal at sufficient rates for real-time display of the individually video programs embedded in the multiplexed signal. For instance Samsung in 2008 announced development of a 2.5-inch, 256 Gigabyte (GB) multi-level cell (MLC) based solid state drive using a SATA II interface, which it claimed to be the world's fastest at the time of its announcement. With a sequential read speed of 200 megabytes per second (MB/s). This is sufficient for about 10 programs of 2 hour HD video programs of which each requires a transfer rate of about 20 Mbit/sec. Currently, single drives usually for enterprise purposes are available with spindle speeds of 15K and a transfer rate of over 150 Mbyte/sec for instance from Seagate.

In accordance with an embodiment of the present invention one may thus multiplex from external sources, for instance from a transmission of a video program, a reading of an optical disk, reading from a storage or memory medium, at least two or at least 3 video programs; one may then multiplex those programs into a single time division multiplexed program that is stored in a substantially contiguous manner on a memory or a storage medium. Substantially contiguous in this context means that in a single reading cycle sufficient real-time playable signal can be recovered and for instance buffered if required for playing all stored video programs, without requiring additional or repeated searching. The reading device may require a certain access time to find the next contiguous sector of data to be read if two sectors are not contiguous. However, it is assumed that the searching and access time for such a sector is not longer than the real-time play time of buffered programs. This will have the effect that all programs may be played in a seamless fashion without noticable interruptions. In a further embodiment a two or more sectors are stored in a contiguous way.

The above is significantly different from standard DVD formats. Herein a video program may be recorded from different angles, wherein the programs may switch between the different angles. However, without adjusting the rotation speed of the played DVD it is impossible to play two or more angles at the same time in real-time with program quality that is the same as playing just one angle in standard quality, which may be High Definition (HD) quality. In order to facilitate the playing of two or three or more programs at the same time from a single medium one thus requires:

1. an ability to record and to store as a concurrently playable digital signal two or three or more video programs on a storage medium;

2. an ability to read the two or three or more programs represented in a signal such as a digital signal in a fashion that it meets the limitations of the sampling theorem;

2. an ability to decode the two or three or more digital sequences into two or three or more playable programs; and 3. a display for displaying each of the two or three or more playable programs.

In a further embodiment one may also display the 2 or 3 or more playable programs on a single display.

It has been shown how two or three or more video programs can first be stored in a contiguous and multiplexed way on a storage medium that can be read at a speed that is a multiple of the reading speed required for playing a single program in real time in standard quality. If the reading speed of the medium is too high, buffers may be used.

An attractive possibility of having multiple programs being displayed at the same time is to display video programs of one scene or event being recorded and displayed concurrently at different displays in such a manner that a wider view of the scene or event is provided. This provides an immersive video experience. The recording of such a scene requires a special camera or a special arrangement of cameras.

Figure 40:
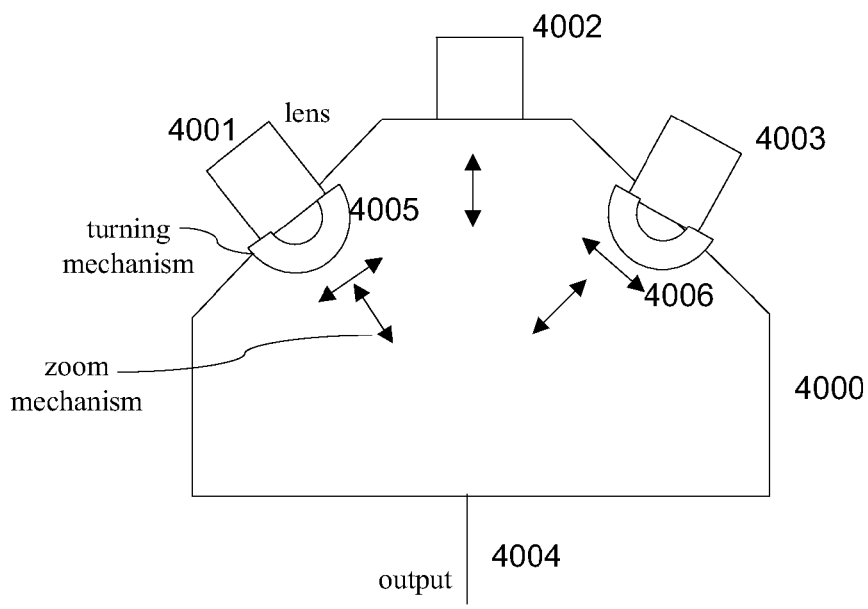
FIGS. 40 and 41 each provide a diagram of a video camera in accordance with one or more aspects of the present invention.

FIG. 40 shows in diagram in accordance with an aspect of the present invention a camera that may record at least three video programs that can be displayed in such a way that it appears as one continuous video program. It should be clear that one may expand the camera for recording more than three video programs. One may also create a camera for recording 2 video programs. A camera 4000 in this illustrative example has at least three lenses 4001, 4002 and 4003. Each lens may have its own optical sensor. Each lens is also provided with a mechanism to focus a lens. Each lens is also provided with a mechanism to zoom in or to zoom out. Such a mechanism may be a motor like an electrical motor. The field of view of a lens is influenced by its zoom. Zooming may bring an object closer, however, it also makes it field of view smaller. It may be that one selects an angle between lenses so that fields of view in maximum zoom still overlap so that one may create one apparently continuous video. However that may also mean that one has a significant field of overlap at minimal zoom, which means a non-optimal field of view display. The camera as shown in FIG. 40 can address this problem. One may assume that lens 4002 is the center lens. This means that lenses 4001 and 4003 during recording and zooming have to be adjusted to lens 4002. This can be done with a coordinated mechanism. A coordinated mechanism may comprise electrical motors. The lens 4001 has a mechanism 4005 and lens 4003 has mechanism 4006. The mechanisms include a zoom in and zoom out mechanism, which may be electrical motors. The electrical motors may be stepping motors, or any other motor that may but an object such as a lens in a predetermined position. They also include a turning mechanism. Such a turning mechanism cause lenses 4001 and 4003 to turn or rotate toward lens 4002 when the lens 4002 is zoomed in. These turning mechanisms may also be driven by motors such as electric motors. The mechanisms 4005 and 4006 also adjust the zoom factor of lenses 4001 and 4003. When lens 4002 is zoomed out the mechanisms 4005 and 4006 may cause the lenses 4001 and 4003 to be turned away from lens 4001 to provide a maximum field of view. The camera provides a signal on output 4004.

One way to coordinate the mechanisms is by calibrating the mechanisms on maximum zoom and minimum zoom and intermediate positions to provide a continuous picture from the camera on three displays. To combine different images in an aligned way in order to provide a common picture is called registering images or image registration, which is a known technology. This technology is also known as image stitching. An overview of known image registration methods is provided in Zitova, Barbara and Flusser, Jan: "Image registration methods: a survey" in Image and Vision Computing 21 (2003) pages 977-1000, and in Richard Szeliski, "Image Alignment and Stitching: A Tutorial Preliminary draft", Sep. 27, 2004 Technical Report MSR-TR-2004-92, Microsoft on-line, 2004, which are both incorporated herein by reference in their entirety. Image registration is generally applied to still images, to create for instance an image mosaic or a panorama view. One may also apply image registering or registration techniques to create a continuous and contiguous video image or video image mosaic that is made up from 2 or more video images. The registration requires that images have some overlap or at least share an edge. Image registration is able to stitch or connect images to a panoramic image. Image registration techniques also can perform task such as image transformation that may correct or modify lens distortion and parallax effects. Elements of image registration techniques are well documented in the literature and their applications are fully contemplated and may be applied to all aspects of the present invention.

Image registration may include transformation of at least one image to obtain a mosaic that reflects the correct point of view or to correct distortion by a lens. The matching or aligning of images for image registration may be performed by instructions executed by a processor combined with computer memory.

In one embodiment of the present invention one may create different 3D video images of a scene with a single multi-lens camera or with multiple cameras and combine those into an aligned and concurrently played video image providing a panorama view of the scene in a single image.

In a preferred embodiment the video images are 2 or more or 3 or more 2-dimensional video images taken by a single camera with multiple lenses. As shown in diagram in for instance FIGS. 36, 40 and 41 a video camera may have multiple lenses which are held substantially in a known position in reference to a body. It is thus fairly easy, by using a known scene, to calibrate the controlled lens positions and focus and/or zoom and pan with images of the other lens or lenses of the camera. In such a calibration case one may take one lens as the lead lens. The setting of a lead lens, such as focus and zoom is then associated with corresponding settings of the focus and zoom of the other lenses, to create a stitched or registered multi-image picture. One may store the positions or settings of the lenses in a memory and associate the required registration parameters to form one aligned image from each image sensor with those lens settings. One may calibrate those settings for instance from a close-by scene to a very far (infinity setting) scene. One may include different diaphragm settings, exposure time or shutter speed, zoom settings and/or focus settings to achieve optimal image registration already in the camera. A processor can thus align the images already in the camera.

One may also create a set of parameters associated with a camera or lens setting which may be stored in a memory or may be provided as a separate signal next to the image signals. One may store the images and related parameter settings in a memory or storage in the camera and provide all signals later to a processing system which may include a display to create a registered multi-video image and wherein the system applies the setting parameters to derive optimal registration.

In one embodiment the camera is a consumer product that may be designed to require almost no user settings. In such a case a set of lenses may be assumed to go through a predetermined set of lens settings, which may all be pre-set in a memory and/or automatic look-up table and has for instance be calibrated during manufacturing. These settings may be related to for instance a setting of one lens which may be a reference lens as part of multiple lenses. A user may manually provide or initialize the settings (focus, zoom, exposure time, diaphragm) which will be associated and corresponding to settings of the other lenses (which may include also a relative position). Based on the setting of the one lens or reference lens the other lenses will be put in the corresponding settings, for instance by a controller which retrieves these settings from a memory and based on these settings drives the other lenses in their respective positions to create a registered image.

The one lens may be put manually by a user in a preferred position. However, the one lens may also be automatically put in its preferred position, for instance by using an autofocus mechanism and a light detection mechanism. Accordingly, in a point-and-click embodiment, the one lens goes to its preferred settings based on the conditions and drags the other lenses with it to the respective related positions, which may result in a registered image. A user may then still manually select a zoom factor for the one lens, which will automatically force the other lenses in corresponding zoom settings, based on the initial calibration settings, so that a substantially registered image may be formed.

One may generate a code based on the settings of the reference lens. Such a code may form an address to a memory. One may also use a table, wherein the inputs are settings of the first or reference lens and the output is a code or a memory address. This means that every time the first lens is put in a certain position the same code or address is generated. The corresponding settings or setting data corresponding to the setting of a reference lens for the other lenses are then stored at such address in a memory and can be retrieved and used by a controller to put the other lenses in a setting corresponding to the setting of the reference lens.

In a further embodiment the calibration may take place for different settings. A first calibration may be for equal zoom for each lens. A second calibration may for instance be for a certain lens (such as a center lens) for having higher zoom than the other lenses. This provides some distortion in registrations that may be pre-set and implemented in a selectable calibration mode. Other selectable calibration modes for registration in multi-lens video cameras are also fully contemplated. Accordingly, it is not required from a user to perform image registration from searching image data; instead parameters that enable registration operations are associated with a lens/camera setting and may be used by a processor to automatically generate a registered image, without having to search for a point of registration.

One may in addition implement and use image registering techniques embedded in a processor or a program that can be executed by a processor in the camera on images that are already substantially registered. This has as a result that the camera in general provides a substantially registered video or still image which may be shown on three displays or on one display. In one embodiment wherein only one display is used only the image recorded by one lens may be displayed. In a further embodiment one may create a registered set of images and display it as a single image on a single display. One may also display the registered image on multiple displays.

One may also implement registering techniques on a displaying device. Based for instance on a setting of a lens the registering software may look in a certain area of at least two images to align or register the images for display on for instance three displays. One may also combine coordinating mechanisms of lenses with image registering techniques.

In one embodiment one may create a registered image out of the two or three or more individual images. By applying the settings created during calibration one may create images that are either completely or substantially registered. Registering software may be applied to tweak or fine-tune the registering process. Because of the earlier calibration, the image may require only minimal adjustment. For instance, registering software can be limited to look for matching objects or scenes within a limited range of pixels. Such software may locate optimal registration position by calculating a correlation between small areas, varying between for instance about 1 to 10 pixels in horizontal and/or vertical position of edges of two images that have to be registered. Such a pixel variation may in a further embodiment also be about 10 to 25 pixels. Such a pixel variation may in a further embodiment also be about 25 to 50 pixels. Such a pixel variation may in a further embodiment also be any pixel variation that allows a processor to determine an optimal registration based on a correlation between parts of two images.

One may create an adaptive or learning program that tunes for certain settings the registration accuracy. One may determine for each newly calculated registration setting a variation with previous settings related to the calibration setting. If such a change is greater than a pre-set limit one may store the newly calculated settings as the standard or calibrated setting.

Furthermore, it is possible that due to difference in lighting conditions, two corresponding and potentially overlapping areas of two images experience different average pixel intensity, such a pixel intensity per color in for instance an RGB color coding. One may implement a routine in a controller which calculates for instance average intensities, and will adjust settings to equalize the intensities. Rather than change the settings one may also "filter" one image to adjust the distribution of intensities of pixels in one image to the intensities of the other image to which it is being registered. One may provide a gradual adjustment, so that only the edge or part of an image is affected. Such adjustments may prevent noticeable edges between images.

In a further embodiment, instead of three lenses in one embodiment one may provide one or more sets of three or more cameras to record a scene or an event for display on three or more displays. In such a case one may have a coordinating mechanism for each set of cameras. For instance, a first set of three cameras that have a certain distance may be used to record an event over a broad field of vision. Such a broad field of vision may for instance cover a complete football field to be displayed on 3 or more displays. Another scene may involve a close-up of an event of for instance a return kick by a player and his environment. This may require a close up by three or more different cameras from the event. It may also involve a close-up by a single camera with a single lens. In case of a recording of a single camera to displayed by three or more displays the camera or the device processing the signals to be displayed may in accordance with another aspect of the present invention re-calculate the single video image in such a way that three video images are created that can be displayed individually on three or more displays.

In accordance with a further aspect of the present invention, two or more video programs are played in real-time using a stored signal or sequence of digital signals from a storage or memory medium, by using a single reader, the single reader reading a sample for each of the video programs within a time period that is smaller than required by the sampling theorem and making a sample for a video program available to a player for a video program at a speed that meets the requirement of the sampling theorem. A sample may be any type of sample. It may be a byte, it may be a block representing 3 seconds of video. In a further embodiment the samples are stored in a contiguous way on the storage or memory medium. This means that a storage medium storing for instance 3 video programs may read each of the samples of each of the video signals at less than three times the speed required by the sampling theorem to provide real-time video display for each of the programs. In yet a further embodiment, one may require that at least a series of samples belonging to the individual video programs are stored in a contiguous way on a storage or memory medium. This may require that the stored signals are retrieved at a speed significantly higher than dictated by the sampling theorem. One may buffer the retrieved signals. Time gained by reading faster may be lost by having to search for the next series of samples. One may thus see buffers fill and empty intermittently.

In yet a further embodiment of the present invention, one may store multiple video signals on an optical disk as a contiguous signal and retrieve the contiguous signal from the optical disk. In yet a further embodiment of the present invention one may store and retrieve the contiguous signal from magnetic disk. In yet a further embodiment of the present invention one may store and retrieve the contiguous signal from a memory element. In yet a further embodiment of the present invention the memory or storage medium may be removable.

Figure 41:
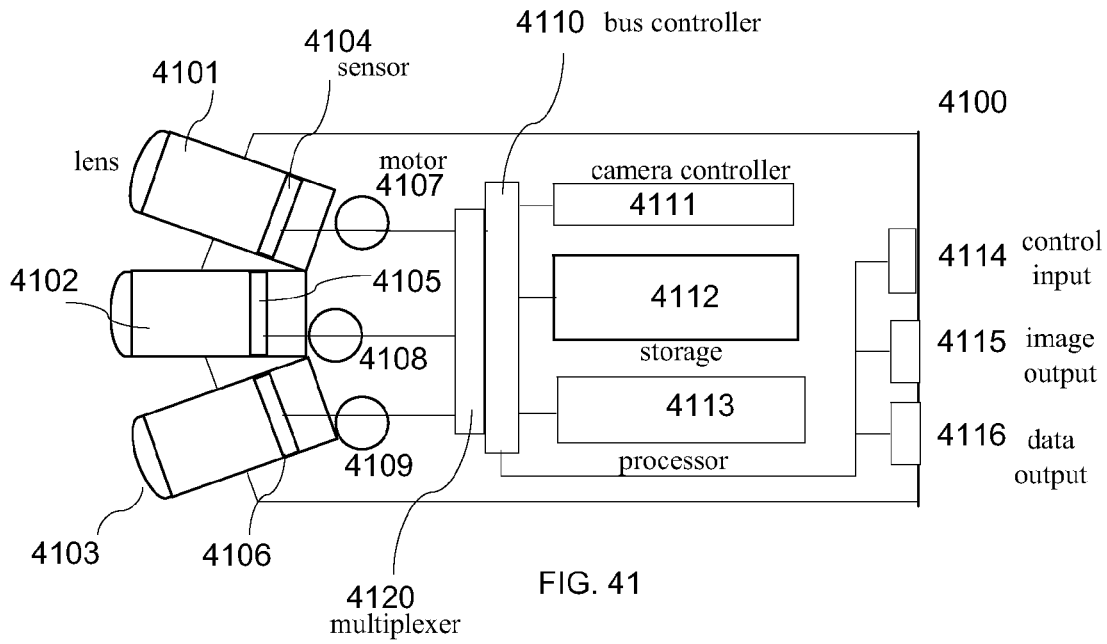

FIG. 41 shows in diagram an illustrative embodiment 4100 of a camera that can record at least 3 images concurrently of a scene from different perspectives or angles. The camera may provide a single multiplexed signal containing the three video signals recorded through 3 different lenses 4101, 4102 and 4103 and recorded on image sensors 4104, 4105 and 4106 and multiplexed through multiplexer 4120. The sensors may be connected on a network which may be bus controlled by bus controller 4110 and may store the image signals on a memory and/or storage medium 4112 which is also connected to the network or bus. Further connected to the network is a camera controller 4111 with its own memory if required. Also connected to the network are three motors 4107, 4108 and 4109 for zooming and moving lenses as required. The motors may be controlled by the camera controller 4111. Also connected to the network is a processor 4113 with its own memory for instruction and/or data storage if required. Furthermore, the network has a control input 4114 for providing control commands, which may include start recording, stop recording, focus, diaphragm, exposure and zoom commands. An input command may also include record only with center lens and sensor. An input command may also include record with all three lenses and sensors.

The camera also has an output 4115 which provides a signal representing the instant image of one or of all of the sensors. An output 4116 provides the data that was stored in the memory 4112. It should be clear that some of the outputs may be combined to fulfill the above functions. Furthermore, the camera may have additional features that are also common in single lens cameras, including a viewer and the like. These additional features are fully contemplated.

In a first embodiment, a user may select if images from a single lens or of all three lenses will be recorded. If the user selects recording images from all three lenses, then via the camera controller a control signal may be provided that focuses all three lenses on a scene. Calibrated software may be used to ensure that the three lenses and their control motors are focused correctly. A controller may have access to a memory that stores related settings. The controller may relate the settings of a single lens with the desired settings of the other lenses with the other lens settings being stored in a memory that can be accessed by the controller. In a further embodiment, the image signals are transmitted to the memory or data storage unit 4112 for storing the video or still images.

In yet a further embodiment the signals from the three lenses may be first processed by the processor 4113 to be registered correctly into a potentially contiguous image formed by 3 images that can be displayed in a contiguous way. Herein a processor may determine which part of a sensor area has to be actively used to create a registered image. The processor in a further embodiment may form a registered image from 3 images that may be displayed on a single display. The processor may also have a multiplexer that creates a multiplexed signal that is stored.

The processor in yet a further embodiment may also process the images so that they are registered in a contiguous way if displayed, be it on one display or on three different displays.

In yet a further embodiment, the processor may register the three images and multiplex the signals so that they can be displayed concurrently on three different displays after being demultiplexed.

After being processed the processed signals from the sensors can be stored in storage/memory unit 4112. In yet a further embodiment, the signals are not stored but are directly provided on an output 4115.

One reason for the different embodiments may be the preference of a user for a display and to make a camera potentially less complex and/or costly. One may for instance elect to make sure that all lenses and their controls are calibrated as to focus and/or zoom correctly in such a way that the settings of lenses follow automatically the setting of one lens. Accordingly, if a lens such as a center lens autofocuses on an object at a certain distance, and light conditions actuate a certain diaphragm (or aperture) and/or exposure time (shutter speed) then with these settings through the earlier calibration step, the settings of the other lenses are associated and may be stored in a memory. As a result of the actual settings of the center lens, the corresponding settings including focus of the other lenses are retrieved from the memory and used by for instance a controller to effectuate the corresponding settings of the other lenses. The calibrated settings should be such that the images generated by all the lenses may be combined to create a combined image that is completely registered or substantially registered so that no or little effort is required to create at a display a registered image.

Zooming of all lenses may be coordinated in a similar way. This means that zoom of for instance a center lens affects the zoom of the other lenses, including relative movement of the lenses to create a registered image, as field of view may change.

Based on one or more conditions, which may include distance from lens to object to be recorded, light conditions, zoom conditions, and the relative position of a lens to a reference point, a setting of a lens for taking an image may include: a focus setting, an exposure time or shutter setting, an aperture or diaphragm setting, and a positional setting of the lens in relation to a reference point. In one embodiment one purpose is to create a registered image from at least two or three images taken through two or three separate lenses, respectively. However, it is preferable that one creates a registered or panorama type of images without extensive manual settings of the different lenses.

In one embodiment, it is preferable to have a camera with multiple lenses. One may then assign one lens for instance a center lens if there are three lenses, as a reference lens. One may use the center lens to determine the conditions for taking concurrently multiple pictures or recording multiple concurrent video images that may be registered. For instance the center lens may have an autofocus mechanism, a shutter control mechanism, an aperture mechanism and a zoom mechanism. Such mechanisms may use a stepping motor or a piezo-electric mechanism, such as marketed by New Scale Technologies of Victor, N.Y. One may apply one or more sensors to determine distance to object, and lighting conditions. A controller, such as a microcontroller, may determine the optimal settings and set the operational parameters for the lens focus, aperture and shutter speed. One may use a controller or a memory to determine an optimal setting for a desired depth of the image. This type of system for a single lens camera or for a single camera system is known.

As an embodiment of the present invention one determines a setting for a predetermined condition (an object at a certain distance, a determined lighting situation, and a desired depth of image) and stores that setting in a memory. It is assumed that in this embodiment a camera has at least 2 lenses and each lens has a related image sensor. The image sensor data will be stored in image memory or on an image storage device, such as memory, magnetic disk, optical disk, or any other device that can store image data.

In a further embodiment, the image data is stored on storage medium that can store n-state symbols with n>2. An n-state symbol with n>2 means a single mark or a single signal that can assume one of n>2 states. So when one reads marks from the medium of device or memory a single mark will generate a single signal or symbol. This as opposed to multiple signals. As an example, an 8-state mark will generate a single signal having one of 8 states. This as opposed to an 8-state word of 3 bits. While such a word has one of 8 states, it is stored in general as 3 consecutive bits or marks on a memory or storage device. In a further embodiment one may write an n-state symbol as multiple p-state marks on a medium. For instance one may write at one write/read position on an optical disk 2 or more concurrent marks, whereby each concurrent mark reflects light at a different wavelength. Reading a mark may then generate 2 or more light signals at different wavelength, which can be translated into for instance a binary word of 2 or more bits.

In a calibration step one also determines the settings of the other lenses, including a position relative to the reference lens that will create on a display or on multiple displays a registered image. One then stores the settings of the other lenses in a memory in such a way that the settings are associated with the setting of the reference lens. When the reference lens detects a condition, it may retrieve from the memory the parameters to drive the reference by a controller into the settings related to the condition. The controller may then retrieve from the memory the settings of the other lenses corresponding to a setting of the reference lens so that when all lenses are put in the settings related to the condition determined for the reference lens all lenses are put in optimal setting to create a registered image.

Thus, one has created a point-and-click camera whereby one reference lens generates the information that allows the creation of a registered image. As an illustrative example, one stores settings of the reference lens in a memory and associates the settings of the other lenses with the stored settings of the reference lens. A controller that drives the settings of a lens, such as focus, shutter and aperture may do so based on dynamic input provided by condition sensors. One may program a controller so that it calculates a setting from sensor data, rather than retrieve a setting. In a further embodiment, a controller may just apply the settings of the reference lens to the other lenses. In a further embodiment, a condition determined for a reference lens may be coded as an address or a reference code that is stored in a memory. One may then associate settings of the other lenses with the address or reference code. One may also associate lens reference codes with the reference code of the reference lens that allows a controller to generate the settings that will provide all lenses with appropriate settings for a registered image. In a further embodiment it may be possible to calculate the settings of all lenses dynamically based on measured conditions of a single reference lens.

One may register images in the camera through the processor 4113. If the correct settings are selected, the images may already be registered. One may then multiplex the individual image signals. However, one may also provide the three images either directly or from memory as parallel signals to a computing device such as a personal computer. The computing device may provide the possibility to select, for instance in a menu, the display of an image of a single lens/sensor. It may also provide a selection to display all three images in a registered fashion. The computing device may then have the means to complete or fine-tune registering the images, though by using the calibrated settings no or little registering efforts should be required. The computing device may store the images in a contiguous fashion in a memory or a storage medium and play the images in a registered fashion either on one display or on three different displays.

For instance one may provide a signal available on output 4116, which may be a wireless output having a radio transmitter that can transmit the images as a wireless signal to a receiver. Accordingly, a camera may make 3 or more video images, which may be preferably multiplexed and registered or may be multiplexed and not completely and only almost registered available as a radio signal. Such radio signal may be received by a receiver and provided to a computing device that can process the signals to provide a registered image on a display. A registered image may be provided on one display. It may also be provided on multiple displays.

There are different combinations in processing, multiplexing, registering, storing, outputting and displaying. One may elect to do most processing in the camera. One may also do the majority of the processing in the computing device and not in the camera. One may provide lens setting parameters with image data to facilitate processing by a computing device for processing and consequently displaying the registered images.

In accordance with a further aspect of the present invention, a system is provided that is enabled to receive multiple, being at least two or more and preferably three or more, video signals of a scene and that can be displayed concurrently on multiple displays. A first embodiment a receiver/display is shown in diagram in FIG. 42a. A signal, containing the multiple video signals may be received on input 4201. The multiple video signals are multiplexed. They may represent registered images. The images may also not be registered. In that case the signal may contain camera and lens parameters that may make registration easier. If the images are not registered they may be registered by system 4200. System 4200 may also be able to demodulate a signal. However, the signal may also be already demodulated before being provided on 4201. The system 4200 will provide each registered video signal to its own individual display. In the diagram three displays 4202, 4203 and 4204 are shown. The displays will show the registered video images concurrently. In that case, the multiplexed signal on 4201 may be demultiplexed in this example into 3 individual video signals and processed to be registered before being displayed. If the multiplexed signal on 4201 already contains registered images it may be demultiplexed in 4200 and provided to each corresponding display. One may also provide each display with a demultiplexer that is tuned to a correct channel for the correct registered video signal.

Figure 42A:
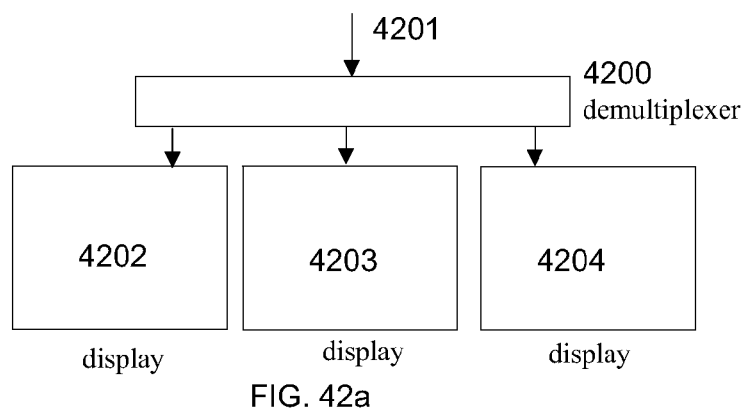
FIGS. 42a, 42b and 43 each provide a diagram of a video display system in accordance with one or more aspects of the present invention.

The advantage of the system of FIG. 42a is that substantially standard display technology may be used. Each display may have a standard format. Preferably, one should connect displays as seamlessly as possible as to display different signals combined as virtually one broad and potentially panoramic image, thus greatly enhancing a viewing experience.

Figure 42B:
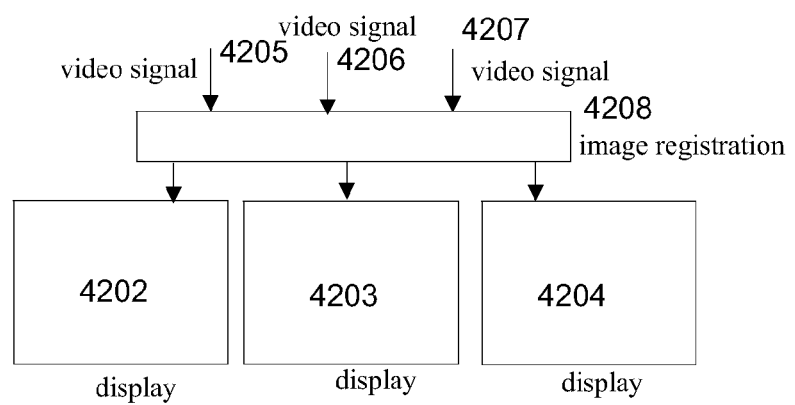

FIG. 42b shows a diagram of a further embodiment. In this case the multiple video images are already demultiplexed and are provided as individual image signals on individual inputs 4205, 4206 and 4207. A system 4208 may demodulate the signals as required and further register the images as required and provide individual registered video signals to displays 4202, 4203 and 4204. Preferably, the images were already registered and so not substantial registering is required.

Currently, standard video formats are applied to cameras and to displays. In general a broad panorama type display displaying 2, 3 or more concurrent video images on one screen may not be available or desirable. In that case the use of multiple displays may be preferable. However, as part of an enhanced viewing experience one may want to display multiple video images seamlessly on one display. This requires first of all one display of the correct format. However, it also requires that the 2, 3 or more video images are displayed in one video frame. Such a video frame should have a width of pixels that is a multiple of a width of a normal frame, while scanning a horizontal line of a multiple display frame within the same time as a single display time. It should be clear that the lines are longer which may be interpreted that a horizontal line has more pixels.

Figure 43:
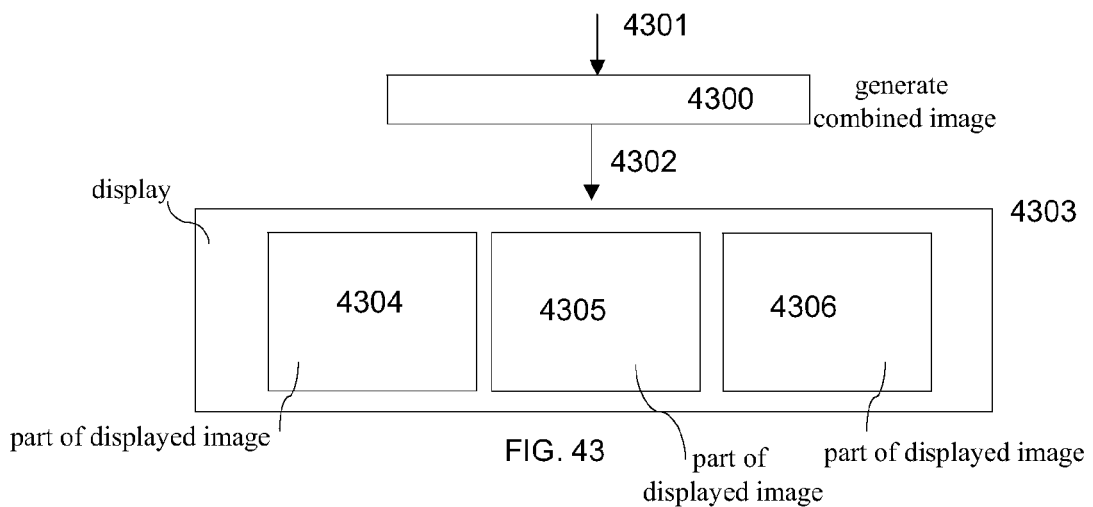

Such a system is illustrated in diagram in FIG. 43. A signal, which may be a multiplexed video signal or may represent 3 individual video signals is inputted on 4301. Accordingly, 4301 may represent 3 individual inputs. A computing device 4300 processes the signal or signals that represent 3 individual video images into one single video frame which is outputted on 4302, wherein in this case one scene video image shown on single display 4303 is made from 3 individual images 4304, 4305 and 4306. If required, 4300 may also perform registering the images, for instance by using camera/lens parameter settings. Preferably, the images were already substantially or completely registered by using the aspect of camera lenses calibration as was shown above. In general a display image is created by consecutive scanning or writing of horizontal or vertical lines of pixels of the image with one complete image being written with a frequency of 60 or 50 Hz. Interlacing may also be applied. Images may be written line after line. Accordingly, it may not be possible in such a system to first write image 4304, then 4305 and then 4306 for instance.

In accordance with a further aspect of the present invention a panorama frame of a video image may be created by multiplexing the corresponding lines of the registered video images. For instance, assume a video image contains k horizontal lines of n pixels, wherein each line is written in t0 seconds. A combined and registered video image from 3 individual images may thus have k horizontal lines of 3n pixels, when all lines have equal length. Each of the lines is formed by writing the n pixels of a line of the first image in at most t0/3 seconds, the n pixels of the corresponding line of the second image also in at most t0/3 seconds and the n pixels of the corresponding line of the third image in consecutive order, followed by a signal to go to the next line. This is one embodiment to allow displaying an image of k lines of each 3n pixels in at least t0 seconds per line. This method is illustrated in FIG. 43. An image 4400 is created by first writing pixel line 4401, followed by pixel line 4402 and then followed by pixel line 4403. After 4403 the process starts over again with a new line. At the end of completing the final line of a frame (which may include interlacing) a signal is provided for writing the next frame.

It is pointed out that pixels are data storage elements, for instance representing a color intensity. Accordingly, reading pixels may be easiest and least complex by reading them in consecutive order how they are stored. Alternatively, one may store pixels of multiple images in such a way and order that they are consecutively written to a display, for instance in accordance with writing a scan-line by a display.

Figure 45:
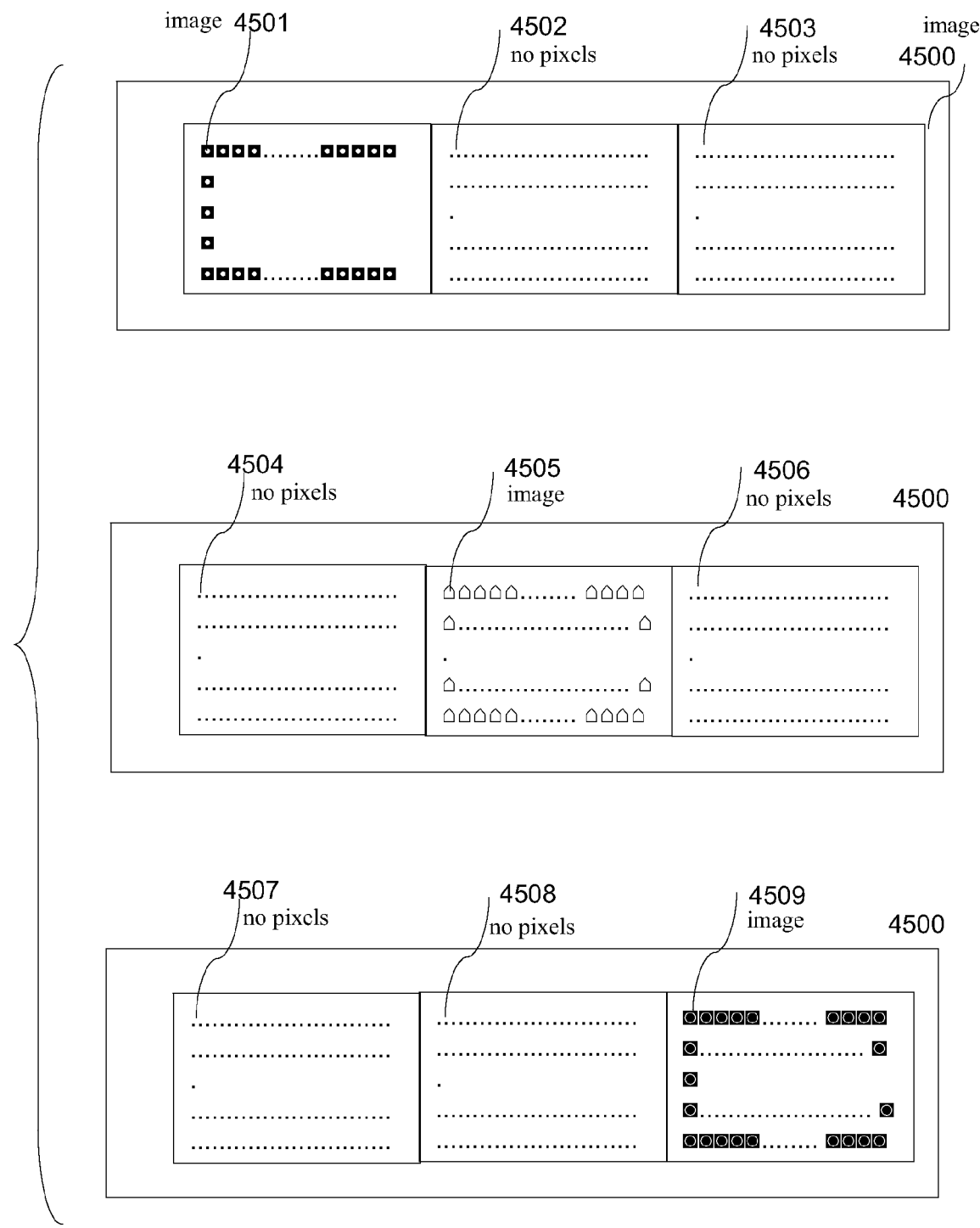

In a further embodiment one may create 3 different frames from each individual image, wherein the part of the line in the combined image that is occupied by another image is provided with "no pixel" value. This is illustrated in FIG. 45. Herein, a first frame for a combined image 4500 is formed by image 4501 wherein the image is completed by 4502 and 4503 all being "no pixels". Each line should still be ended by a signal that changes the writing to the next line. The same principle is applied to image 4505, which is preceded by empty lines of a blank image 4504 and succeeded by a blank image 4506. The third image is created by preceding image 4509 by blank images 4508 and 4507. Each image should be written at most one third of the display frequency. Furthermore, measures may be required to prevent excessive flicker in the combined image.

In yet a further embodiment of the present invention, one can write a single panoramic video image by writing each corresponding frame the consecutive video image as vertical lines, rather than horizontal lines. For instance, a video image that is comprised of three registered video images and as shown in diagram in FIG. 44 can be written by first writing the consecutive vertical image lines of pixels of image of line from pixel 4401 down to pixel 4404, starting with the next line at pixel 4405 down to pixel 4406 etc, until all vertical lines of the combined video image frame are written and the next frame can be processed.

Other variations, for instance, using interlacing of frames are fully contemplated. One may assume panorama images that are full high definition quality or at least full standard image or video image quality. In accordance with a further embodiment, one may show a panorama of 2 or 3 or more images on a single screen or display. In that case, the resolution of the image decreases and one may downsample the resolution of an image.

In a preferred embodiment, one should store pixels of multiple images in such a way that reading of a memory is coordinated with writing scanlines on a display.

While aspects of the invention have been illustrated with video images, it should be clear that the above also applies to photographs or still images.

Figure 46:
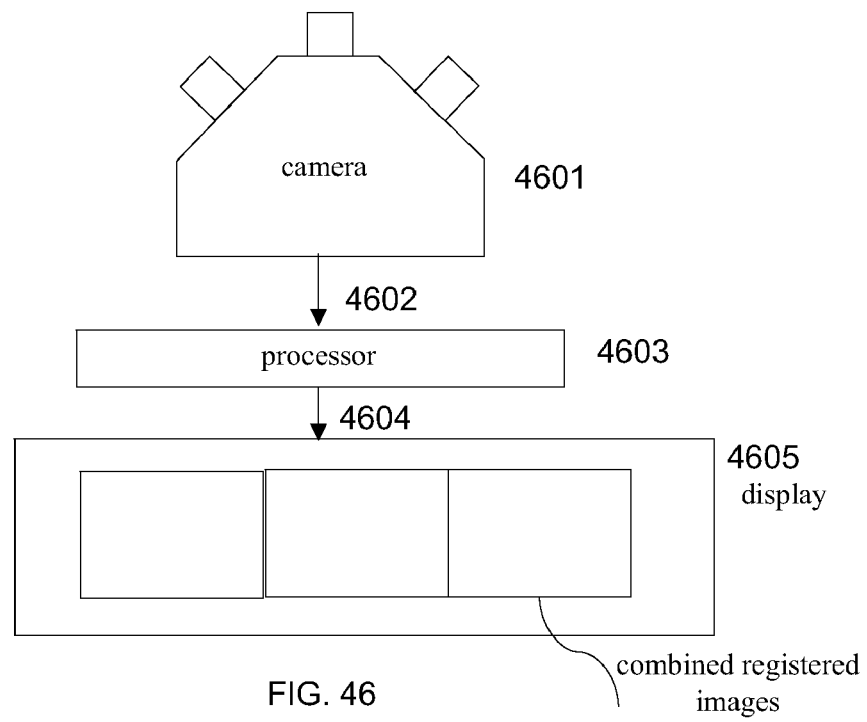
FIGS. 46 and 47 each provide a diagram of a video system in accordance with one or more aspects of the present invention.

In accordance with aspects of the present invention, systems and methods have been provided that record three or more video images with a single camera 4601 with multiple lenses as shown in FIG. 46. The camera may store the data of the signal or signals representing the multiple video images in a memory or on a storage medium. The camera can at a desired time provide a signal representing the video images recorded or sensed by the camera via a connection 4602 to a computing device 4603. Part of the processing of the individual images may take place in the camera or in 4603. As a result of the processing a signal 4604 which may be multiple signals is/are provided to a display 4605 which displays the combined and registered images concurrently and registered. The display 4605 may be multiple displays. The display 4605 may also be a single display. As a result a user of a system as shown in FIG. 46 can enjoy an enhanced video experience by viewing a real-time display of a scene in panorama view taken by a single camera.

Figure 47:
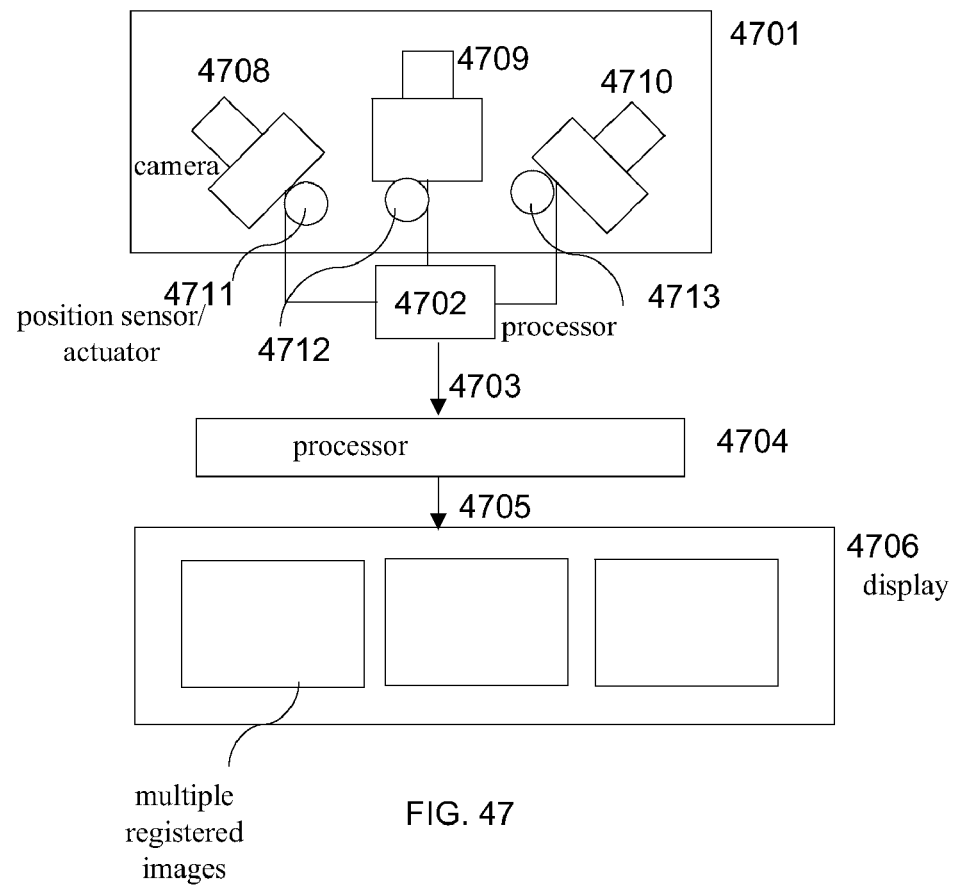

FIG. 47 shows in diagram a system for displaying a panorama image from a scene formed from 3 or more registered video images taken by 3 or more different cameras of a coordinated camera system 4701. By using for instance 3 or more cameras in different locations a different perspective of a scene may be provided. The cameras are coordinated and calibrated in focus, zoom, pan and position by a computing device 4702. A plurality of cameras may be provided of which one is a lead camera.

For instance, a system may have three cameras 4708, 4709 and 4710. Each camera has devices and circuitry to record as well as activate settings such as focus, zoom, diaphragm, exposure and pan. These settings may be calibrated and used in such a way that the images generated by the cameras will generate a substantially registered panorama image. To further illustrate the coordinated panorama view, each camera is provided with a position sensor/actuator. Camera 4708 has position sensor/actuator 4711; camera 4709 has position sensor/actuator 4712; and camera 4710 has position sensor/actuator 4713. One may use position sensor/actuators that only work in one plane, for instance in a horizontal plane. One may also use position sensor/actuators that work in a vertical and in horizontal directions.

One may thus again create a plurality of calibration settings, wherein at different focus setting of a lead camera, for instance camera 4709, the other cameras follow with settings in such a way that a registered or almost registered combined image will be generated and can be displayed. In one embodiment the cameras can pivot and point from a fixed position, whereby the settings of 4708 and 4710 are determined by the settings of camera 4709. In a further embodiment one may place the cameras movably on a rail, still using the settings of camera 4709 as the lead settings to be used to determine the settings of 4708 and 4710 to create a substantially or completely registered combined image.

Such a device may if desired store the images in a memory or a storage medium. The signals representing the images are then provided on a connection 4703 to another processing device 4704 which may process the image into a single signal or multiple signals on a connection 4705 to a display unit 4706 to display the registered and concurrent images into a single panorama video image. The display unit 4706 may comprise different individual displays or it may be a single video display.

The systems of FIGS. 46 and 47 may store either the individual video images or the combined and registered video image on a memory or a storage medium before it is displayed. The signal provided on either 4604 or 4705 may be provided in real-time or may be provided from memory or a storage medium.

Figure 48:
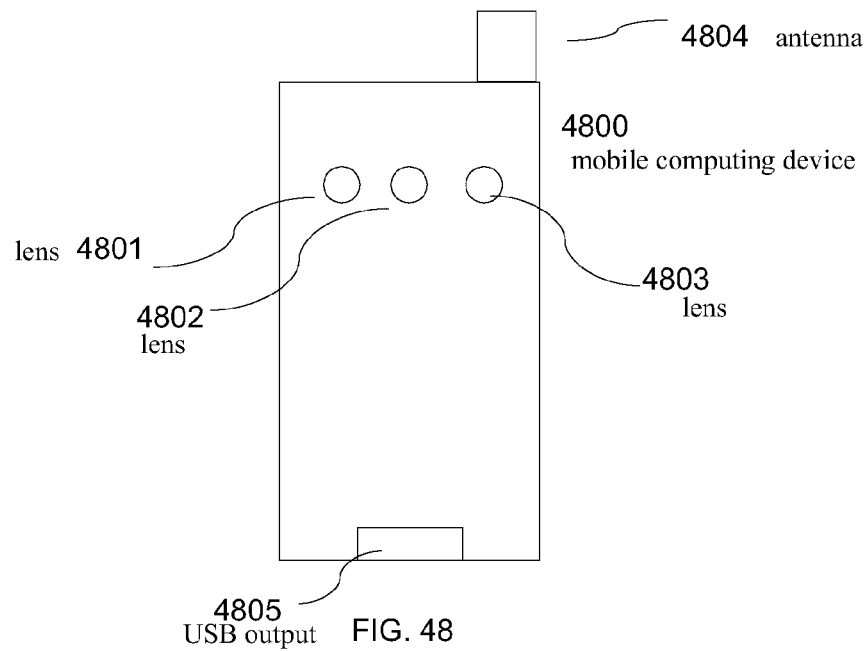
FIGS. 48-50 each provide a diagram of a mobile computing device enabled to communicate wirelessly and having two or more lenses in accordance with one or more aspects of the present invention.

In a further embodiment, a mobile computing device, which may be a mobile phone or a Personal Digital Assistant (PDA) or a Blackberry® type of device, is provided with 2 or more and preferably 3 or more lenses with related photo/video sensors which are calibrated to take a combined and registered image which may be a video image or a still image. A diagram is shown in FIG. 48 of a mobile computing device 4800 which may communicate in a wireless fashion with a network, for instance via an antenna 4804. While the antenna is shown it may also be hidden within the body. As an illustrative example the device has 3 lenses 4801, 4802 and 4803 which are enabled to record a scene in a way wherein the three individual images of the scene can be combined and registered into a wide view panoramic image, which may be a video image. The device has a capability to store the images in a memory. The device has a processor that can create a combined image. The combined image, which may be a static image such as a photograph or it may be a video image and can be stored in memory in the device. It may also be transmitted via the antenna 4804 or via a transmission port for output 4805 to an external device. The output 4805 may be a wired port for instance a USB output. It may also be a wireless output, for instance a Bluetooth output.

Figure 49:
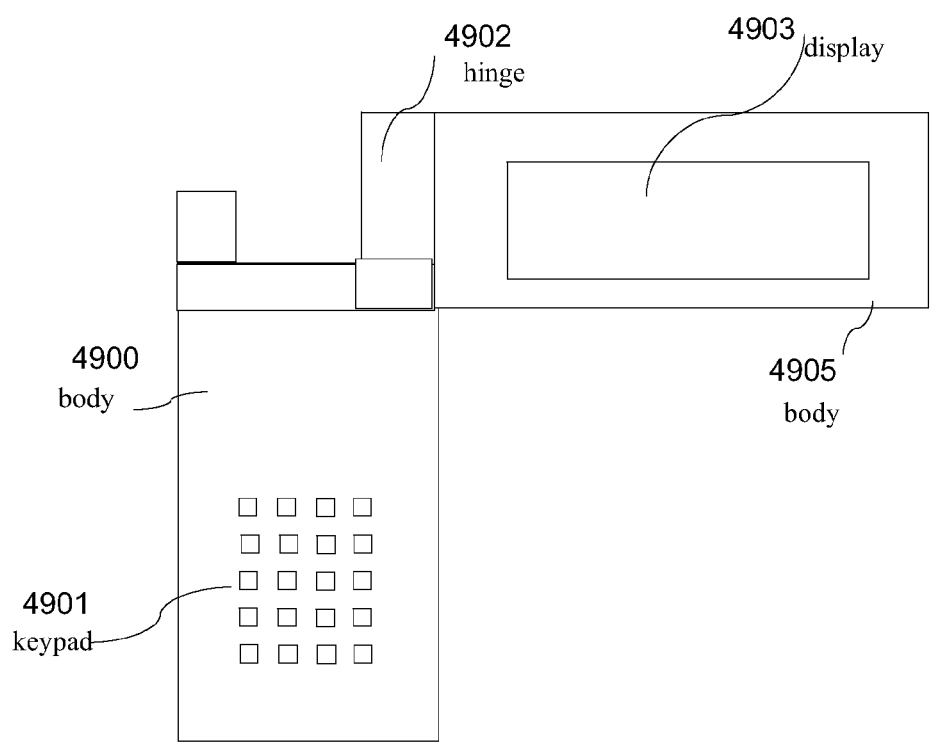

Viewing of the image may take place real-time on a screen 4903 of a device 4900 as shown in FIG. 49, which may be a different view of the device of FIG. 48. For instance FIG. 48 may be a view of the device from the front and FIG. 49 from the back of the device showing keypad 4901. In FIG. 49 it is shown that the device is comprised of at least two parts 4900 and 4905, connected via a hinge system with connectors 4902 that allows the two bodies to be unfolded and body 4905 turned from facing inside to facing outside. Body 4900 may contains input controls such a keys. Body 4905 may contain a viewing display 4903. The lenses of FIG. 48 are on the outside of 4900 in FIG. 49 and not visible in the diagram. Body 4905 with screen 4903 may serve as a viewer when recording a panoramic image with the lenses. It may also be used for viewing recorded images that are being played on the device. The device of FIG. 49 may also receive via a wireless connection an image that was transmitted by an external device. Furthermore, the device of FIG. 49 may also have the port 4805 that may serve as an input port for receiving image data for display on display screen 4903.

Figure 44:
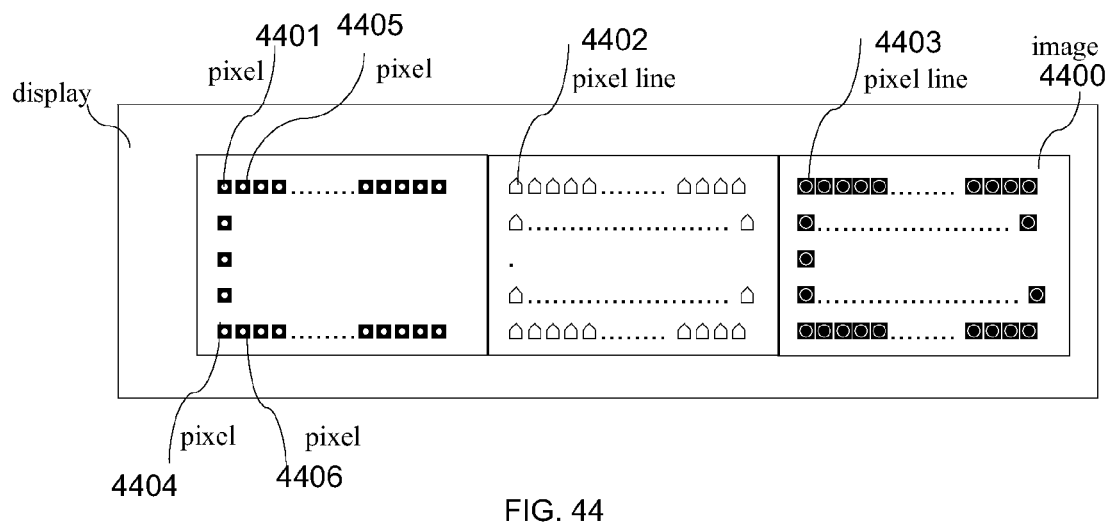
FIGS. 44 and 45 provide diagrams of a video image format in accordance with one or more aspects of the present invention.

A display 4903 in a portable computing device in generally is relatively small. While the camera may take full resolution pictures or videos that are registered, a display 4903 may generally not able to display a high pixel image. Furthermore, one may assume display 4903 to be a single display. Accordingly, the device of FIG. 49 may generate a panorama or registered image that is derived from (in this case) 3 images. While calibrated, 3 registered high quality images are generated. One may use several solutions to display the registered images. One may downsample each image so that the downsampled images can be appropriately displayed on 4903. One may also provide a circuit to create from 3 downsampled images a single image that can be displayed on display. For instance by combining pixels in (downsampled) lines as illustrated in FIGS. 44 and 45. One may store those images in downsampled and correctly image line formatted format in a special memory or storage medium. One may also store the high-quality registered images in a memory or storage medium in the device. One may store the images in such a way that is known how to address and retrieve the individual lines of the individual images. It is then possible to instruct the device to read the memory or storage device in such a way that only the pixels required for display on 4903 are read and appropriately displayed on 4903. The reading of the memory then performs the downsampling and merging of image lines.

In one embodiment one may assume that the surface of the device as shown in FIG. 48 is substantially flat. The camera lenses 4801, 4802 and 4803 may be positioned in such a way that they have a combined maximum field of view of 180 degrees. This may be sufficient for cameras with 3 lenses wherein each lens has a maximum field-of-vision of 60 degrees. In a further embodiment, one may have more than 3 lenses, enabling a combined field-of-vision of more than 180 degrees. In such a further embodiment the surface containing the lenses may be curved, allowing 3 or more lenses to be positioned such as to provide a combined field-of-view of greater than 180 degrees. In a further embodiment 3 or more lenses may also be positioned in such a way that they cover a field of view of greater than 180 degrees.

A camera on a mobile phone is often considered a must have accessory. Accordingly, one may prefer a multi-lens camera that will create panorama type images (either photographs and/or video), preferably at the lowest possible cost. In such a low cost embodiment one may for instance apply only a two lens camera. This is shown in diagram in FIG. 50 with camera phone 5000 with lenses 5001 and 5002. In diagram in FIG. 51 it is shown how scenes are seen by the lenses. Lens 5001 'sees' scene 5102 and lens 5002 'sees' scene 5101. A processor in the camera may stitch the images together. The 'stitching' may be as simple as processing just parts of the images. In general the edge of an image may suffer from lens distortion. For instance, one may ignore an 'inner' edge of 10% of the image created by a lens. That part of the image does not require a sensor. These parts are indicated by lines 5103 and 5104. In this embodiment one also requires an overlap of the two images. For illustrative purposes, one may make this overlap also 10%. In a further embodiment that overlap may be more; it may also be less than 10%.

Figure 52:
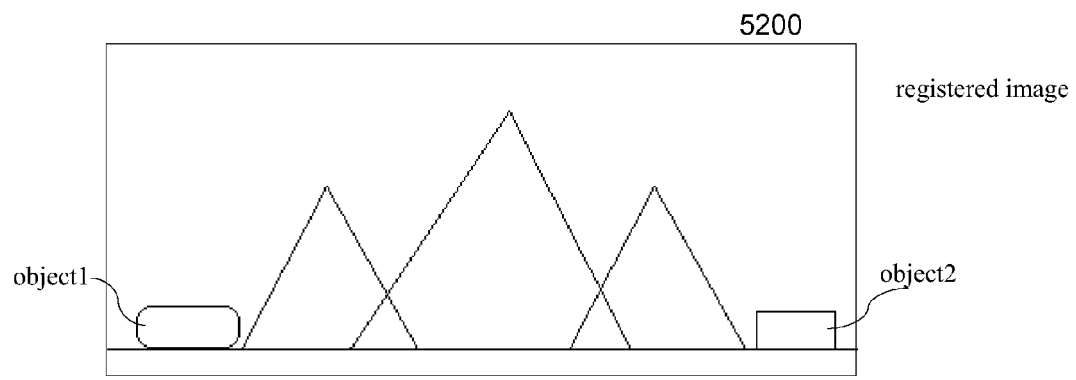
FIG. 52 shows a diagram of a single image created from 2 separate images in accordance with one or more aspects of the present invention.

FIG. 52 shows a registered and combined image. The image may be a photograph. It may also be a video image. If it is a video image, other aspects of the invention such as multiplexing, may be applied to enable concurrent display of multiple images as a single video image.

In general, one lets software decide how to stitch two or more images. As an aspect of the present invention the settings of the lenses are calibrated for different settings such as distance, lighting conditions and in certain cases also for zoom. These settings are related to at least one measurement that can be performed by the camera, such as distance for instance with an autofocus mechanism. All settings related to such an autofocus for 2 or more lenses are then stored in a memory. Furthermore, one may determine which part in coordinates of pixels and especially edges of a sensor can be processed to automatically generate a registered image. A processor or a controller, based on a measurement by the camera may retrieve the related settings from a memory. The controller then implements the settings, such as focus, diaphragm, etc to each relevant lens and provides a processor with information which part of a sensor to process and to store in a memory in such a way that the memory (or storage medium) has stored a completely or substantially completely registered image. No further stitching is then required, or just minimal processing for position adjustment.

In a further embodiment, one may provide additional instructions, for instance to make sure that pixels in a bordering region reflect a similar intensity of grey levels and/or colors so that a smooth transition occurs during display. This is known as blending. One may also apply transformational software that in case of distortion may correct the edges of different images to remove or diminish edge effects. However, the settings of this software depend completely or largely on the stored settings or are part of the stored settings, so that no further adjustment or just very limited adjustment is required.

Figure 50:
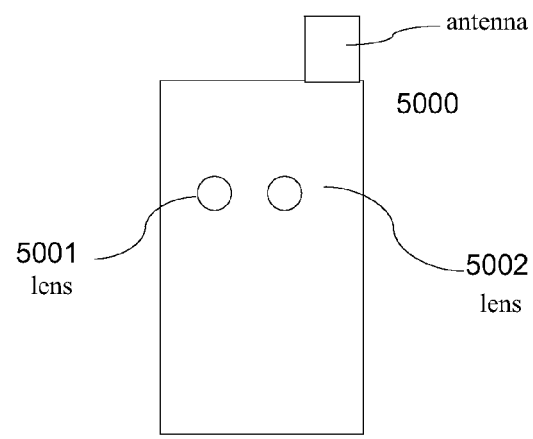
Figure 51:
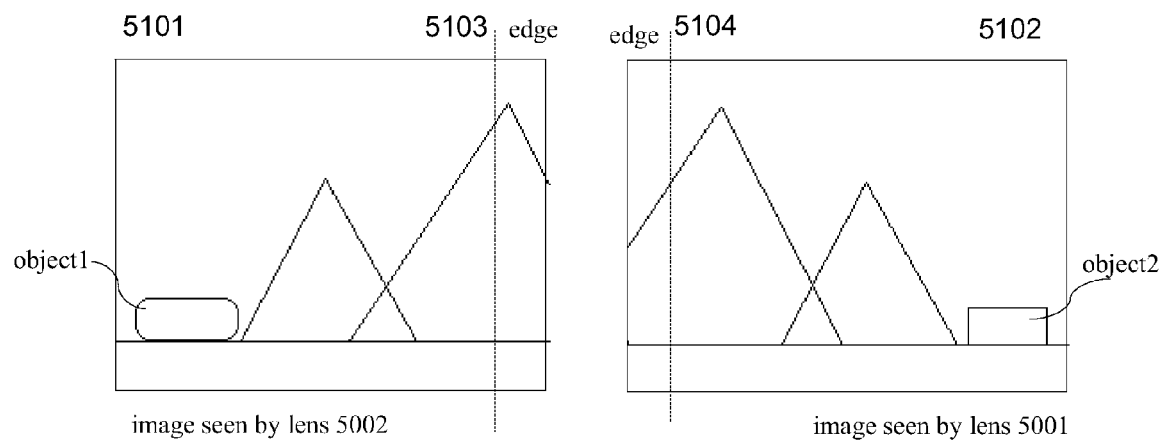
FIG. 51 shows a diagram of two images taken by two lenses in a camera in accordance with one or more aspects of the present invention.

The embodiment as provided in FIG. 50 and shown in FIG. 52 is unusual in at least one sense that it creates a center of an image by using the edges of the images created by two lenses. In general, as in some aspects of the present invention, one assigns one lens to the center and presumably an important part of the image. The above embodiment allows for creating a good quality image by using inexpensive components and adjusting the quality of a combined image by a set of instructions in a processor.

In a further embodiment of the present invention, images in a static format, in a video format, in a combined and registered format and/or in an individual format may be stored on a storage medium or a memory that is able to store a symbol as a non-binary symbol able to assume one of 3 or more states, or one of 4 or more states.

In a further embodiment, a combined and registered photograph or video image being displayed concurrently has an image quality that is substantially equal of the image quality of the individual photographs or video images before combining them. For instance, n images with $n \geq 2$ or $n \geq 3$ that are to be combined may each have a quality of not less than q pixels per $mm^2$ or equivalent. The combined photograph or video image to be displayed in accordance with an aspect of the present invention then has an image quality not less than q pixels per $mm^2$ or equivalent. In accordance with a further embodiment of the present invention, the images may be displayed on a single or on multiple displays. In a further embodiment the combined n images may be downsampled and displayed on a single display with the combined image quality of q pixels/$mm^2$ or less.

Figure 53:
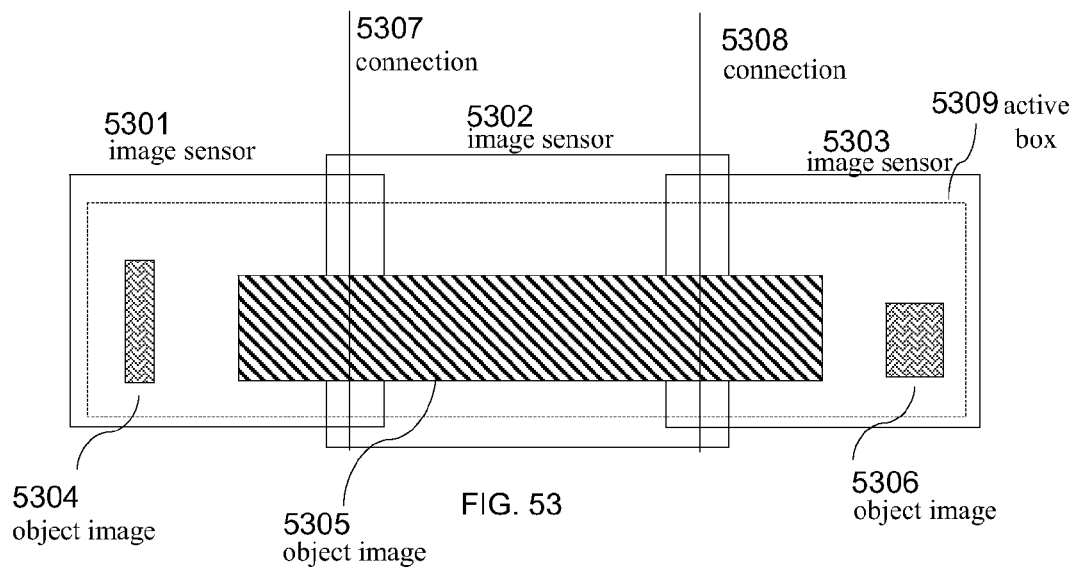
FIGS. 53-55 illustrate in diagram calibration settings of lenses in accordance with further aspects of the present invention.

There are several ways or methods to provide a calibration of lenses and related image sensors to create automatically a registered image of multiple images. For illustrative purposes, a number of these methods will be described. FIG. 53 shows in diagram three image sensors 5301, 5302 and 5303, each sensor belongs to a lens. The sensors are shown as having overlap. It is pointed out that this is only shown to illustrate the image that is recorded. Image sensors in reality do not have overlap, only their generated images do. A camera with 3 lenses is recording an image of objects 5304, 5305 and 5306. The diagram shows why a panoramic or registered image is desired. The complete image of object 5305 does not fit on the sensor 5302. Clearly part of an image of sensor 5301 and 5303 are required to create a complete image of object 5305. One may want to include image of objects 5304 and 5306 on an image to provide context to object 5305. Sensor 5302 is drawn slightly larger than 5301 and 5303. This is done to facilitate distinguishing between the three sensor blocks. In reality the three image sensors may be identical or different.

In a first embodiment the lenses may be put in a fixed position in relation to each other. That means that the sensors

5301, 5302 and 5303 must provide images with overlap for all focus and zoom settings for which the camera will be used. That means that one may have to select different overlap positions for different focus and/or zoom settings. In FIG. 53 the image as shown has a certain amount of overlap. It is possible that the lenses may have a certain amount of distortion, especially at the edges of the sensor. One may therefore select as the edge of connection between images for instance about the middle of the overlap. Assume that the diagram of FIG. 53 shows the three images as provided by the sensors. One may select as the optimal overlap position and as the connection line, the lines 5307 and 5308. It is pointed out that these lines may be selected during calibration, but are not real edges. Data manipulation has to create these edges. By setting those lines one may then store next as a first image, image 5301 generated on the sensor cut off at line 5307, as image two the part of image sensor 5302 cut-off at lines 5307 and 5308; and as image three part of image sensor 5303 cut-off at line 5308. If there is no distortion at the edges one may then store each of the reduced images in memory and create a registered image from the three images. One may create one image from three images and display it on one display. One may also display it on three displays. In case of video images one may multiplex the data to create a playable registered video image. One may call a cut-off line also a merge line. A merge line can be determined by coordinates in an image sensor or can be described as a partition in a memory storing image data generated by the sensor. In a set of sensors to generate a registered image sensor data, either directly from the sensor or in a memory, that is on one side of a merge line is used, while data on the other side of the merge line is ignored. A merge line may be a straight line, it may also be a curved line or any other line that separates data to be used in a registered image from data to be ignored for a registered image.

In a further embodiment, one may experience significant distortion in the overlap area between images, so that they do not register adequately. In that case one may determine and implement a pixel transformation that will create a registered image. The transformation will remain the same if the lens settings remain the same and may remain in effect for all images that are processed during the setting. One may store the transformation parameters for registering as part of the setting in the memory. One may also store the position of the cut-off lines as part of the setting. One may store a setting also as a setting code that can be retrieved from memory.

One may also store coordinates of the cut-off lines and store the image data in full in memory. One may use the coordinates of the cut-off lines to control which part of the stored images will be used to create and/or display a registered image.

It was already explained that display of the registered image on a small display, for instance, on the camera, requires fewer pixels than in a high definition (HD) display and that one may have to downsample the data. This may mean that fine tuning of registering that is required in high definition mode is not required in low definition mode. In one embodiment it may be that within a certain HD range a misalignment of 5 pixels may occur. Such a misalignment may not be noticeable on a downsampled display or on separate HD displays, wherein a display frame prevents exact alignment of the display screens anyway. In those cases further tuning of registering may not be required. In a further embodiment detailed alignment may not be required in case of misalignment of up to 10 pixels. In a further embodiment, a misalignment of over 10 pixels may not require further registering in case of a downsampled display or multiple HD displays with interfering supporting frames for instance.

In a further embodiment, one may apply adjustment to either the setting of the shutter or aperture or one may adjust the intensity of the pixels in images based on images in an overlap area. One may for instance compare the pixels on or in the area of line 5307 in image 5301 and 5302. For perfect registration one would like no difference in intensity in the overlap area so that connection is seamless. It may be that because of recording angles of lenses and shadow effects that there is a measurable difference between pixels on or around the cut-off line. One may adjust lens setting to make the transition are as smooth as possible. Another adjustment mechanism is to adjust in a transition area the pixels in one or both of the images in such a way that the transition is seamless. Such filter and transition smoothing operations are well known. The required parameter settings for this can be included and stored in the lens settings to be executed during recording or later during processing for display.

Figure 54:
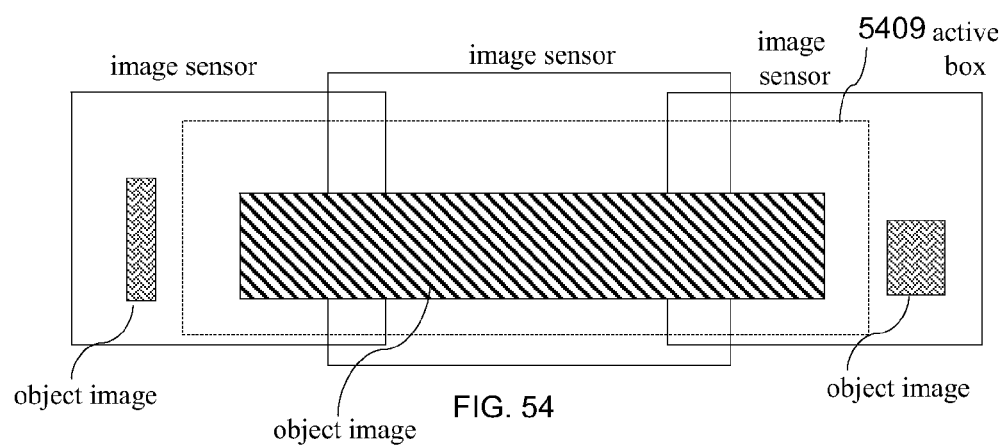

In a further embodiment, one may provide an image selection tool that allows the setting of an active registered image box that tells a processor which part of a register image should be displayed. One may use this setting to save only data within the box. One may also use the setting to determine which part of the stored data will be used and processed to be displayed. For instance, in FIG. 54 all elements except the active box are identical to the ones in FIG. 53. However, compared to active box 5309 in FIG. 53 in FIG. 54 the active box has been reduced to 5409, so that in this instance objects 5304 and 5306 will not be displayed in the registered image.

Figure 55:
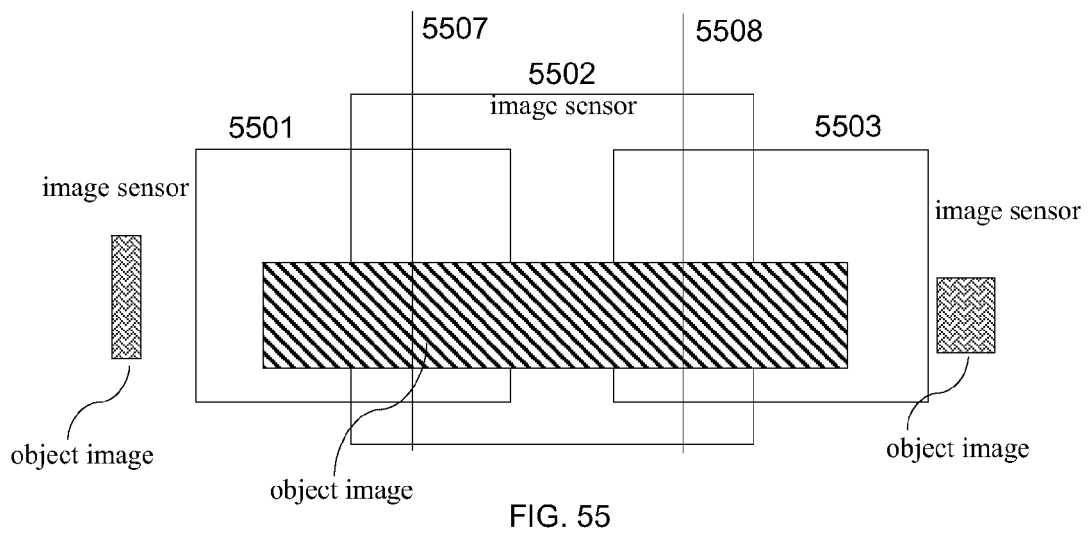

FIG. 55 shows in diagram yet a further embodiment, using three image sensors 5501, 5502 and 5503. Herein, either the lenses related to 5501 and 5503 and/or the lens/sensor unit related to 5501 and 5503 can be moved or rotated, so that the images have more or less overlap based on the position of the units. For instance, in a certain position as provided in FIG. 55 the width of the registered image may be sufficient, while the selected position of cut lines 5507 and 5508 assure perfect or almost perfect alignment without further need for registration transformation and/or pixel adjustment. In that case the relative position of units corresponding to 5501 and 5503 should also be stored as a calibration setting and be associated with settings related to the setting of 5502.

It should be clear that if one uses one display for displaying the registered image it is not required to multiplex the multiple images. In that case one may determine the required format of the registered image and create an image with the appropriate pixels and image lines that can be written on a single display. This applies for still images as well for video images. One may create such a single registered image in the camera. One may also create it at the display device. This allows a user to select a display mode. For instance one may select a mode wherein one of the images is displayed on a single display. In a second mode a single registered image is displayed on a single display. In a third mode, two or more multiplexed and registered images are displayed on two or more displays.

In a further embodiment, one may send a registered image made from two or more images to a display device. This registered image may be in HD format. The display device may be set in a mode to select displaying on a single or on multiple displays. The display device may be provided with means to break up the registered image in individual images or to downsample such an image.

In accordance with a further aspect of the present invention, a combined and concurrently displayed image of a scene created from n images is provided to an apparatus as a multiplexed signal created from n individual images.

In accordance with a further aspect of the present invention, a combined and concurrently displayed image of a scene created from n images is transmitted to an apparatus as a multiplexed signal created from n individual images.

In accordance with a further aspect of the present invention, a combined and concurrently displayed image of a scene created from n images is stored in a storage device as a multiplexed signal created from n individual images.

In accordance with a further aspect of the present invention, a combined and concurrently displayed image of a scene created from n images is displayed as n demultiplexed signals created from a single multiplexed signal.

In accordance with a further aspect of the present invention, a combined and concurrently displayed image of a scene created from n images has an audio signal associated with each image.

Static images and video images that are combined and registered in accordance with one or more aspects of the present invention are recorded at the same time or substantially at the same time. Substantially, at the same time herein means that within the restrictions of the sampling theorem the images are recorded within an assigned time slot in accordance with the sampling theorem. It was shown above that the signals representing individual images taken by different lenses have to be multiplexed. Theoretically, one may say that a signal at the beginning of a time slot and a signal at the end of a time slot represent images taken at different times. However, in the present context, differences in time between images that fall within a time slot for display of these images, such images may be considered to be taken at the same time.

The methods provided herein as an aspect of the present invention can be implemented in a processor, such as a microprocessor. It can also be implemented in a processor such as a digital signal processor. Instructions to be executed to provide the steps of the methods as disclosed herein can be stored in a memory. Part or all of the aspects can also be implemented in dedicated or customized circuitry. It can also be implemented in programmable logic such as a Field Programmable Gate Array (FPGA). Memory devices and storage devices as provided herein may be binary devices. They may also be nonbinary device. The methods as provided herein may also be implemented in nonbinary switching devices.

A controller may be a microcontroller such as a programmable microcontroller. These controllers that take input from external sources such as a sensor and drive a mechanism based on such input and/or previous states are known. Controllers that control aspects of a camera, such as focus, zoom, aperture and the like are also known. Such a controller is for instance disclosed in U.S. Pat. No. 7,259,792 issued on Aug. 21, 2007 and U.S. Pat. No. 6,727,941 issued on Apr. 27, 2004 which are both incorporated herein by reference in their entirety. Such a controller may also be known or be associated with a driving device. Such a driving device is for instance disclosed in U.S. Pat. No. 7,085,484 issued on Aug. 1, 2006, U.S. Pat. No. 5,680,649 issued on Oct. 21, 1997 and U.S. Pat. No. 7,365,789 issued on Apr. 29, 2008 which are all 3 incorporated herein by reference in their entirety.

While there have been shown, described and pointed out, fundamental novel features of the invention as applied to preferred embodiments thereof, it will be understood that various omissions and substitutions and changes in the form and details of the methods, systems and devices illustrated and in its operation may be made by those skilled in the art without departing from the spirit of the invention. It is the intention, therefore, to be limited only as indicated by the scope of the claims or their equivalents appended hereto.

The following patent applications, including the specifications, claims and drawings, are hereby incorporated by reference herein, as if they were fully set forth herein: (1) U.S. Non-Provisional patent application Ser. No. 11/042,645, filed Jan. 25, 2005, entitled MULTI-VALUED SCRAMBLING AND DESCRAMBLING OF DIGITAL DATA ON OPTICAL DISKS AND OTHER STORAGE MEDIA; (2) U.S. patent Ser. No. 7,218,144 issued on May 15, 2007, entitled SINGLE AND COMPOSITE BINARY AND MULTI-VALUED LOGIC FUNCTIONS FROM GATES AND INVERTERS; (3) U.S. patent Ser. No. 7,397,690 issued on Jul. 8, 2008, entitled Multi-Valued Digital Information Retaining Elements and Memory Devices; (4) U.S. Non-Provisional patent application Ser. No. 12/061,286 filed on Apr. 2, 2008, entitled Multi-State Latches From n-State Reversible Inverters; and (5) U.S. Non-Provisional patent application Ser. No. 11/964,507 filed on Dec. 26, 2007, entitled IMPLEMENTING LOGIC FUNCTIONS WITH NON-MAGNITUDE BASED PHYSICAL PHENOMENA.

The invention claimed is:

1. A method for displaying at least a first and a second concurrently recorded image in a registered manner, comprising:

generating data not being image data representing a first setting of a first lens in a single body camera for recording the first image under a first condition with a first area of a first image sensor that is smaller than the total active area of the first image sensor;

a controller putting a second lens in the single body camera in a first setting to generate a second image including selecting a first area of a second image sensor that is smaller than the total active area of the second image sensor, wherein the first setting of the second lens is determined and is associated with the first setting of the first lens and is stored in a memory during a calibration in such a manner that the first image and the second image form a substantially registered image;

applying the first setting of the first lens to the first lens;

retrieving by the controller from the memory the data representing the first setting of the second lens associated with the first setting of the first lens and the controller putting the second lens in the retrieved setting;

storing in an image storage device data representing the first image taken through the first lens and the second image taken through the second lens; and displaying on a display a substantially registered image by combining data representing the first and the second image.

2. The method of claim 1, wherein a setting of a lens is selected from a group consisting of focus, zoom, diaphragm, shutter speed, and lens position.

3. The method of claim 1, wherein images are video images.

4. The method of claim 1, wherein the image storage device is selected from the group consisting of a binary electronic memory, a rotating binary data storage medium, an n-state electronic memory with n>2 and an n-state rotating n-state storage medium.

5. The method of claim 1, further comprising processing the data of the first and second image for display on at least a first and second display to provide a registered panoramic image of a scene recorded by the at least first and second image.

6. The method of claim 1, wherein the single body camera is part of a mobile phone.

7. The method of claim 1, wherein the substantially registered image is a panoramic image.

8. The method of claim 1, wherein the substantially registered image is a stereoscopic image.

9. The method of claim 1, wherein the single body camera has a third lens and of which a first setting is determined and stored in the memory under the first condition, wherein the first setting of the third lens includes a first active area of a third image sensor that is determined during the calibration and is associated with the first setting of the first lens.

10. The method of claim 1, wherein the first setting of the first lens is determined by a focus mechanism.

11. A system for displaying at least a first and a second concurrently recorded image in a registered manner, comprising:
   a memory enabled holding data representing instructions and settings;
   a processor for retrieving from the memory data representing instructions and executing the instructions for performing the steps of:
      processing data not being image data representing a first setting of a first lens in a single body camera for recording the first image under a first condition with a first area of a first image sensor limited by a merge line;
      retrieving from the memory data not being image data representing a first setting of a second lens in the single body camera for recording the second image under the first condition with a first area of a second image sensor limited by the merge line, wherein the first setting of the second lens is determined and associated with the first setting of the first lens during a calibration in such a manner that a combination of the first image and the second image form a registered image;
      applying the first setting of the first lens to the first lens;
      the processor putting the second lens in the retrieved first setting of the second lens; and
      displaying on a display the registered image created from the first image taken through the first lens and the second image taken through the second lens.

12. The system of claim 11, further comprising instructions for storing data representing the merge line in the first and the second image.

13. The system of claim 12, further comprising instructions for processing the data of the at least first and second image for display on at least a first and second display to provide a registered image of a scene recorded by the at least first and second image.

14. The system of claim 11, wherein a setting of a lens is selected from a group consisting of focus, zoom, diaphragm, shutter speed, and lens position.

15. The system of claim 11, wherein images are video images.

16. The system of claim 11, wherein the single body camera is part of a mobile phone.

17. The system of claim 11, wherein the registered image is a panoramic image.

18. The system of claim 11, wherein the registered image is a stereoscopic image.

19. The system of claim 11, wherein the single body camera has a third lens and of which a first setting under the first condition includes a first area of a third image sensor that is determined during the calibration and is associated with the first setting of the first lens and is stored in the memory.

20. The system of claim 11, wherein the first setting of the first lens is determined by a focus mechanism.

* * * * *